United States Patent
Noda et al.

(10) Patent No.: US 7,660,545 B2
(45) Date of Patent: *Feb. 9, 2010

(54) COUPLING PART, PHOTOSENSITIVE DRUM, PROCESS CARTRIDGE AND ELECTROPHOTOGRAPHIC IMAGE FORMING APPARATUS

(75) Inventors: Shinya Noda, Mishima (JP); Shinichi Sasaki, Fujisawa (JP); Akihiro Toma, Naka-gun (JP); Isao Ikemoto, Yokohama (JP); Kazushi Watanabe, Mishima (JP); Akira Higeta, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/271,415

(22) Filed: Nov. 14, 2008

(65) Prior Publication Data

US 2009/0074452 A1    Mar. 19, 2009

Related U.S. Application Data

(60) Division of application No. 11/839,893, filed on Aug. 16, 2007, now Pat. No. 7,489,885, which is a division of application No. 11/617,380, filed on Dec. 28, 2006, now Pat. No. 7,274,896, which is a division of application No. 11/417,142, filed on May 4, 2006, now Pat. No. 7,231,161, which is a division of application No. 11/221,766, filed on Sep. 9, 2005, now Pat. No. 7,092,655, which is a division of application No. 11/084,623, filed on Mar. 21, 2005, now Pat. No. 6,999,696, which is a division of application No. 10/642,165, filed on Aug. 18, 2003, now Pat. No. 6,885,838, which is a continuation of application No. 09/968,657, filed on Oct. 2, 2001, now abandoned, which is a continuation of application No. 08/938,893, filed on Sep. 26, 1997, now Pat. No. 6,400,914, and a continuation-in-part of application No. 09/522,293, filed on Mar. 9, 2000, now Pat. No. 6,349,188, which is a division of application No. 09/258,314, filed on Feb. 26, 1999, now Pat. No. 6,128,454, which is a division of application No. 08/621,941, filed on Mar. 26, 1996, now Pat. No. 5,903,803.

(30) Foreign Application Priority Data

| Mar. 27, 1995 | (JP) | ................... 7-067796 |
| Mar. 21, 1996 | (JP) | ................... 8-064105 |
| Sep. 26, 1996 | (JP) | ................... 8-277530 |
| Dec. 24, 1996 | (JP) | ................... 8-356297 |
| Sep. 16, 1997 | (JP) | ................... 9-269320 |

(51) Int. Cl.
*G03G 15/00* (2006.01)
*G03G 21/16* (2006.01)

(52) U.S. Cl. ............... 399/90; 399/111; 399/167
(58) Field of Classification Search ............ 399/90, 399/110, 111, 107, 167, 159
See application file for complete search history.

(56) References Cited

U.S. PATENT DOCUMENTS

| 1,912,412 | A | 6/1933 | Stubbs | |
| 3,213,719 | A | 10/1965 | Kloack | ............ 81/436 |
| 3,542,178 | A | 11/1970 | Ripple | ............ 192/108 |
| 4,294,562 | A | 10/1981 | Müllenberg | ............ 403/383 |
| 4,454,922 | A | 6/1984 | Jamison et al. | ............ 175/323 |
| 4,591,258 | A | 5/1986 | Nishino et al. | ............ 399/90 |
| 4,607,734 | A | 8/1986 | Watashi et al. | ............ 192/69.91 |
| 4,829,335 | A | 5/1989 | Kanemitsu et al. | ............ 399/111 |
| 4,839,690 | A | 6/1989 | Onoda et al. | ............ 399/117 |
| 4,951,599 | A | 8/1990 | Damji | ............ 399/90 |
| 4,975,743 | A | 12/1990 | Surti | ............ 399/111 |
| 4,975,744 | A | 12/1990 | Ebata et al. | ............ 355/211 |
| 5,019,861 | A | 5/1991 | Surti | ............ 399/111 |
| 5,023,660 | A | 6/1991 | Ebata et al. | ............ 399/111 |
| 5,038,172 | A | 8/1991 | Schreyer | ............ 355/211 |
| 5,095,335 | A | 3/1992 | Watanabe et al. | ............ 399/111 |
| 5,128,715 | A | 7/1992 | Furuyama et al. | ............ 355/200 |
| 5,132,728 | A | 7/1992 | Suzaki et al. | ............ 355/200 |
| 5,151,734 | A | 9/1992 | Tsuda et al. | ............ 399/111 |
| 5,221,943 | A | 6/1993 | Hasegawa | ............ 355/245 |
| 5,223,893 | A | 6/1993 | Ikemoto et al. | ............ 399/111 |
| 5,280,224 | A | 1/1994 | Sagara | ............ 318/265 |

| | | | | | |
|---|---|---|---|---|---|
| 5,331,372 A | 7/1994 | Tsuda et al. ............... 399/114 | EP | 0 622 696 | 11/1994 |
| 5,331,373 A | 7/1994 | Nomura et al. ............ 399/111 | EP | 0 735 432 | 10/1996 |
| 5,345,294 A | 9/1994 | Nomura et al. ............ 399/90 | EP | 0 251 693 | 1/1998 |
| 5,353,100 A | 10/1994 | Ohtsuka .................... 399/111 | GB | 2 214 609 | 9/1989 |
| 5,404,198 A | 4/1995 | Noda et al. ................ 399/197 | JP | 57-179962 | 11/1982 |
| 5,422,706 A | 6/1995 | Tsunemi et al. ............ 355/211 | JP | 61-019248 | 1/1986 |
| 5,432,590 A | 7/1995 | Nomura et al. ............ 399/167 | JP | 61-156718 | 7/1986 |
| 5,436,699 A | 7/1995 | Komaki ..................... 399/159 | JP | 62-065049 | 3/1987 |
| 5,452,056 A | 9/1995 | Nomura et al. ............ 399/111 | JP | 62-185953 | 8/1987 |
| 5,452,064 A | 9/1995 | Inomata ..................... 399/299 | JP | 63-008654 | 1/1988 |
| 5,463,446 A | 10/1995 | Watanabe et al. .......... 399/111 | JP | 63-008655 | 1/1988 |
| 5,465,136 A | 11/1995 | Watanabe .................. 399/111 | JP | 63-201211 | 8/1988 |
| 5,470,635 A | 11/1995 | Shirai et al. ................ 428/131 | JP | 1-199022 | 8/1989 |
| 5,475,470 A | 12/1995 | Sasago ....................... 399/111 | JP | 2-304459 | 12/1990 |
| 5,475,475 A | 12/1995 | Kohtani et al. ............. 399/79 | JP | 3-069157 | 3/1991 |
| 5,488,459 A | 1/1996 | Tsuda et al. ............... 399/167 | JP | 3-138660 | 6/1991 |
| 5,500,714 A | 3/1996 | Yashiro et al. ............. 399/111 | JP | 3-138661 | 6/1991 |
| 5,510,878 A | 4/1996 | Noda et al. ................ 399/111 | JP | 3-269443 | 12/1991 |
| 5,543,898 A | 8/1996 | Shishido et al. ............ 399/111 | JP | 4-005667 | 1/1992 |
| 5,581,325 A | 12/1996 | Tsuda et al. ............... 399/116 | JP | 4-024656 | 1/1992 |
| 5,583,613 A | 12/1996 | Kobayashi et al. .......... 399/111 | JP | 4-081151 | 3/1992 |
| 5,585,889 A | 12/1996 | Shishido et al. ............ 399/113 | JP | 4-278961 | 10/1992 |
| 5,602,623 A | 2/1997 | Nishibata et al. ........... 399/111 | JP | 4-278971 | 10/1992 |
| 5,623,328 A | 4/1997 | Tsuda et al. ............... 399/111 | JP | 04-282681 | 10/1992 |
| 5,638,158 A | 6/1997 | Sanpe et al. ............... 394/174 | JP | 4-343367 | 11/1992 |
| 5,659,847 A | 8/1997 | Tsuda et al. ............... 399/113 | JP | 4-360158 | 12/1992 |
| 5,669,042 A | 9/1997 | Kobayashi et al. .......... 399/111 | JP | 5-019550 | 1/1993 |
| 5,701,562 A | 12/1997 | Araki et al. ................ 399/265 | JP | 5-019658 | 1/1993 |
| 5,878,310 A | 3/1999 | Noda et al. ................ 399/117 | JP | 5-027765 | 2/1993 |
| 5,903,803 A | 5/1999 | Kawai et al. ............... 399/116 | JP | 5-030857 | 2/1993 |
| 5,920,753 A | 7/1999 | Sasaki et al. ............... 399/111 | JP | 5-035168 | 2/1993 |
| 5,923,924 A | 7/1999 | Hashimoto .................. 399/111 | JP | 5-150533 | 6/1993 |
| 5,926,672 A | 7/1999 | Nishibata et al. ........... 399/111 | JP | 5-196066 | 8/1993 |
| 5,926,673 A | 7/1999 | Foster et al. ............... 399/167 | JP | 5-224475 | 9/1993 |
| 5,930,562 A | 7/1999 | Noda et al. ................ 399/114 | JP | 5-307284 | 11/1993 |
| 5,953,562 A | 9/1999 | Kawaguchi et al. ......... 399/117 | JP | 5-313547 | 11/1993 |
| 5,987,287 A | 11/1999 | Huang ....................... 399/111 | JP | 6-035320 | 2/1994 |
| 5,991,571 A | 11/1999 | Yamada et al. ............. 399/117 | JP | 06-083251 | 3/1994 |
| 6,006,058 A | 12/1999 | Watanabe et al. .......... 399/167 | JP | 6-193640 | 7/1994 |
| 6,029,032 A | 2/2000 | Watanabe et al. .......... 399/111 | JP | 6-258877 | 9/1994 |
| 6,035,159 A | 3/2000 | Azuma et al. ............... 399/111 | JP | 6-258993 | 9/1994 |
| 6,097,909 A | 8/2000 | Watanabe et al. .......... 399/111 | JP | 6-274075 | 9/1994 |
| 6,128,454 A | 10/2000 | Kawai et al. ............... 399/111 | JP | 6-324609 | 11/1994 |
| 6,163,665 A | 12/2000 | Watanabe et al. .......... 399/111 | JP | 6-337620 | 12/1994 |
| 6,173,146 B1 | 1/2001 | Wang et al. ................ 399/265 | JP | 6-342244 | 12/1994 |
| 6,175,706 B1 | 1/2001 | Watanabe .................. 399/167 | JP | 7-199728 | 8/1995 |
| 6,226,478 B1 | 5/2001 | Watanabe et al. .......... 399/117 | JP | 7-319329 | 12/1995 |
| 6,240,266 B1 | 5/2001 | Watanabe et al. .......... 399/117 | JP | 7-334036 | 12/1995 |
| 6,246,849 B1 | 6/2001 | Yokoyama et al. .......... 399/117 | JP | 8-044247 | 2/1996 |
| 6,289,189 B1 | 9/2001 | Numagami et al. .......... 399/111 | JP | 8-076667 | 3/1996 |
| 6,324,363 B1 | 11/2001 | Watanabe et al. .......... 399/111 | JP | 8-087225 | 4/1996 |
| 6,330,409 B1 | 12/2001 | Watanabe et al. .......... 399/111 | JP | 8-160793 | 6/1996 |
| 6,336,018 B1 | 1/2002 | Kawai et al. ............... 399/117 | JP | 8-328449 | 12/1996 |
| 6,349,188 B1 | 2/2002 | Kawai et al. ............... 399/116 | JP | 10-240103 | 9/1998 |
| 6,400,914 B1 | 6/2002 | Noda et al. ................. 399/90 | KR | 89-0004761 | 7/1989 |
| 6,501,926 B1 | 12/2002 | Watanabe et al. .......... 399/117 | KR | 91-8911 | 6/1991 |
| 6,501,927 B1 | 12/2002 | Watanabe et al. .......... 399/117 | KR | 91-0008092 | 10/1991 |
| 6,684,041 B2 | 1/2004 | Yokomori et al. ........... 399/111 | | | |
| 6,885,838 B2 | 4/2005 | Kawai et al. ............... 399/167 | | | |
| 6,999,696 B2 | 2/2006 | Noda et al. ................. 399/90 | | | |
| 7,092,655 B2 * | 8/2006 | Noda et al. ................. 399/90 | | | |
| 2002/0018666 A1 | 2/2002 | Noda et al. ................. 399/90 | | | |
| 2006/0198654 A1 | 9/2006 | Noda et al. ................. 399/90 | | | |

OTHER PUBLICATIONS

SME Technical Paper, "Polygon Fixed and Sliding Drive Connections: New Development in Their Application and Manufacture" (1974).

HP 3906A Cartridge Specifications (2 pages), Jan. 25, 2007.

Dec. 5, 2006 Japanese Office Action for Japanese Application No. 2005-115044 and English translation thereof.

\* cited by examiner

FOREIGN PATENT DOCUMENTS

| | | |
|---|---|---|
| CA | 2147713 | 10/1995 |
| EP | 0 115 315 | 8/1984 |
| EP | 0 487 039 | 5/1992 |
| EP | 0 538 479 | 4/1993 |
| EP | 0 576 759 | 1/1994 |
| EP | 0 586 033 A2 | 3/1994 |
| EP | 0 586 041 | 3/1994 |

*Primary Examiner*—Susan S Lee
(74) *Attorney, Agent, or Firm*—Fitzpatrick, Cella, Harper & Scinto

(57) ABSTRACT

A process cartridge detachably mountable to a main assembly of an electrophotographic image forming apparatus, wherein the main assembly includes a motor, a main assembly side gear for receiving driving force from the motor, a hole defined by twisted surfaces, the hole being substantially coaxial with the gear, and a main assembly side grounding contact provided in the hole, the process cartridge includes an electrophotographic photosensitive drum; process mechanisms actable on the photosensitive drum; and a projection engageable with the twisted surfaces, the projection being provided at a longitudinal end of the photosensitive drum, wherein when the main assembly side gear rotates with the hole and projection engaged with each other, rotational driving force is transmitted from the gear to the photosensitive drum through engagement between the hole and the projection; and a cartridge side grounding contact electrically connected with the electrophotographic photosensitive drum for electrically grounding the electrophotographic photosensitive drum when the process cartridge is mounted to the main assembly of the apparatus, the cartridge side grounding contact being provided on the projection so as to be electrically connectable with the main assembly side grounding contact

17 Claims, 48 Drawing Sheets

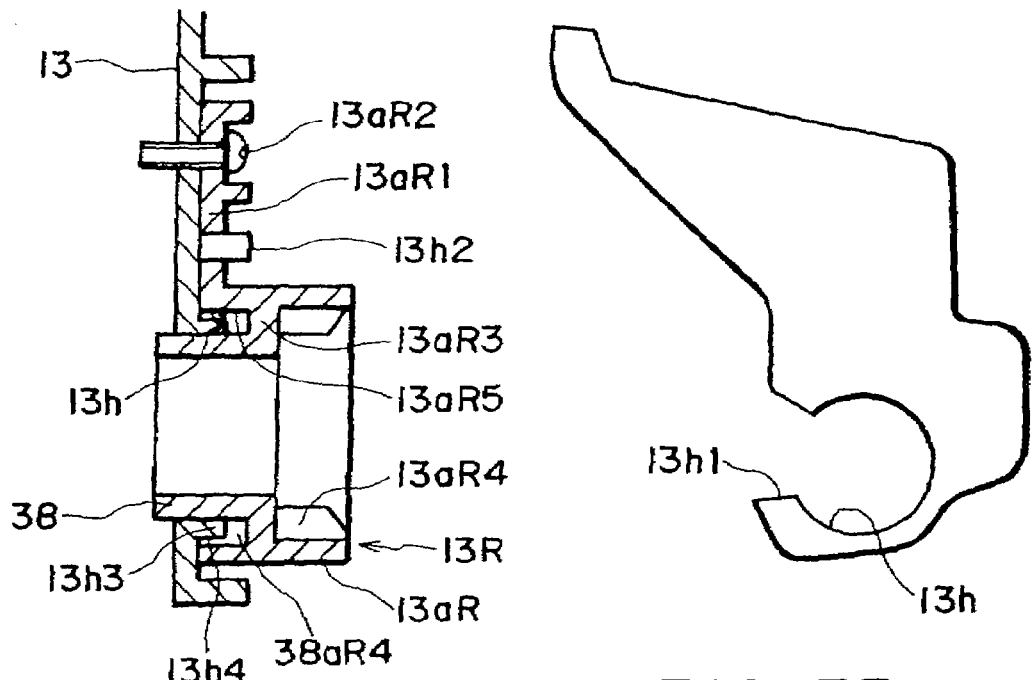
FIG. 34
FIG. 35
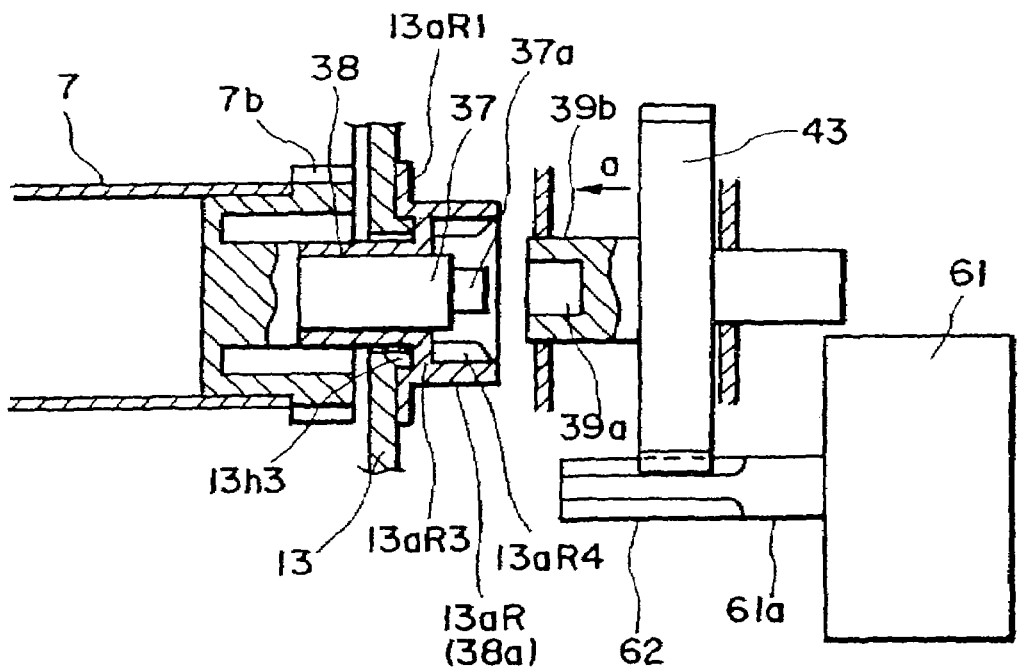
FIG. 36

COUPLING PART, PHOTOSENSITIVE DRUM, PROCESS CARTRIDGE AND ELECTROPHOTOGRAPHIC IMAGE FORMING APPARATUS

The present application is a Divisional of U.S. application Ser. No. 11/839,893 filed Aug. 16, 2007, now U.S. Pat. No. 7,489,885, which is a Divisional of U.S. application Ser. No. 11/617,380 filed Dec. 28, 2006, pending, which issued as U.S. Pat. No. 7,274,896 on Sep. 25, 2007, which is a Divisional Application of U.S. application Ser. No. 11/417,142, filed May 4, 2006, which issued as U.S. Pat. No. 7,231,161 on Jun. 12, 2007, which is a Divisional Application of U.S. application Ser. No. 11/221,766, filed Sep. 9, 2005, which issued as U.S. Pat. No. 7,092,655 on Aug. 15, 2006, which is a Divisional Application of U.S. application Ser. No. 11/084,623, filed Mar. 21, 2005, which issued as U.S. Pat. No. 6,999,696, on Feb. 14, 2006, which is a Divisional Application of U.S. application Ser. No. 10/642,165, filed Aug. 18, 2003, which issued as U.S. Pat. No. 6,885,838 on Apr. 26, 2005, which is a Continuation Application of U.S. application Ser. No. 09/968,657, filed Oct. 2, 2001, now abandoned.

Application Ser. No. 09/968,657 is a Rule 53(b) continuation application of application Ser. No. 08/938,893, filed Sep. 26, 1997, now U.S. Pat. No. 6,400,914, issued Jun. 4, 2002. Application Ser. No. 09/968,657 also is a continuation-in-part application of application Ser. No. 09/522,293 filed Mar. 9, 2000, now U.S. Pat. No. 6,349,188, issued Feb. 19, 2002. Application Ser. No. 09/522,293 is a divisional application of application Ser. No. 09/258,314, filed Feb. 26, 1999, now U.S. Pat. No. 6,128,454, issued Oct. 3, 2000. Application Ser. No. 09/258,314 is a divisional application of application Ser. No. 08/621,941, filed Mar. 26, 1996, now U.S. Pat. No. 5,903,803, issued May 11, 1999.

FIELD OF THE INVENTION AND RELATED ART

The present invention relates to a coupling part, a photosensitive drum, a drive transmission part, a process cartridge and an electrophotographic image forming apparatus.

Here, the electrophotographic image forming apparatus forms an image on a recording material using an electrophotographic image formation process. Examples of the electrophotographic image forming apparatus include an electrophotographic copying machine, an electrophotographic printer (laser beam printer, LED printer or the like), a facsimile machine and a word processor or the like.

The process cartridge contains integrally the electrophotographic photosensitive member and charging means, developing means or cleaning means, and is detachably mountable relative to a main assembly of the image forming apparatus. It may integrally contain the electrophotographic photosensitive member and at least one of the charging means, the developing means and the cleaning means. As another example, it may contain the electrophotographic photosensitive member and at least the developing means.

In an electrophotographic image forming apparatus using an electrophotographic image forming process, the process cartridge is used, which contains the electrophotographic photosensitive member and process means actable on said electrophotographic photosensitive member, and which is detachably mountable as a unit to a main assembly of the image forming apparatus (process cartridge type). With this process cartridge type, maintenance of the apparatus can be carried out in effect by the user without depending on a serviceman. Therefore, the process cartridge type is now widely used in electrophotographic image forming apparatuses.

A driving system for a photosensitive member in a process cartridge type, is disclosed in U.S. Pat. Nos. 4,829,335 and 5,023,660. U.S. Pat. Nos. 4,591,258 and 4,839,690 disclose grounding mechanism for a photosensitive member. These are effective.

SUMMARY OF THE INVENTION

The object of the present invention is to provide a coupling means capable of grounding an electrophotographic photosensitive member, and also to provide a photosensitive drum, a process cartridge, and an electrophotographic image forming apparatus, which comprise such coupling means.

Another object of the present invention is to provide a coupling means capable of grounding an electrophotographic photosensitive member through the main assembly of an electrophotographic image forming apparatus in which the electrophotographic photosensitive member receives driving force through the coupling means, and also to provide a photosensitive drum, a process cartridge, and an electrophotographic image forming apparatus, which are compatible with such a coupling means.

Another object of the present invention is to provide a coupling means capable of grounding an electrophotographic photosensitive member without deteriorating the rotational accuracy of the electrophotographic photosensitive member, and also to provide a photosensitive drum, a process cartridge, and an electrophotographic image forming apparatus, which are compatible with such a coupling means.

Another object of the present invention is to provide a coupling means comprising a projection engageable with a twisted surface, said projection being provided at one of the longitudinal ends of a photosensitive drum, wherein when a gear on the main assembly side rotates, with a hole and the projection being engaged with each other, rotational driving force is transmitted from said gear to said photosensitive drum through engagement between said hole and said projection, and also to provide a photosensitive drum, a process cartridge, and an electrophotographic image forming apparatus, which are compatible with such a coupling means.

Another object of the present invention is to provide a coupling means, the process cartridge side of which comprises a projection provided with a ground contact which is electrically connected to the ground contact on the main assembly side to ground an electrophotographic photosensitive member, and also to provide a photosensitive drum, a process cartridge, and an electrophotographic image forming apparatus, which are compatible with such a coupling means.

Another object of the present invention is to provide a coupling means capable of grounding an electrophotographic photosensitive drum, as well as transmitting driving force from the apparatus main assembly side to the process cartridge side, wherein the coupling means comprises the process cartridge side with a coupling recess and a ground contact, the ground contact being located in the coupling recess, and the apparatus main assembly side with a coupling projection and a ground contact, the ground contact being located on the coupling projection, and when a process cartridge is installed in the apparatus main assembly of an electrophotographic image forming apparatus, the coupling recess is engaged with the coupling projection, whereby the ground contact on the process cartridge side is placed in contact with the ground contact on the apparatus main assembly side to ground the electrophotographic photosensitive drum, and also to provide a photosensitive drum, a process cartridge, and an electrophotographic image forming apparatus, which are compatible with such a coupling means.

These and other objects, features and advantages of the present invention will become more apparent upon a consideration of the following description of the preferred embodiments of the present invention, taken in conjunction with the accompanying drawings.

BRIEF DESCRIPTION OF THE DRAWINGS

FIG. 34 is a vertical section of the drum bearing portion.

FIG. 35 is a side view of the drum bearing portion, depicting the contour thereof.

FIG. 36 is an exploded section of the drum bearing portion in one of the embodiments of the present invention.

DESCRIPTION OF THE PREFERRED EMBODIMENTS

Hereinafter, the embodiments of the present invention will be described with reference to the drawings.

Next, desirable embodiments of the present invention will be described. In the following description, the "widthwise" direction of a process cartridge B means the direction in which the process cartridge B is installed into, or removed from, the main assembly of an image forming apparatus, and coincides with the direction in which a recording medium is conveyed. The "lengthwise" direction of the process cartridge B means a direction which is intersectional with (substantially perpendicular to) the direction in which the process cartridge B is installed into, or removed from, the main assembly 14. The lengthwise direction is parallel to the surface of the recording medium, and intersectional with (substantially perpendicular to) the direction in which the recording medium is conveyed. Further, the "left" or right" means the left or right relative to the direction in which the recording medium is conveyed, as seen from above.

Figure 1:
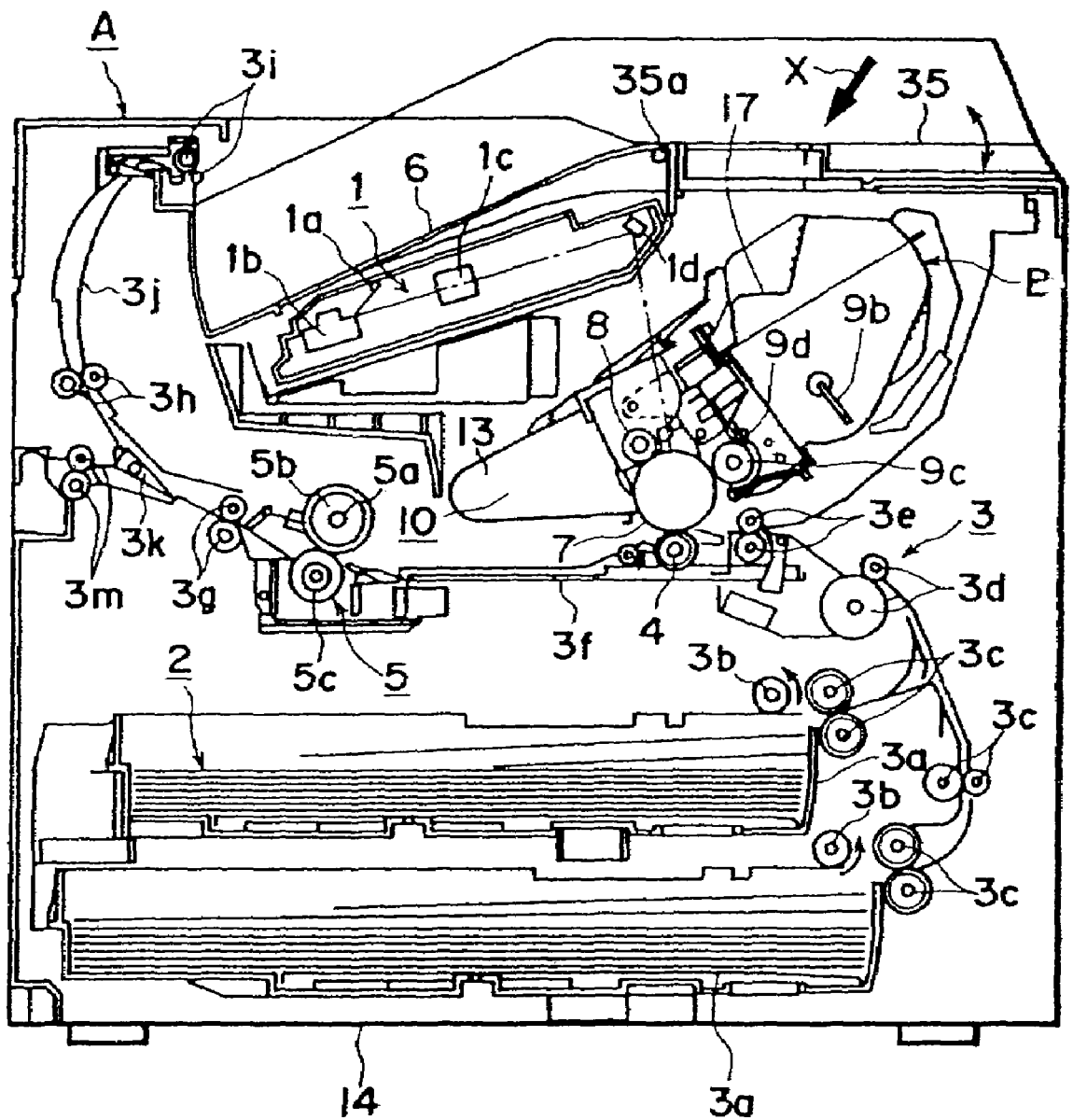
FIG. 1 is a vertical section of an electrophotographic image forming apparatus.
Figure 2:
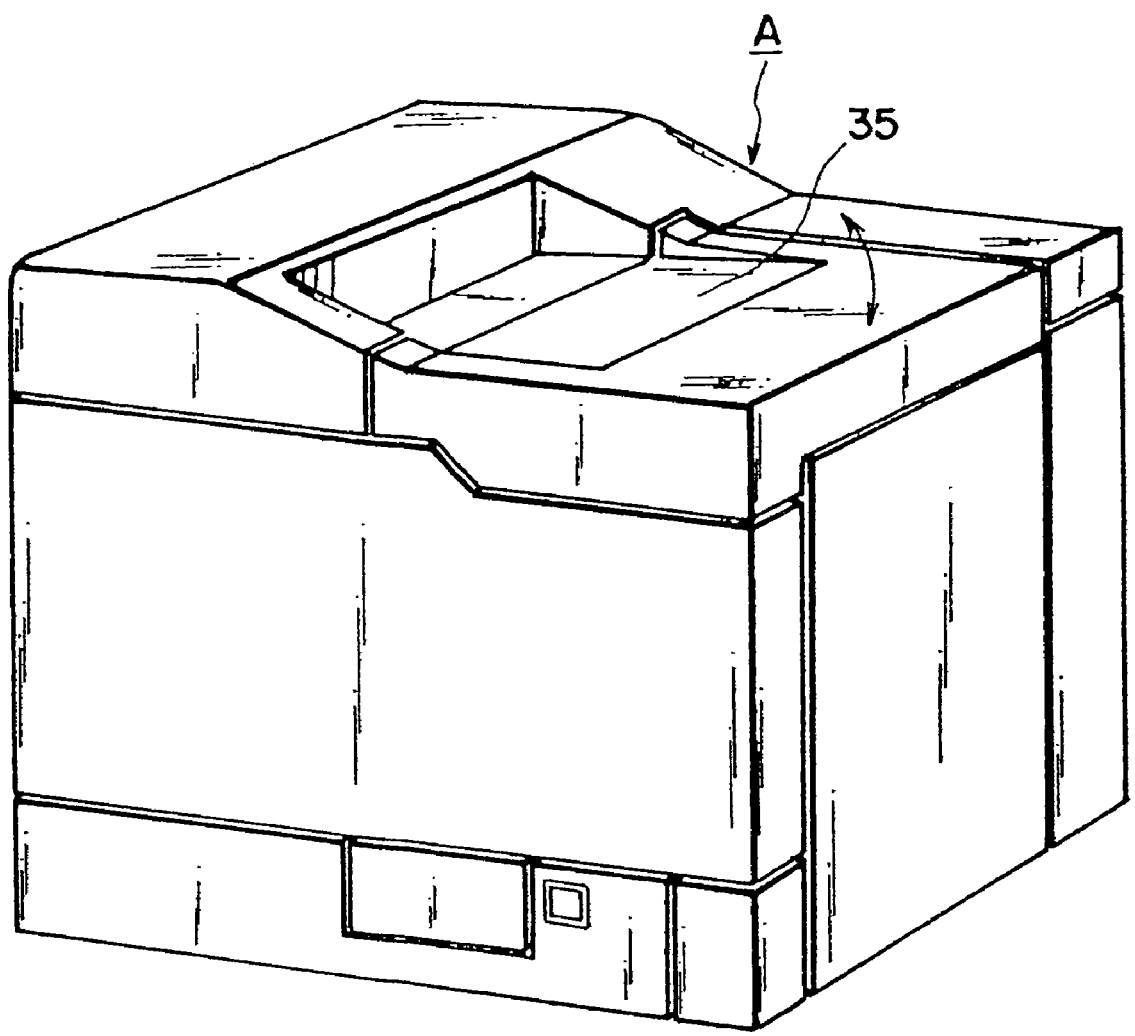
FIG. 2 is an external perspective view of the apparatus illustrated in FIG. 1.
Figure 3:
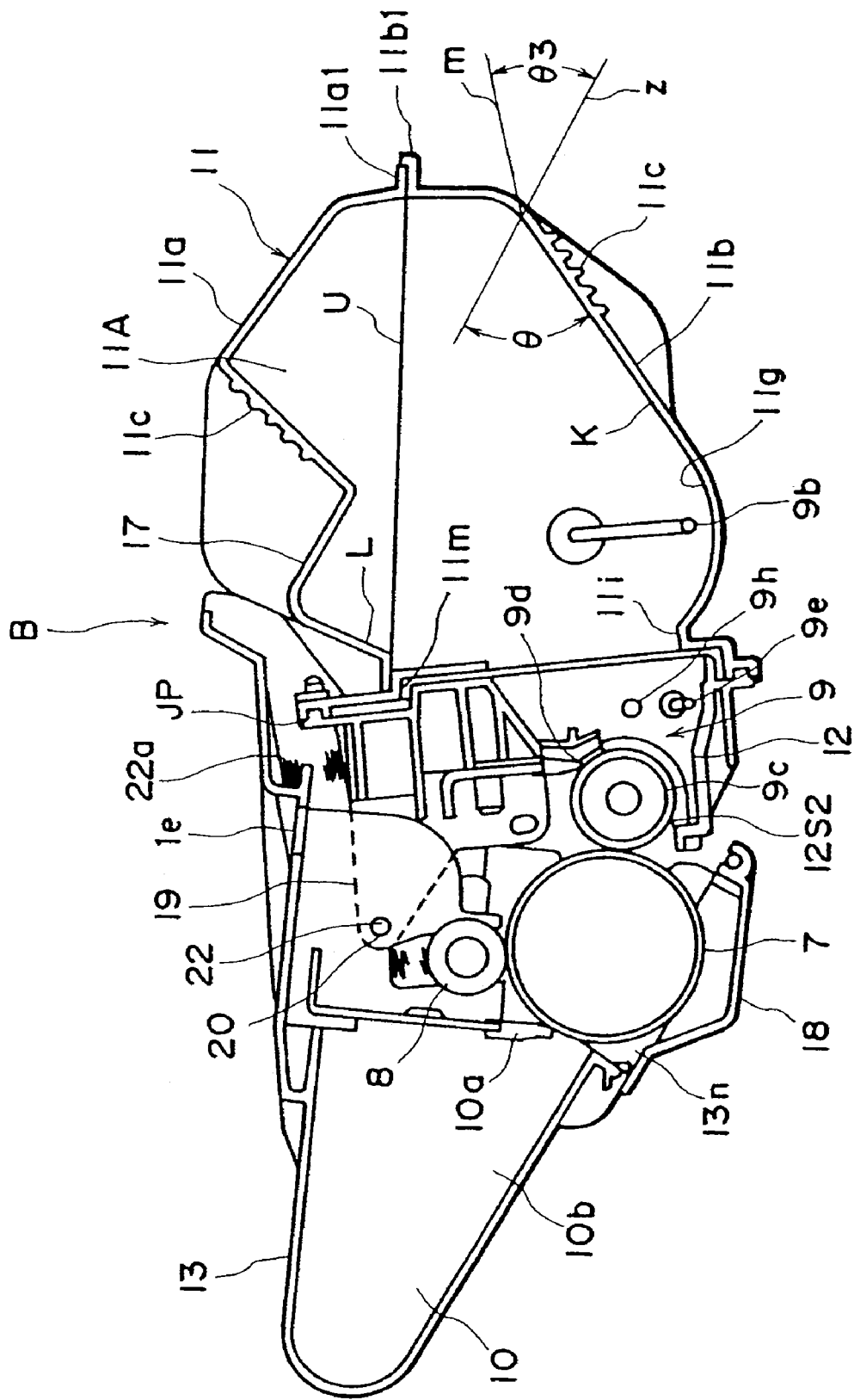
FIG. 3 is a cross-section of a process cartridge.
Figure 4:
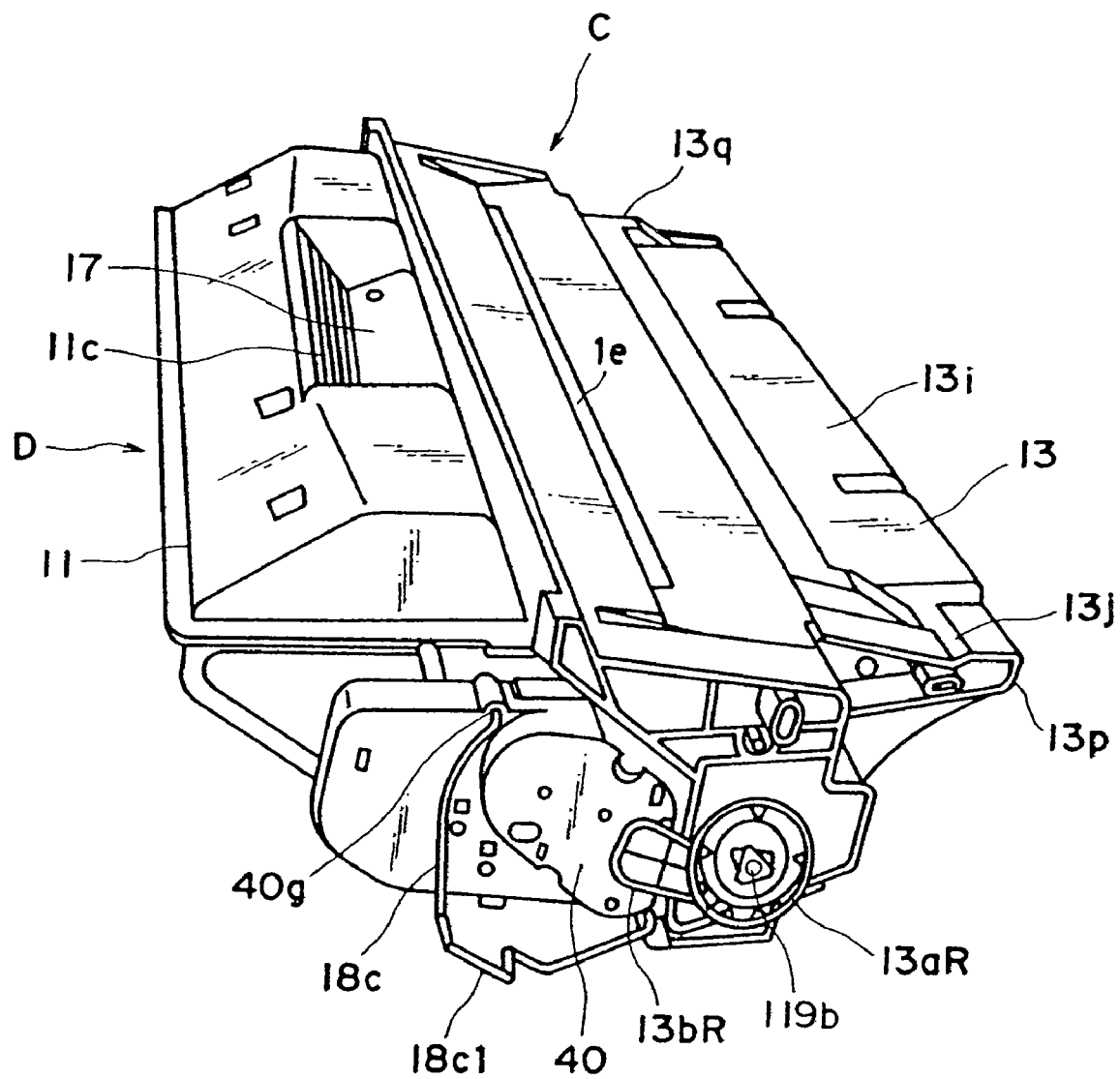
FIG. 4 is an external perspective view of the process cartridge illustrated in FIG. 3, as seen from the top right direction.
Figure 5:
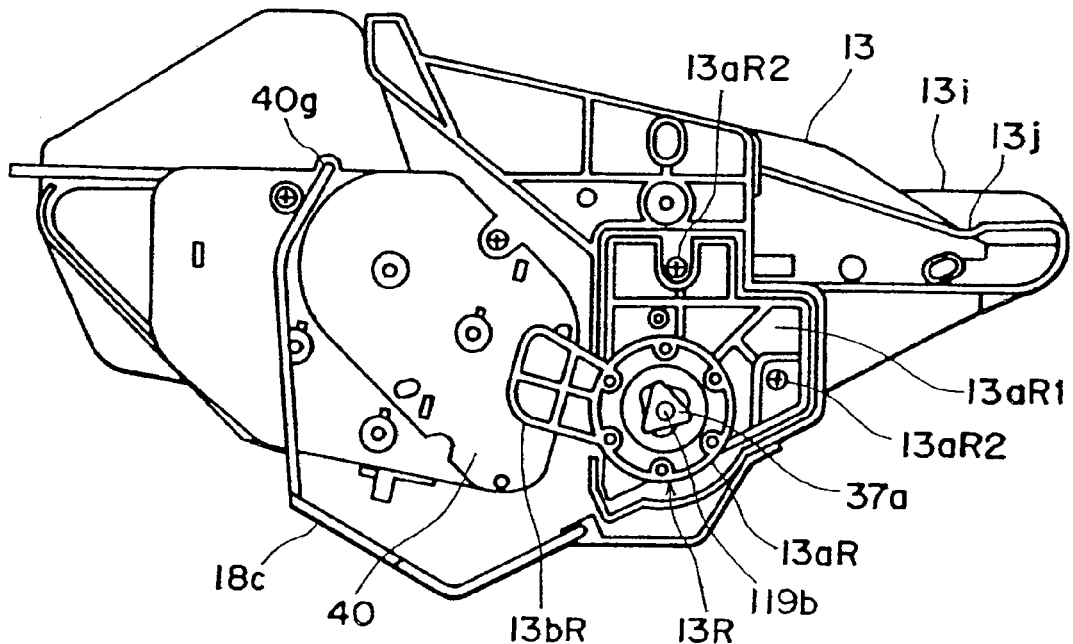
FIG. 5 is the right-hand side view of the process cartridge illustrated in FIG. 3.
Figure 6:
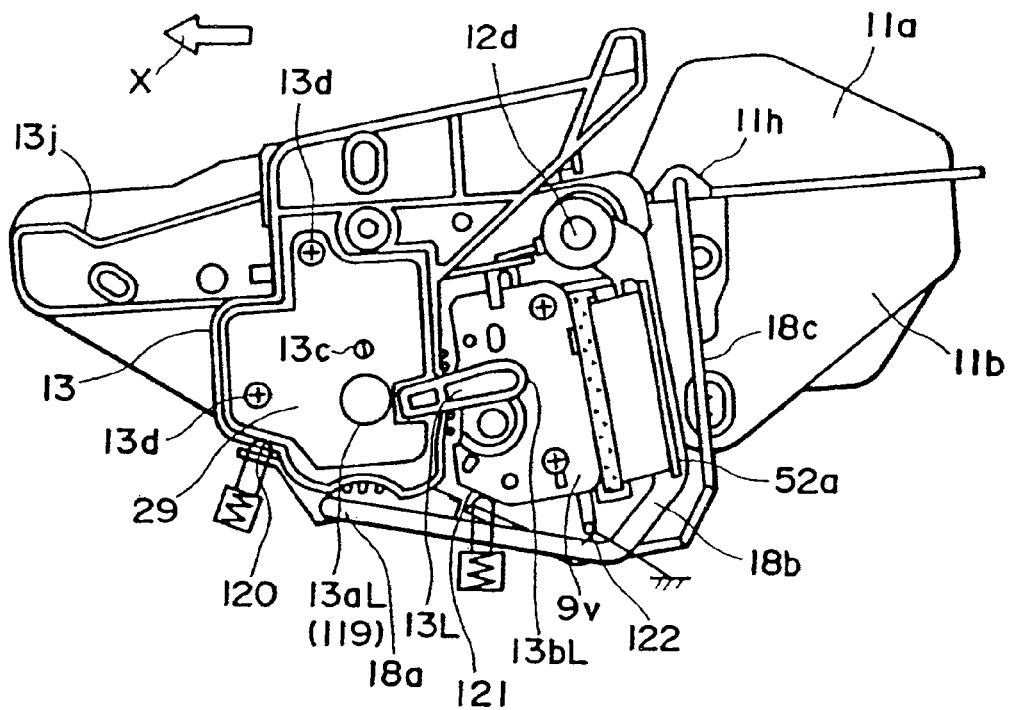
FIG. 6 is the left-hand side view of the process cartridge illustrated in FIG. 3.
Figure 7:
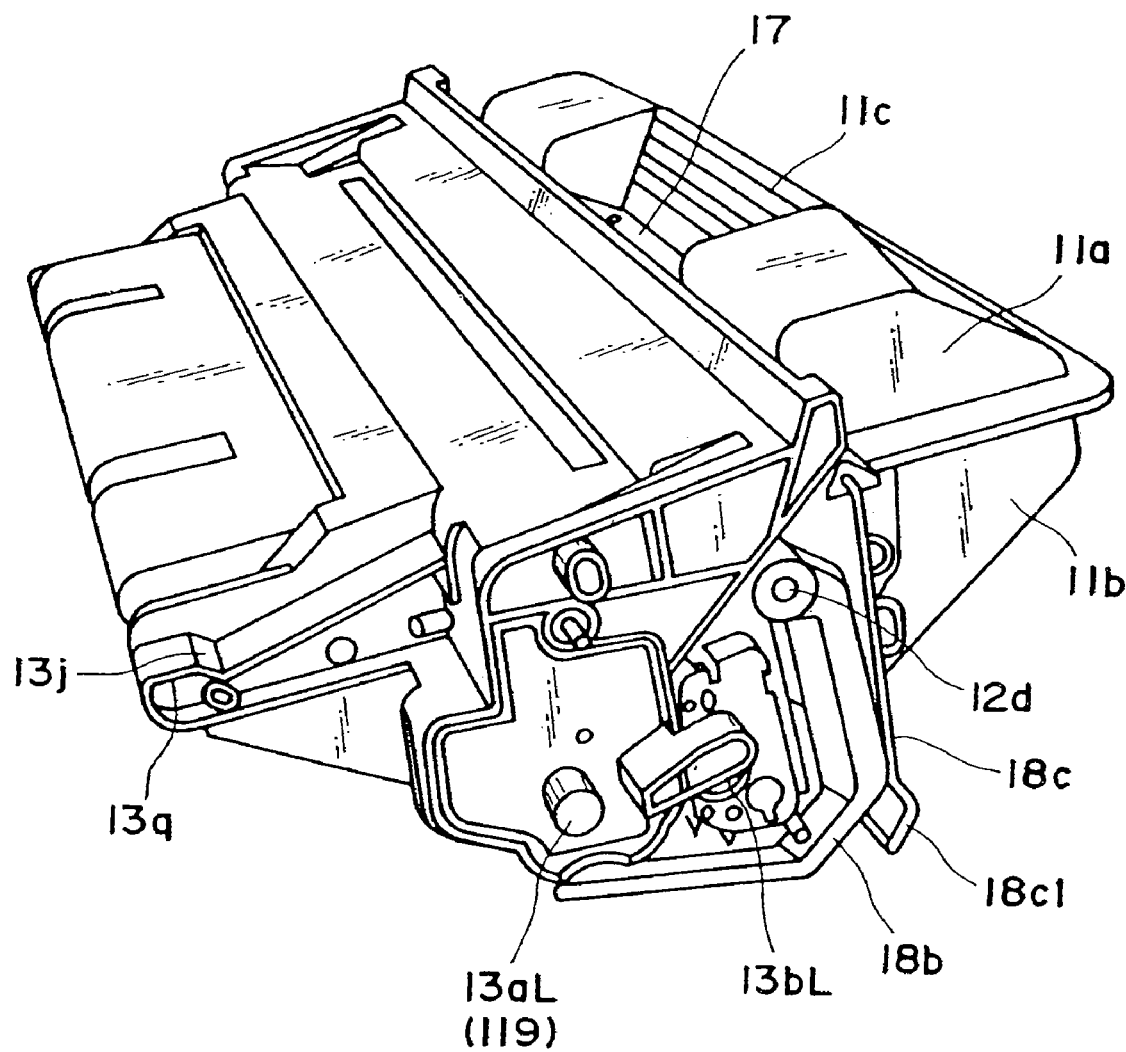
FIG. 7 is an external perspective view of the process cartridge illustrated in FIG. 3, as seen from the top left direction.
Figure 8:
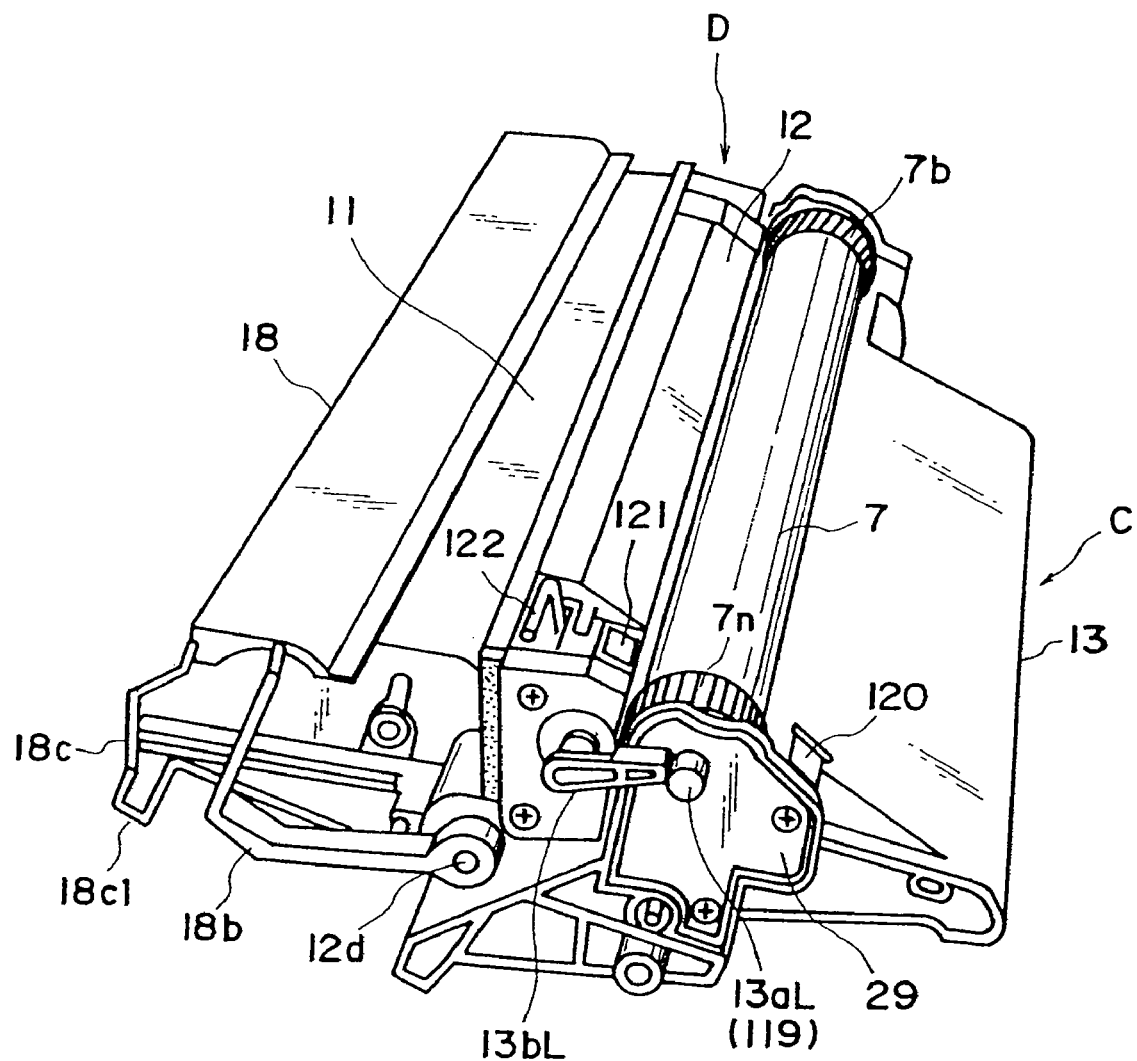
FIG. 8 is an external perspective view of the bottom left side of the process cartridge illustrated in FIG. 3.

FIG. 1 is an electrophotographic image forming apparatus (laser beam printer) which embodies the present invention, depicting the general structure thereof; FIG. 2, an external perspective thereof; and FIGS. 3-8 are drawings of process cartridges which embody the present invention. More specifically, FIG. 3 is a cross-section of a process cartridge; FIG. 4, an external perspective view of the process cartridge; FIG. 5, a right-hand side view of the process cartridge; FIG. 6, a left-hand side view of the process cartridge; FIG. 7, a perspective view of the process cartridge as seen from the top left direction; and FIG. 8 is a perspective view of the process cartridge as seen from the bottom left direction. In the following description, the "top" surface of the process cartridge B means the surface which faces upward when the process cartridge B is in the main assembly 14 of the image forming apparatus, and the "bottom" surface means the surface which faces downward. (Electrophotographic Image Forming Apparatus A and Process Cartridge B)

First, referring to FIGS. 1 and 2, a laser beam printer A as an electrophotographic image forming apparatus which embodies the present invention will be described. FIG. 3 is a cross-section of a process cartridge which also embodies the present invention.

Referring to FIG. 1, the laser beam printer A is an apparatus which forms an image on a recording medium (for example, recording sheet, OHP sheet, and fabric) through an electrophotographic image forming process. It forms a toner image on an electrophotographic photosensitive drum (hereinafter, photosensitive drum) in the form of a drum. More specifically, the photosensitive drum is charged with the use of a charging means, and a laser beam modulated with the image data of a target image is projected from an optical means onto the charged peripheral surface of the photosensitive drum, forming thereon a latent image in accordance with the image data. This latent image is developed into a toner image by a developing means. Meanwhile, a recording medium 2 placed in a sheet feeding cassette 3a is reversed and conveyed by a pickup roller 3b, a conveyer roller pairs 3c and 3d, and register roller pair 3e, in synchronism with the toner formation. Then, voltage is applied to an image transferring roller 4 as a means for transferring the toner image formed on the photosensitive drum 7 of the process cartridge B, whereby the toner image is transferred onto the recording medium 2. Thereafter, the recording medium 2, onto which the toner image has been transferred, is conveyed to a fixing means 5 by guiding conveyer 3f. The fixing means 5 has a driving roller 5c, and a fixing roller 5b containing a heater 5a, and applies heat and pressure to the recording medium 2 as the recording medium 2 is passed through the fixing means 5, so that the image having been transferred onto the recording medium 2 is fixed to the recording medium 2. Then, the recording medium 2 is conveyed farther, and is discharged into a delivery tray 6 through a reversing path 3j, by discharging roller pairs 3g, 3h and 3i. The delivery tray 6 is located at the top of the main assembly 14 of the image forming apparatus A. It should be noted here that a pivotable flapper 3k may be operated in coordination with a discharge roller pair 3m to discharge the recording medium 2 without passing it through the reversing path 3j. The pickup roller 3b, conveyer roller pairs 3c and 3d, register roller pair 3e, guiding conveyer 3f, discharge roller pairs 3g, 3h and 3i, and discharge roller pair 3m constitute a conveying means 3.

Referring to FIGS. 3-8, in the process cartridge B, on the other hand, the photosensitive drum 7 with a photosensitive layer 7e (FIG. 11) is rotated to uniformly charge its surface by applying voltage to the charging roller 8 as a photosensitive drum charging means. Then, a laser beam modulated with the image data is projected onto the photosensitive drum 7 from the optical system 1 through an exposure opening 1e, forming a latent image on the photosensitive drum 7. The thus formed latent image is developed with the use of toner and the developing means 9. More specifically, the charging roller 8 is disposed in contact with the photosensitive drum 7 to charge the photosensitive drum 7. It is rotated by the rotation of the photosensitive drum 7. The developing means 9 provides the peripheral surface area (area to be developed) of the photosensitive drum 7 with toner so that the latent image formed on the photosensitive drum 7 is developed. The optical system 1 comprises a laser diode 1a, a polygon mirror 1b, a lens 1c, and a deflective mirror 1d (FIG. 1).

In the developing means 9, the toner contained in a toner container 11A is delivered to a developing roller 9c by the rotation of a toner feeding member 9b. The developing roller 9c contains a stationary magnet. It is also rotated so that a layer of toner with triboelectric charge is formed on the peripheral surface of the developing roller 9c. The image developing area of the photosensitive drum 7 is provided with the toner from this toner layer, the toner is transferred onto the peripheral surface of the photosensitive drum 7 in a manner to reflect the latent image, visualizing the latent image as a toner image. The developing blade 9d is a blade which regulates the amount of the toner adhered to the peripheral surface of the developing roller 9c and also triboelectrically charges the toner. Adjacent to the developing roller 9c, a toner stirring member 9e is rotatively disposed to circulatively stir the toner within the image developing chamber.

After the toner image formed on the photosensitive drum 7 is transferred onto the recording medium 2 by applying voltage with polarity opposite to that of the toner image to the image transferring roller 4, the residual toner on the photosensitive drum 7 is removed by the cleaning means 10. The cleaning means 10 comprises an elastic cleaning blade 10a disposed in contact with the photosensitive drum 7, and the toner remaining on the photosensitive drum 7 is scraped off by the elastic cleaning blade 10a, being collected into a waste toner collector 10b.

The process cartridge B is formed in the following manner. First, a toner chamber frame 11, which comprises a toner container (toner storing portion) 11A for storing toner, is joined with an image developing chamber frame 12 which houses the image developing means 9 such as an image developing roller 9c, and then, a cleaning chamber frame 13, in which the photosensitive drum 7, the cleaning means 10 such as the cleaning blade 10a, and the charging roller 8 are mounted, is joined with the preceding two frames 11 and 12 to complete the process cartridge B. The thus formed process cartridge B is removably installable into the main assembly 14 of the image forming apparatus A.

The process cartridge B is provided with an exposure opening through which a light beam modulated with image data is projected onto the photosensitive drum 7, and a transfer opening 13n through which the photosensitive drum 7 opposes the recording medium 2. The exposure opening 1e is a part of the cleaning chamber frame 13 and the transfer opening 13 is located between the image developing chamber frame 12 and the cleaning chamber frame 13.

Next, the structure of the housing of the process cartridge B in this embodiment will be described.

The process cartridge in this embodiment is formed in the following manner. First the toner chamber frame 11 and the image developing chamber frame 12 are joined, and then, the cleaning chamber frame 13 is rotatively joined with the preceding two frames 11 and 12 to complete the housing. In this housing, the aforementioned photosensitive drum 7, charging roller 8, developing means 9, cleaning means 10, and the like, are mounted to complete the process cartridge B. The thus formed process cartridge B is removably installable into the cartridge accommodating means provided in the main assembly 14 of an image forming apparatus.

(Housing Structure of Process Cartridge B)

As described above, the housing of the process cartridge B in this embodiment is formed by joining the toner chamber frame 11, the image developing chamber frame 12, and the cleaning chamber frame 13. Next, the structure of the thus formed housing will be described.

Figure 13:
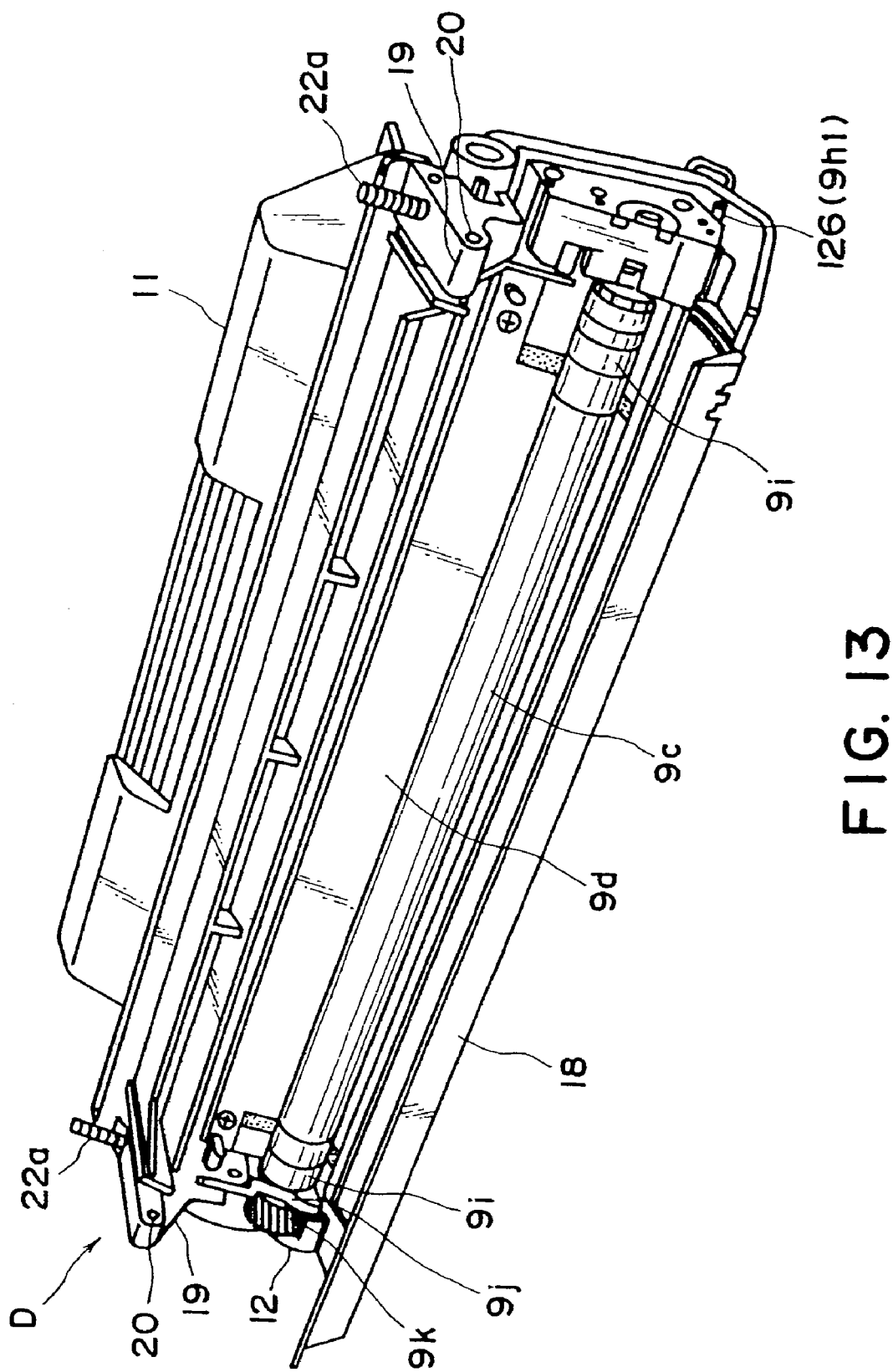
FIG. 13 is a perspective view of an image developing unit.
Figure 19:
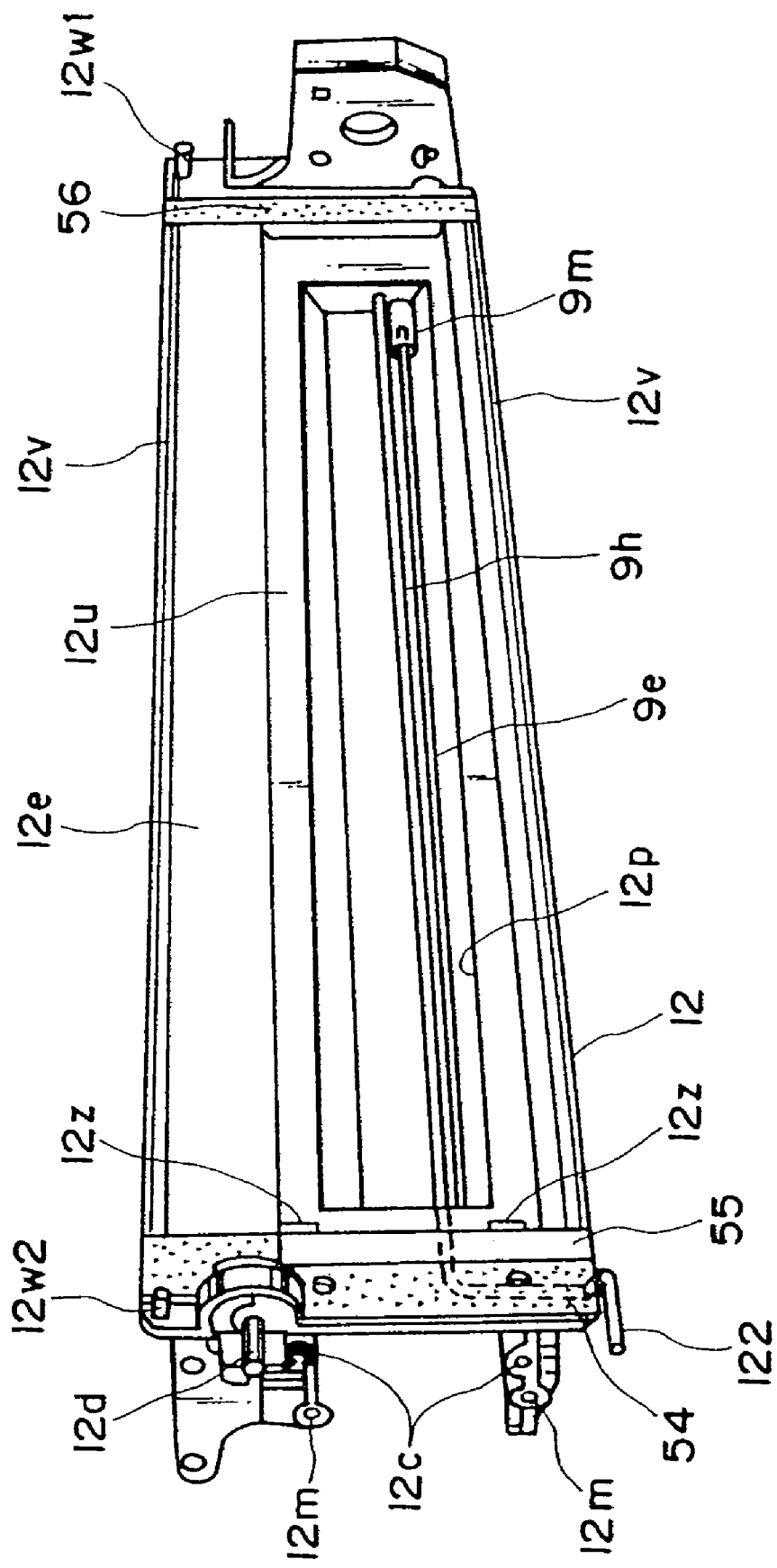
FIG. 19 is a perspective view of the image developing chamber frame.
Figure 20:
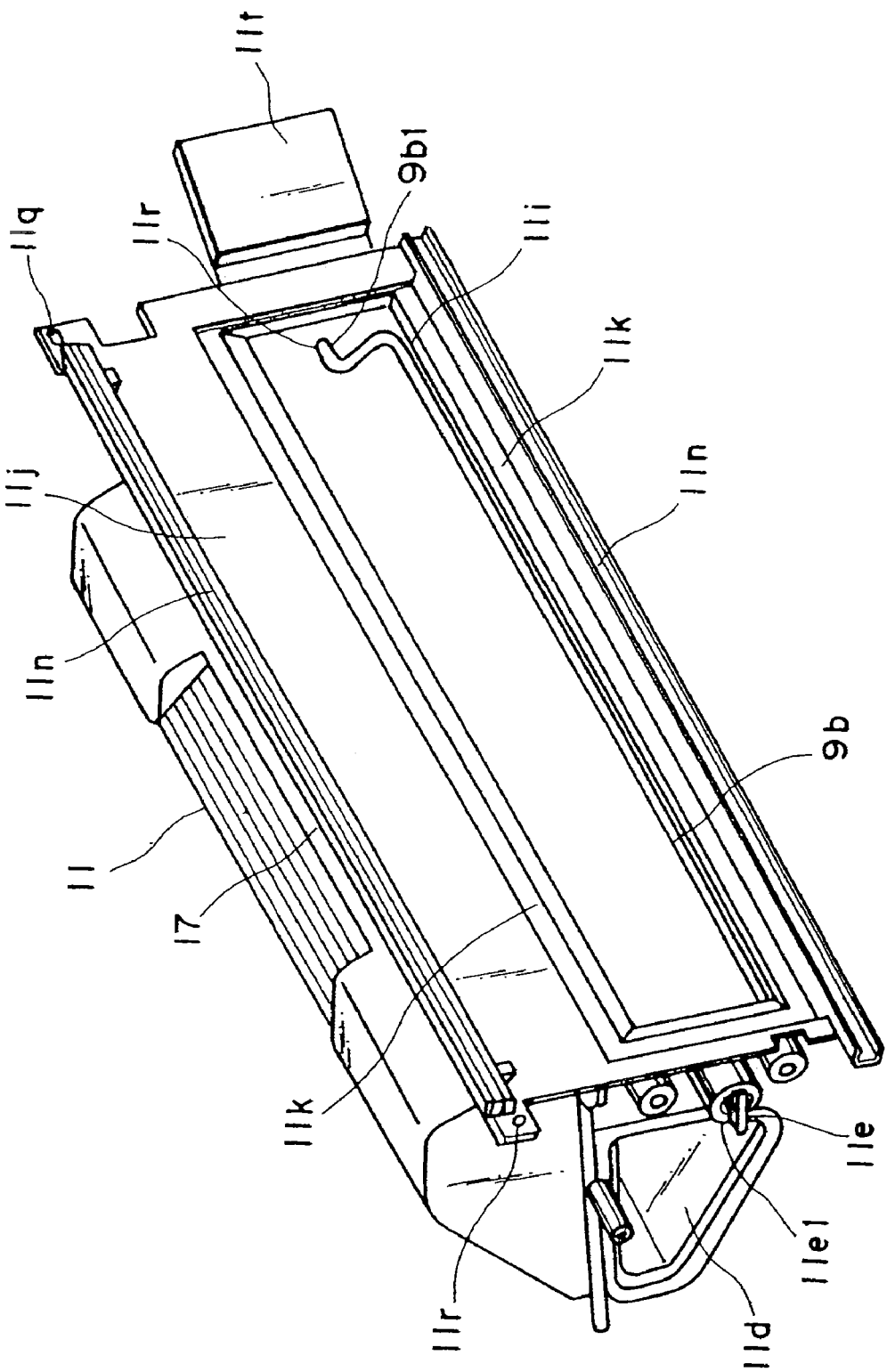
FIG. 20 is a perspective view of the toner chamber frame.

Referring to FIGS. 3 and 20, in the toner chamber frame 11, the toner feeding member 9b is rotatively mounted. In the image developing chamber frame 12, the image developing roller 9c and the developing blade 9d are mounted, and adjacent to the developing roller 9c, the stirring member 9e is rotatively mounted to circulatively stir the toner within the image developing chamber. Referring to FIGS. 3 and 19, in the image developing chamber frame 12, a rod antenna 9h is mounted, extending in the lengthwise direction of the developing roller 9c substantially in parallel to the developing roller 9c. The toner chamber frame 11 and the development chamber frame 12, which are equipped in the above-described manner, are welded together (in this embodiment, by ultrasonic wave) to form a second frame which constitutes an image developing unit D (FIG. 13).

The image developing unit of the process cartridge B is provided with a drum shutter assembly 18, which covers the photosensitive drum 7 to prevent it from being exposed to light for an extended period of time or from coming in contact with foreign objects when or after the process cartridge B is removed from the main assembly 14 of an image forming apparatus.

Referring to FIG. 6, the drum shutter assembly 18 has a shutter cover 18a which covers or exposes the transfer opening 13n illustrated in FIG. 3, and linking members 18b and 18c which support the shutter cover 18a. On the upstream side relative to the direction in which the recording medium 2 is conveyed, one end of the right-hand side linking member 18c is fitted in a hole 40g of a developing means gear holder 40 as shown in FIGS. 4 and 5, and one end of the left-hand side linking member 18c is fitted in a boss 11h of the bottom portion 11b of the toner chamber frame 11. The other ends of the left and right-hand linking members 18c are attached to the corresponding lengthwise ends of the shutter cover 18a, on the upstream side relative to the recording medium conveying direction. The linking member 18c is made of metallic rod. Actually, the left- and right-hand linking members 18c are connected through the shutter cover 18a; in other words, the left- and right-hand linking members 18c are the left- and right-hand ends of a single piece linking member 18c. The linking member 18b is provided only on one lengthwise end of the shutter cover 18a. One end of the linking member 18b is attached to the shutter cover 18a, on the downstream side, relative to the recording medium conveying direction, of the position at which the linking member 18c is attached to the shutter cover 18a, and the other end of the linking member 18b is fitted around a dowel 12d of the image development chamber frame 12. The linking member 18b is formed of synthetic resin.

The linking members 18b and 18c, which are different in length, form a four piece linkage structure in conjunction with the shutter cover 18a and the toner chamber frame 11. As the process cartridge B is inserted into an image forming apparatus, the portion 18cl of the linking member 18c, which projects away from the process cartridge B, in contact with the stationary contact member (unillustrated) provided on the lateral wall of the cartridge accommodating space S of the main assembly 14 of the image forming apparatus, and activates the drum shutter assembly 18 to open the shutter cover 18a.

The drum shutter assembly 18, constituted of the shutter cover 18a and the linking members 18b and 18c, is loaded with the pressure from an unillustrated torsional coil spring fitted around a dowel 12d. One end of the spring is anchored to the linking member 18b, and the other end is anchored to the image developing chamber frame 12, so that the pressure is generated in the direction to cause the shutter cover 18a to cover the transfer opening 13n.

Referring again to FIGS. 3 and 12, the cleaning means frame 13 is fitted with the photosensitive drum 7, the charging roller 8, and the various components of the cleaning means 10, to form a first frame as a cleaning unit C (FIG. 12).

Figure 12:
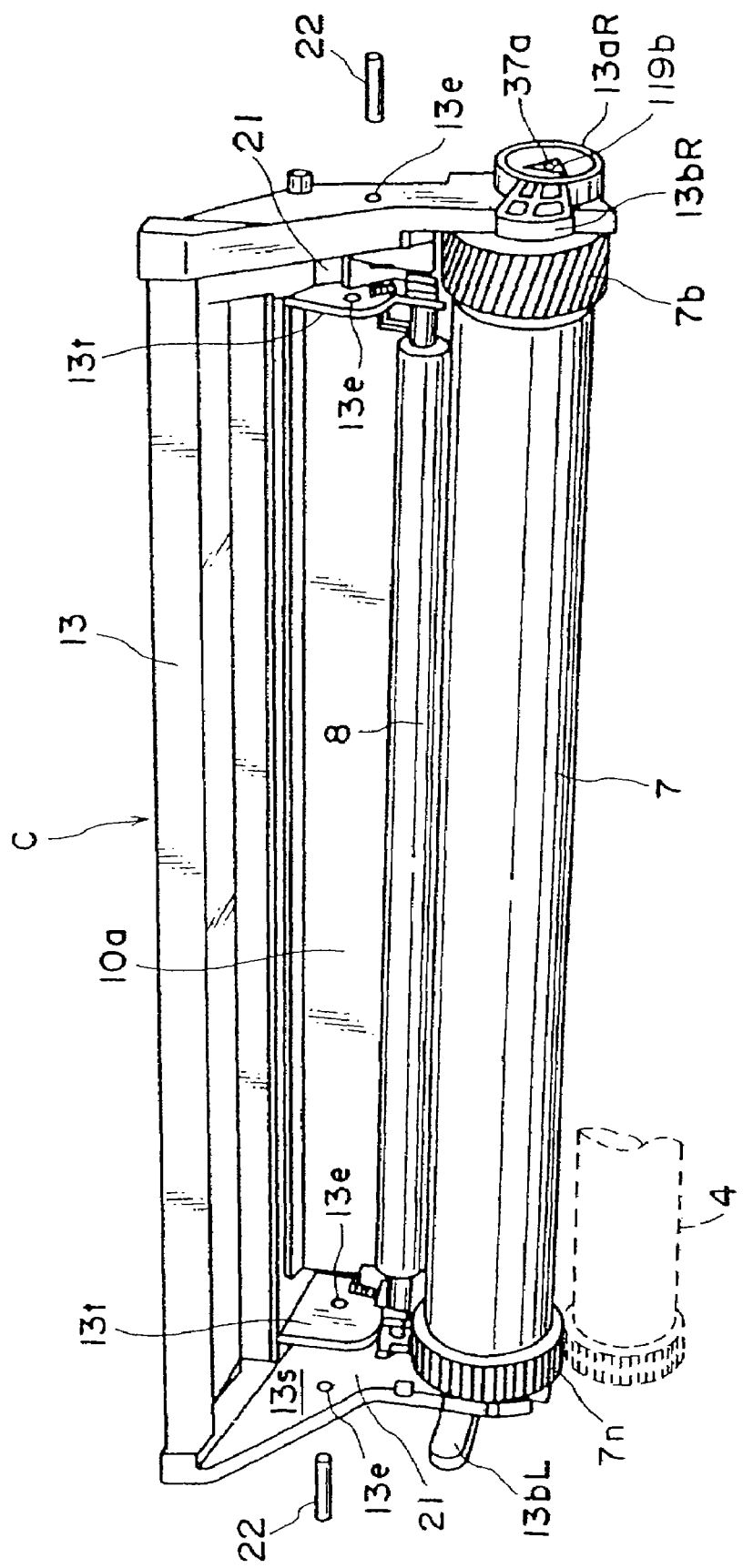
FIG. 12 is a perspective view of a cleaning unit.

Then, the aforementioned image developing unit D and cleaning unit C are joined with the use of a joining member 22, in a mutually pivotable manner, to complete the process cartridge B. More specifically, referring to FIG. 13, both lengthwise (axial direction of the developing roller 9c) ends of the image developing chamber frame 12 are provided with an arm portion 19, which is provided with a round hole 20 which is in parallel to the developing roller 9c. On the other hand, a recessed portion 21 for accommodating the arm portion 19 is provided at each lengthwise end of the cleaning chamber frame (FIG. 12). The arm portion 19 is inserted in this recessed portion 21, and the joining member 22 is pressed into the mounting hole 13e of the cleaning chamber frame 13, put through the hole 20 of the end portion of the arm portion 19, and pressed, farther, into the hole 13e of an partitioning wall 13t, so that the image developing unit D and the cleaning unit C are joined to be pivotable relative to each other about the joining member 22. In joining the image developing unit D and the cleaning unit C, a compression type coil spring 22a is placed between the two units, with one end of the coil spring being fitted around an unillustrated dowel erected from the base portion of the arm portion 19, and the other end being pressed against the top wall of the recessed portion 21 of the cleaning chamber frame 13. As a result, the image developing chamber frame 12 is pressed downward to reliably keep the developing roller 9c pressed downward toward the photosensitive drum 7. More specifically, referring to FIG. 13, a roller 9i having a diameter larger than that of the developing roller 9c is attached to each lengthwise end of the developing roller 9c, and this roller 9i is pressed on the photosensitive drum 7 to maintain a predetermined gap (approximately 300 μm) between the photosensitive drum 7 and the developing roller 9c. The top surface of the recessed portion 2i of the cleaning chamber frame 13 is slanted so that the compression type coil spring 22a is gradually compressed when the image developing unit D and the cleaning unit C are united. That is, the image developing unit D and the cleaning unit C are pivotable toward each other about the joining member 22, wherein the positional relationship (gap) between the peripheral surface of the photosensitive drum 7 and the peripheral surface of the developing roller 9c is precisely maintained by the elastic force of the compression type coil spring 22a.

Since the compression type coil spring 22a is attached to the base portion of the arm portion 19 of the image developing chamber frame 12, the elastic force of the compression type coil spring 22a affects only the base portion of the arm portion 19. In a case in which the image developing chamber frame 12 is provided with a dedicated spring mount for the compression type coil spring 22a, the adjacencies of the spring seat must be reinforced to precisely maintain the predetermined gap between the photosensitive drum 7 and the developing roller 9c. However, with the placement of the compression type coil spring 22a in the above described manner, it is unnecessary to reinforce the adjacencies of the spring seat, that is, the adjacencies of the base portion of the arm portion 19. In the case of this embodiment, because the base portion of the arm portion 19 is inherently greater in strength and rigidity.

The above described structure which holds together the cleaning chamber frame 13 and the image developing chamber frame 12 will be described later in more detail.

(Structure of Process Cartridge B Guiding Means)

Figure 9:
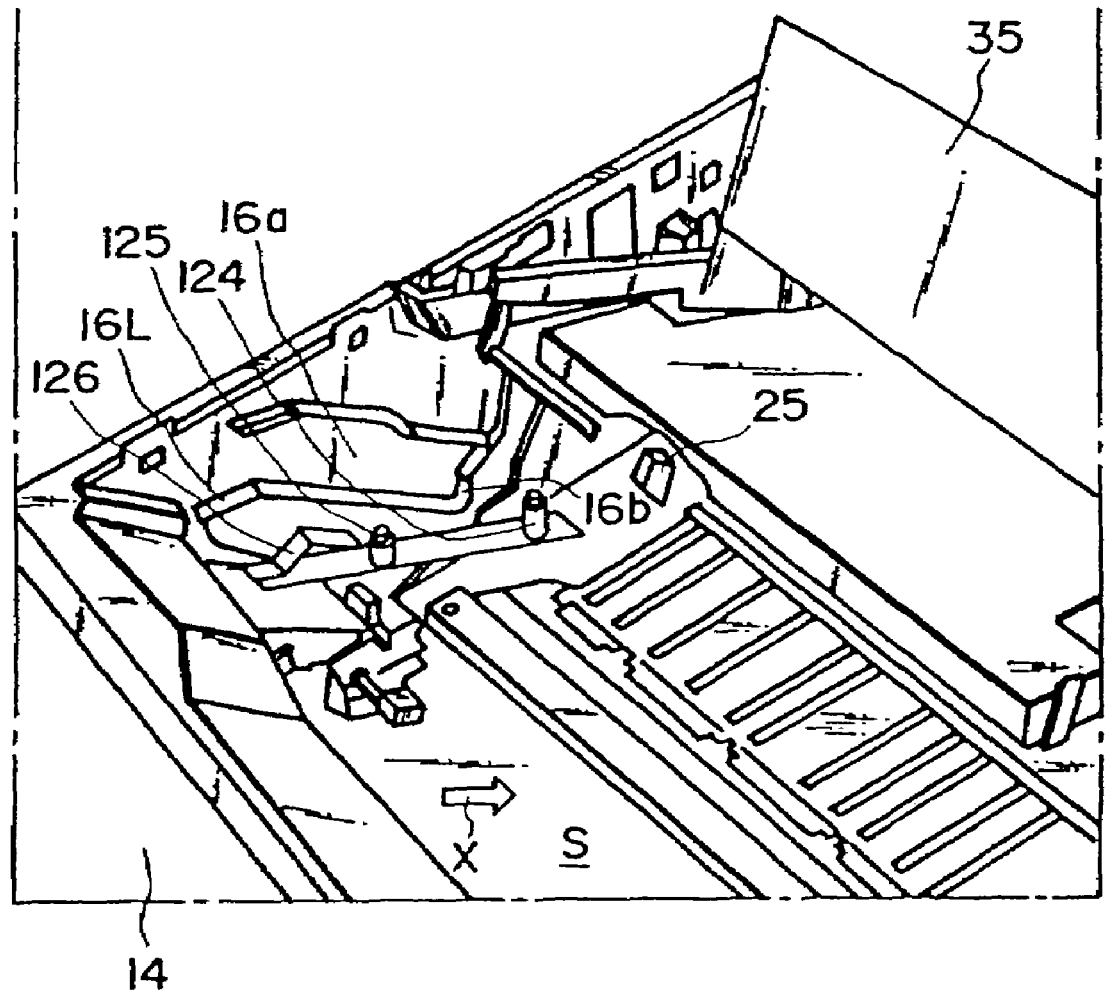
FIG. 9 is an external perspective view of the process cartridge accommodating portion of the main assembly of the apparatus illustrated in FIG. 1.
Figure 10:
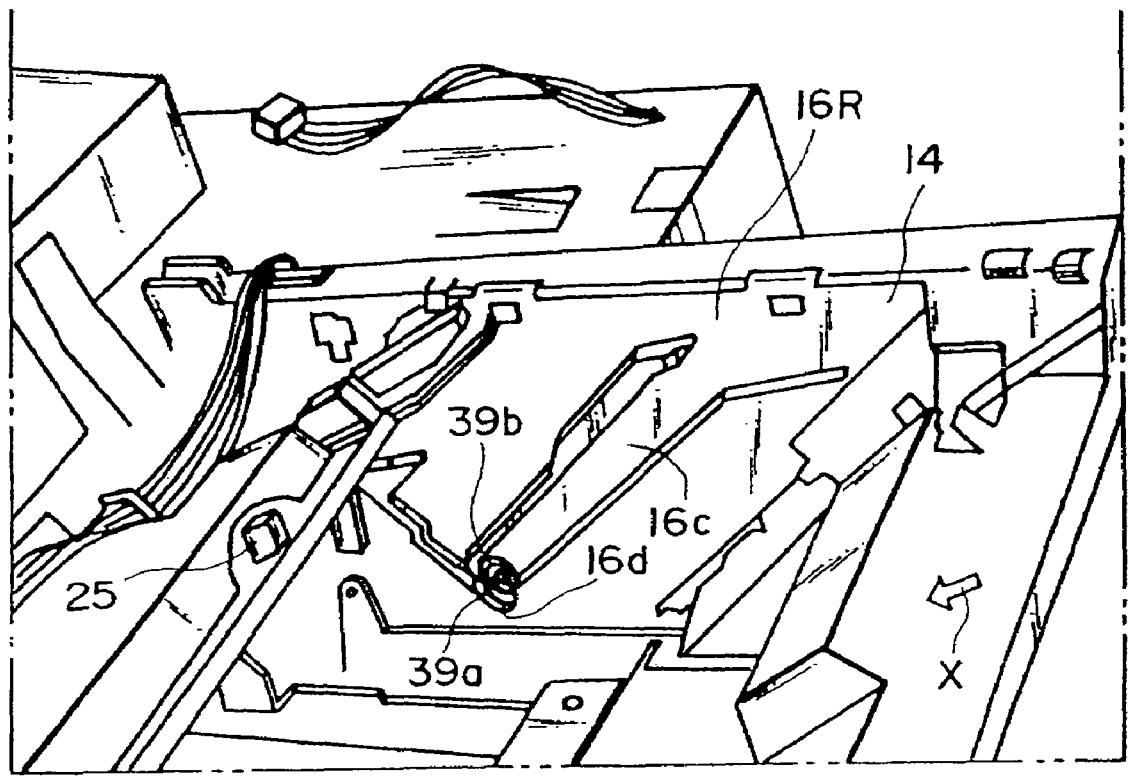
FIG. 10 is an external perspective view of the process cartridge accommodating portion of the main assembly of the apparatus illustrated in FIG. 1.

Next, the means for guiding the process cartridge B when the process cartridge B is installed into, or removed from, the main assembly 14 of an image forming apparatus will be described. This guiding means is illustrated in FIGS. 9 and 10. FIG. 9 is a perspective view of the left-hand side of the guiding means, as seen (in the direction of an arrow mark X) from the side from which the process cartridge B is installed into the main assembly 14 of the image forming apparatus A (as seen from the side of the image developing unit D side). FIG. 10 is a perspective view of the right-hand side of the same, as seen from the same side.

Referring to FIGS. 4, 5, 6 and 7, each lengthwise end of the cleaning frame portion 13 is provided with means which serves as a guide when the process cartridge B is installed into, or removed from, the apparatus main assembly 14. This guiding means is constituted of a cylindrical guides 13aR and 13aL as a cartridge positioning guiding member, and rotation controlling guides 13bR and 13bL as means for controlling the attitude of the process cartridge B when the process cartridge B is installed or removed.

As illustrated in FIG. 5, the cylindrical guide 13aR is a hollow cylindrical member. The rotation controlling guides 13bR is integrally formed together with the cylindrical guide 13aR, and radially protrudes from the peripheral surface of the cylindrical guide 13aR. The cylindrical guide 13aR is provided with a mounting flange 13aR1 which is also integral with the cylindrical guide 13aR. Thus, the cylindrical guide 13aR, the rotation controlling guide 13bR, and the mounting flange 13aR1 constitute the right-hand side guiding member 13R, which is fixed to the cleaning chamber frame 13 with small screws 13aR2 put through the screw holes of the mounting flange 13aR1. With the right-hand side guiding member 13R being fixed to the cleaning chamber frame 13, the rotation controlling guide 13bR extends over the lateral wall of the developing means gear holder 40 fixed to the image developing chamber frame 12.

Figure 11:
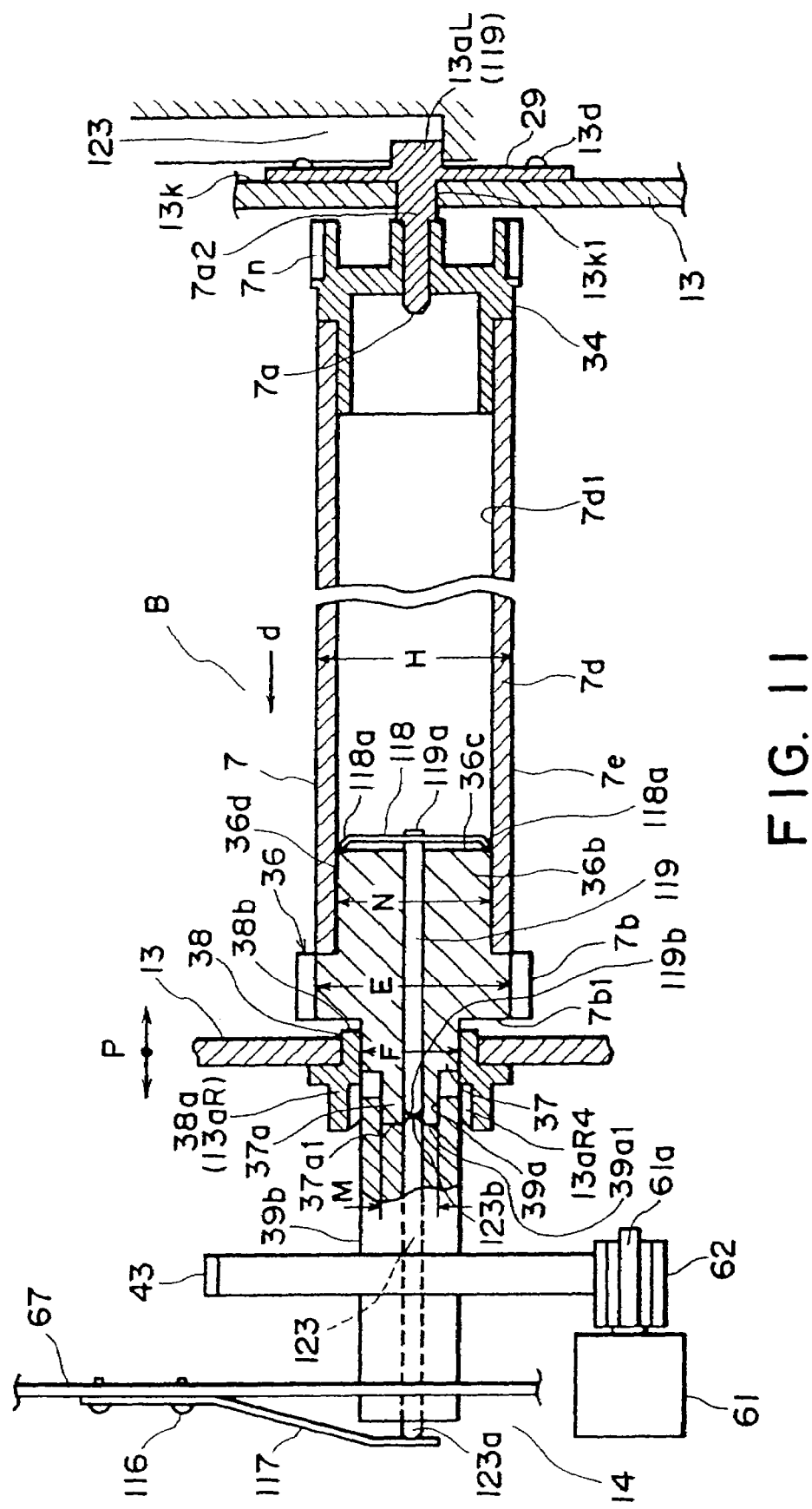
FIG. 11 is a vertical section of a photosensitive drum and a driving mechanism for driving the photosensitive drum.

Referring to FIG. 11, a drum shaft member is constituted of a drum shaft portion 7a inclusive of a larger diameter portion 7a2, a disk-shaped flange portion 29 and a cylindrical guide portion 13aL. The larger diameter portion 7a2 is fitted in the hole 13k1 of the cleaning frame portion 13. The flange portion 29 is engaged with a positioning pin 13c projecting from the side wall of the lengthwise end wall of the cleaning frame portion 13, being prevented from rotating, and is fixed to the cleaning frame portion 13 with the use of small screws 13d. The cylindrical guide 13aL projects outward (toward front, that is, the direction perpendicular to the page of FIG. 6). The aforementioned stationary drum shaft 7a which rotatively supports a spur gear 7n fitted around the photosensitive drum 7 projects inwardly from the flange 29 (FIG. 11). The cylindrical guide 13aL and the drum shaft 7a are coaxial. The flange 29, the cylindrical guide 13aL, and the drum shaft 7a, are integrally formed of metallic material such as steel.

Referring to FIG. 6, there is a rotation controlling guide 13bL slightly away from the cylindrical guide 13aL. It is long and narrow, extending substantially in the radial direction of the cylindrical guide 13aL and also projecting outward from the cleaning chamber frame 13. It is integrally formed with the cleaning chamber frame 13. In order to accommodate this rotation controlling guide 13bL, the flange 29 is provided with a cutaway portion. The distance the rotation controlling guide 13bL projects outward is such that its end surface is substantially even with the end surface of the cylindrical guide 13aL. The rotation controlling guide 13bL extends over the side wall of the developing roller bearing box 9v fixed to the image developing chamber frame 12. As is evident from the above description, the lefthand side guiding member 13L is constituted of two separate pieces: the metallic cylindrical guide 13aL and the rotation controlling guide 13bL of synthetic resin.

Next, a regulatory contact portion 13j, which is a part of the top surface of the cleaning chamber frame 13, will be described. In the following description of the regulatory contact portion 13j, "top surface" means the surface which faces upward when the process cartridge B is in the main assembly 14 of an image forming apparatus.

Figure 30A:
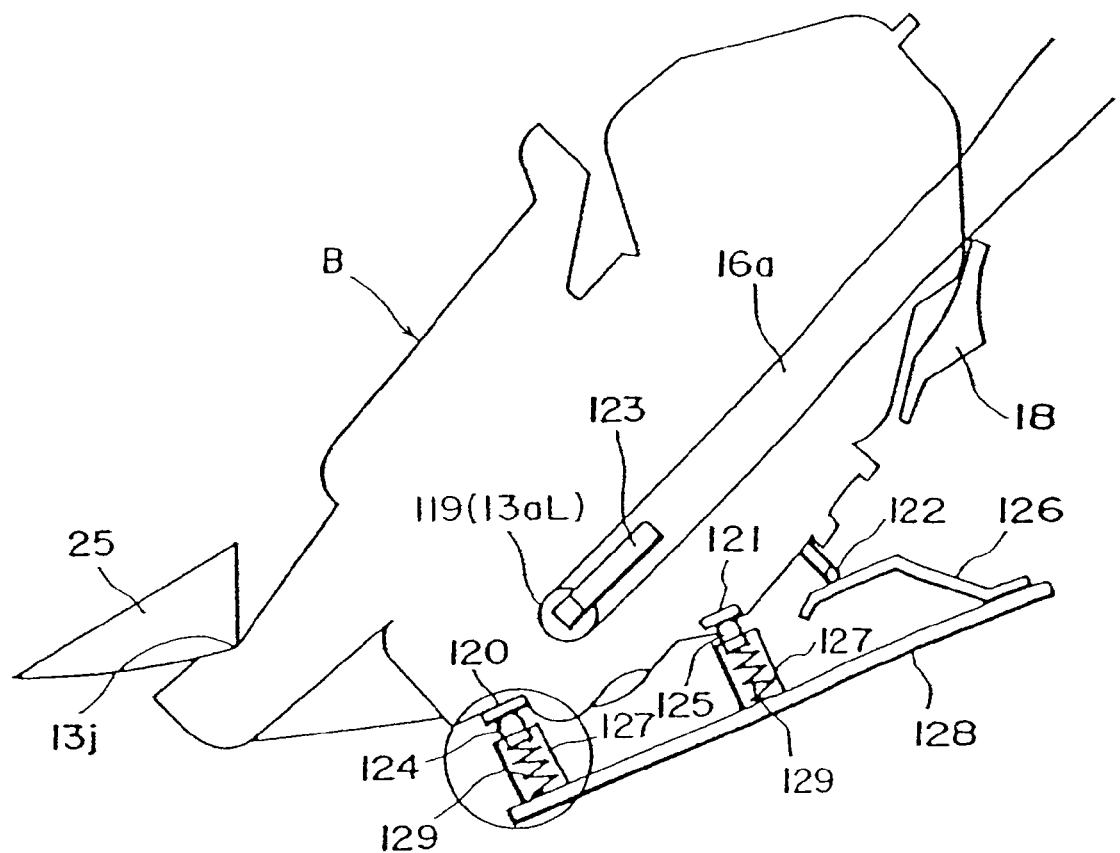
FIG. 30A is a vertical view of the process cartridge in the apparatus main assembly and the adjacencies thereof, depicting the positional relationship among the electrical contacts as seen while the process cartridge is installed into, or removed from, the apparatus main assembly.
Figure 30B:
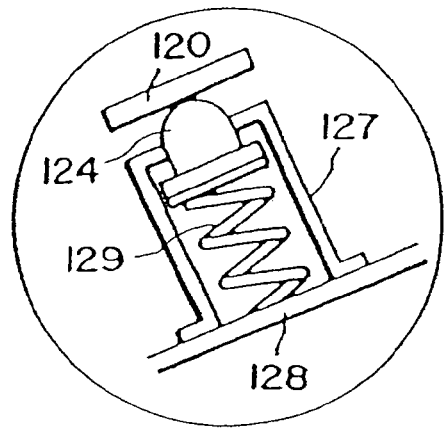
FIG. 30B is a detailed view thereof.

Referring to FIGS. 4-7, two portions 13j of the top surface 13i of the cleaning unit C, which are the portions right next to the right and left front corners 13p and 13q, relative to the direction perpendicular to the direction in which the process cartridge B is inserted, constitute the regulatory contact portions 13j, which regulate the position and attitude of the process cartridge B when the cartridge B is installed into the main assembly 14. In other words, when the process cartridge B is installed into the main assembly 14, the regulatory contact portion 13j comes in contact with the fixed contact member 25 provided in the main assembly 14 of an image forming apparatus (FIGS. 9, 10 and 30), and regulates the rotation of the process cartridge B about the cylindrical guide 13aR and 13aL.

Next, the guiding means on the main assembly side 14 will be described. Referring to FIG. 1, as the lid 35 of the main assembly 14 of an image forming apparatus is pivotally opened about a supporting point 35a in the counterclockwise direction, the top portion of the main assembly 14 is exposed, and the process cartridge accommodating portion appears as illustrated in FIGS. 9 and 10. The left and right internal walls of the image forming apparatus main assembly 14, relative to the direction in which the process cartridge B is inserted, are provided with guide members 16L (FIG. 9) and 16R (FIG. 10), respectively, which extend diagonally downward from the side opposite to the supporting point 35a.

As shown in the drawings, the guide members 16L and 16R comprise guide portions 16a and 16c, and positioning grooves 16b and 16d connected to the guide portions 16a and 16c, respectively. The guide portions 16a and 16c extend diagonally downward, as seen from the direction indicated by an arrow mark X, that is, the direction in which the process cartridge B is inserted. The positioning grooves 16b and 16d have a semicircular cross-section which perfectly matches the cross-section of the cylindrical guides 13aL or 13aR of the process cartridge B. After the process cartridge B is completely installed in the apparatus main assembly 14, the centers of semicircular cross-sections of the positioning groove 16b and 16d coincide with the axial lines of the cylindrical guides 13aL and 13aR, respectively, of the process cartridge B, and hence, with the axial line of the photosensitive drum 7.

The width of the guide portions 16a and 16c as seen from the direction in which the process cartridge B is installed or removed is wide enough to allow the cylindrical guides 13aL and 13aR to ride on them with a reasonable amount of play. Therefore, the rotation controlling guide 13bL and 13bR which are narrower than the diameter of the cylindrical guide 13aL and 13aR naturally fit more loosely in the guide portions 16a and 16c than the cylindrical guides 13aL and 13aR, respectively, yet their rotation is controlled by the guide portions 16a and 16c. In other words, when the process cartridge B is installed, the angle of the process cartridge B is kept within a predetermined range. After the process cartridge B is installed in the image forming apparatus main assembly 14, the cylindrical guides 13aL and 13aR of the process cartridge B are in engagement with the positioning grooves 16b and 16d of the guiding members 16L and 16R, and the left and right regulatory contact portions 13j located at the front portion, relative to the cartridge inserting direction, of the cleaning chamber frame 13 of the process cartridge B, are in contact with the fixed positioning members 25, respectively.

The weight distribution of the process cartridge B is such that when the line which coincides with the axial lines of the cylindrical guide 13aL and 13aR is level, the image developing unit D side of the process cartridge B generates a larger moment about this line than the cleaning unit C side.

The process cartridge B is installed into the image forming apparatus main assembly 14 in the following manner. First, the cylindrical guides 13aL and 13aR of the Process cartridge B are inserted into the guide portion 16a and 16c, respectively, of the cartridge accommodating portion in the image forming apparatus main assembly 14 by grasping the recessed portion 17 and ribbed portion 11c of the process cartridge B with one hand, and the rotation controlling guides 13bL and 13bR are also inserted into the guide portions 16a and 16c, tilting-downward the front portion, relative to the inserting direction, of the process cartridge B. Then, the process cartridge B is inserted farther with the cylindrical guides 13aL and 13aR and the rotation controlling guides 13bL and 13bR of the process cartridge B following the guide portions 16a and 16c, respectively, until the cylindrical guides 13aL and 13aR reach the positioning grooves 16b and 16d of the image forming apparatus main assembly 14. Then, the cylindrical guides 13aL and 13aR become seated in the positioning grooves 16b and 16d, respectively, due to the weight of the process cartridge B itself the cylindrical guides 13aL and 13aR of the process cartridge B are accurately positioned relative to the positioning grooves 16b and 16d. In this condition, the line which coincides with the axial lines of the cylindrical guides 13aL and 13aR also coincides with the axial line of the photosensitive drum 7, and therefore, the photosensitive drum 7 is reasonably accurately positioned relative to the image forming apparatus main assembly 14. It should be noted here that the final positioning of the photosensitive drum 7 relative to the image forming apparatus main assembly 14 occurs at the same time as the coupling between the two is completed.

Also in this condition, there is a slight gap between the stationary positioning member 25 of the image forming apparatus main assembly 14 and the regulatory contact portion 13j of the process cartridge B. At this point of time, the process cartridge B is released from the hand. Then, the process cartridge B rotates about the cylindrical guides 13aL and 13aR in the direction to lower the image developing unit D side and raise the cleaning unit C side until the regulatory contact portions 13j of the process cartridge B come in contact with the corresponding stationary positioning members 25. As a result, the process cartridge B is accurately positioned relative to the image forming apparatus main assembly 14. Thereafter, the lid 35 is closed by rotating it clockwise about the supporting point 35a.

In order to remove the process cartridge B from the apparatus main assembly 14, the above described steps are carried out in reverse. More specifically, first, the lid 35 of the apparatus main assembly 14 is opened, and the process cartridge B is pulled upward by grasping the aforementioned top and bottom ribbed portions 11c, that is, the handhold portions, of the process cartridge by hand. Then, the cylindrical guides 13aL and 13aR of the process cartridge B rotate in the positioning grooves 16b and 16d of the apparatus main assembly 14. As a result, the regulatory contact portions 13j of the process cartridge B separate from the corresponding stationary positioning member 25. Next, the process cartridge B is pulled more. Then, the cylindrical guides 13aL and 13aR come out of the positioning grooves 16b and 16d, and move into the guide portions 16a and 16c of the guiding member 16L and 16R, respectively, fixed to the apparatus main assembly 14. In this condition, the process cartridge B is pulled more. Then, the cylindrical guides 13aL and 13aR and the rotation controlling guides 13bL and 13bR of the process cartridge B slide diagonally upward through the guide portions 16a and 16c of the apparatus main assembly 14, with the angle of the process cartridge B being controlled so that the process cartridge B can be completely moved out of the apparatus main assembly 14 without making contact with the portions other than the guide portions 16a and 16c.

Referring to FIG. 12, the spur gear 7n is fitted around one of the lengthwise ends of the photosensitive drum 7, which is the end opposite to where the helical drum gear 7b is fitted. As the process cartridge B is inserted into the apparatus main assembly 14, the spur gear 7n meshes with a gear (shown in phantom) coaxial with the image transferring roller 4 located in the apparatus main assembly, and transmits from the process cartridge B to the transferring roller 4 the driving force which rotates the transferring roller 4.

(Toner Chamber Frame)

Figure 21:
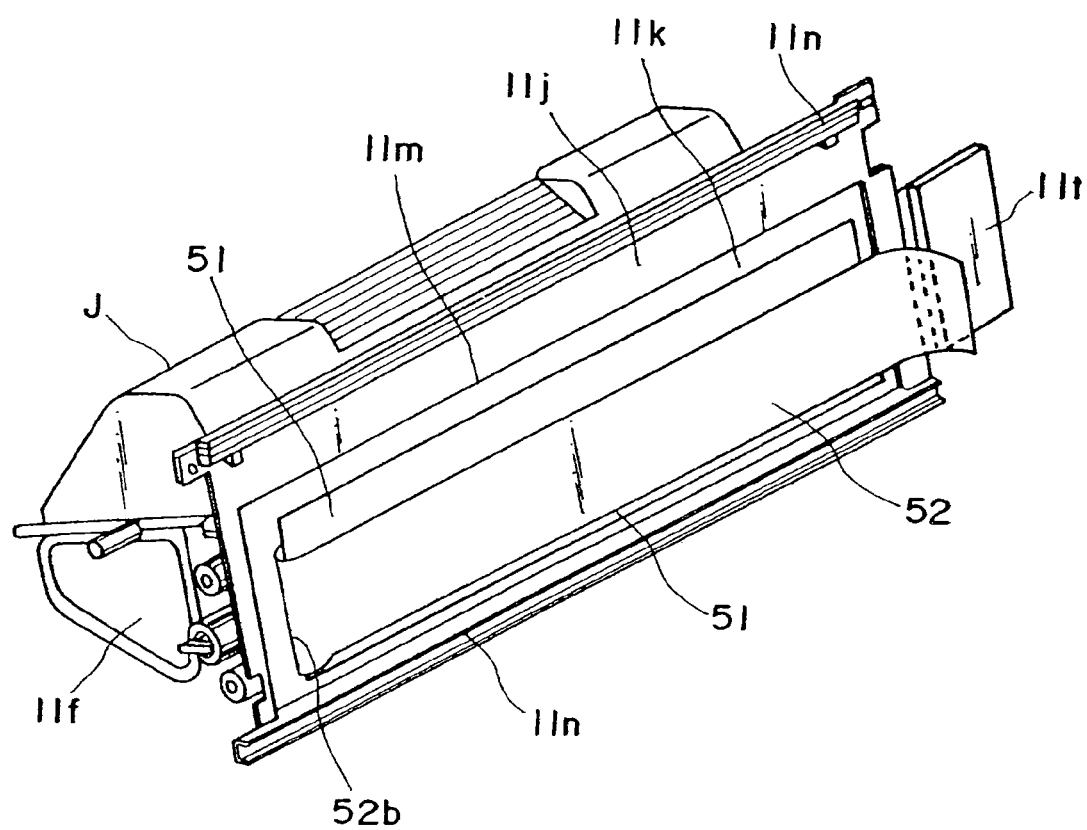
FIG. 21 is a perspective view of the toner chamber frame.

Referring to FIGS. 3, 5, 7, 16, 20 and 21, the toner chamber frame will be described in detail. FIG. 20 is a perspective view of the toner chamber frame as seen before a toner seal is welded on, and FIG. 21 is a perspective view of the toner chamber frame after toner is fitted in.

Referring to FIG. 3, the toner chamber frame 11 is constituted of two portions: the top and bottom portions 11a and 11b. Referring to FIG. 1, the top portion 11a bulges upward, occupying the space on the side of the optical system 1 in the image forming apparatus main assembly 14, so that the toner capacity of the process cartridge B can be increased without increasing the size of the image forming apparatus A. Referring to FIGS. 3, 4 and 7, the top portion 11a of the toner chamber frame 11 has a recessed portion 17, which is located at the lengthwise center portion of the top portion 11a, and serves as a handhold. An operator of the image forming apparatus can handle the process cartridge B by grasping it by the recessed portion 17 of the top portion 11a and the downward facing side of the bottom portion 11b. The ribs 11c extending on the downward facing surface of the bottom portion 11b in the lengthwise direction of the bottom portion 11b serve to prevent the process cartridge B from slipping out of the operator's hand. Referring again to FIG. 3, the flange 11a1 of the top portion 11a is aligned with the raised-edge flange 11b1 of the bottom portion 11b, the flange 11a1 being fitted within the raised edge of the flange 11b1 of the bottom portion 11b, so that the walls of the top and bottom portions of the toner chamber frame 11 perfectly meet at the welding surface U, and then, the top and bottom portions 11a and 11b of the toner chamber frame 11 are welded together by melting the welding ribs with the application of ultrasonic waves. The method for uniting the top and bottom portions 11a and 11b of the toner chamber frame 11 does not need to be limited to ultrasonic welding. They may be welded by heat or forced vibration, or may be glued together. Further, the bottom portion 11b of the toner chamber frame 11 is provided with a stepped portion 11m, in addition to the flange 11b1 which keeps the top and bottom portions 11a and 11b aligned when they are welded together by ultrasonic welding. The stepped portion 11m is located above an opening 11i and is substantially in the same plane as the flange 11b1. The structures of stepped portion 11m and its adjacencies will be described later.

Figure 16:
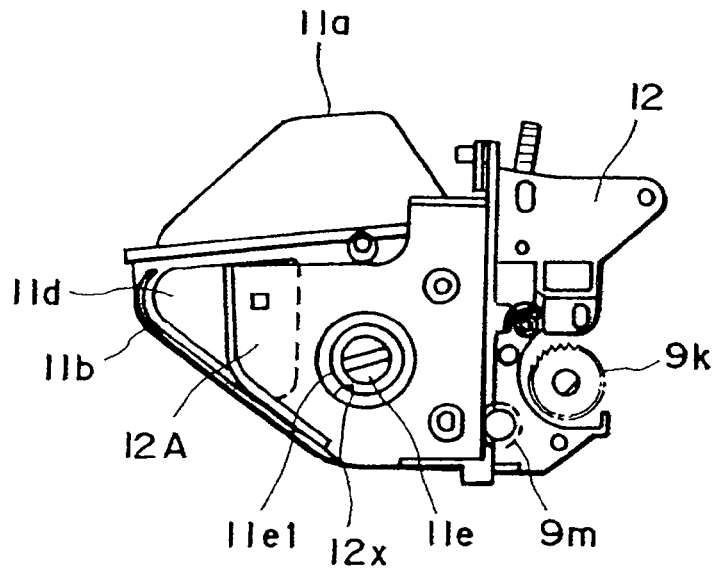
FIG. 16 is a side view of the image developing unit inclusive of the toner chamber frame and the image developing chamber frame.

Before the top and bottom portions 11a and 11b of the toner chamber frame 11 are united, a toner feeding member 9b is assembled into the bottom portion 11b, and a coupling member 11e is attached the end of the toner feeding member 9b through the hole 11e1 of the side wall of the toner chamber frame 11 as shown in FIG. 16. The hole 11e1 is located at one of the lengthwise ends of the bottom portion 11b, and the side plate which has the hole 11e1 is also provided with a toner filling opening 11d substantially shaped like a right triangle. The triangular rim of the toner filling opening 11d is constituted of a first edge, which is one of two edges that are substantially perpendicular to each other, and extends along the joint between the top and bottom portion 11a and 11b of the toner chamber frame 11, a second edge which vertically extends in the direction substantially perpendicular to the first edge, and a third edge, that is, a diagonal edge, which extends along the slanted edge of the bottom portion 11b. In other words, the toner filling opening 1d is rendered as large as possible, while being located next to the hole 11e1. Next, referring to FIG. 20, the toner chamber frame 11 is provided with an opening 11i through which toner is fed from the toner chamber frame 11 into the image developing chamber frame 12, and a seal (which will be described later) is welded to seal this opening 11i. Thereafter, toner is filled into the toner chamber frame 11 through the toner filling opening 11d, and then, the toner filling opening 1d is sealed with a toner sealing cap 11f to finish a toner unit J. The toner sealing cap 11f is formed of polyethylene, polypropylene, or the like, and is pressed into, or glued to, the toner filling opening 11d of the toner chamber frame 11 so that it does not come off. Next, the toner unit J is welded to the image developing chamber frame 12, which will be described later, by ultrasonic welding, to form the image developing unit D. The means for uniting the toner unit J and the image developing unit D is not limited to ultrasonic welding; it may be gluing or snap-fitting which utilizes the elasticity of the materials of the two units.

Referring to FIG. 3, the slanted surface K of the bottom portion 11b of the toner chamber frame 11 is given an angle of θ so that the toner in the top portion of the toner chamber frame 11 naturally slides down as the toner at the bottom is consumed. More specifically, it is desirable that the angle θ formed between the slanted surface K when the process cartridge B is in the apparatus main assembly 14 and the horizontal line Z is approximately 65 deg. when the apparatus main assembly 14 is horizontally placed. The bottom portion 11b is given an outwardly bulging portion 11g so that it does not interfere with the rotation of the toner feeding member 9b. The diameter of the sweeping range of the toner feeding member 9b is approximately 37 mm. The height of the bulging portion 11g has only to be approximately 0-10 mm from the imaginary extension of the slanted surface K. This is due to the following reason: if the bottom surface of the bulging portion 11g is above the imaginary extension of the slanted surface K, the toner which, otherwise, naturally slides down from the top portion of the slanted surface K and is fed into the image developing chamber frame 12, partially fails to be fed into the image developing chamber frame 12, collecting in the area where the slanted surface K and the outwardly bulging portion 11g meet. Contrarily, in the case of the toner chamber frame 11 in this embodiment, the toner is reliably fed into the image developing chamber frame 12 from the toner chamber frame 11.

The toner feeding member 9b is formed of a steel rod having a diameter of approximately 2 mm, and is in the form of a crank shaft. Referring to FIG. 20 which illustrates one end of the toner feeding member 9b, one 9b1 of the journals of the toner feeding member 9b is fitted in a hole 11r which is located in the toner chamber frame 11, adjacent to the opening 11i of the toner chamber frame 11. The other of the journals is fixed to the coupling member 11e (where the journal is fixed to the coupling member 11e is not visible in FIG. 20).

As described above, providing the bottom wall of the toner chamber frame section 11 with the outwardly bulging portion 11g as the sweeping space for the toner feeding member 9b makes it possible to provide the process cartridge B with stable toner feeding performance without cost increase.

Figures 22A, 22B:
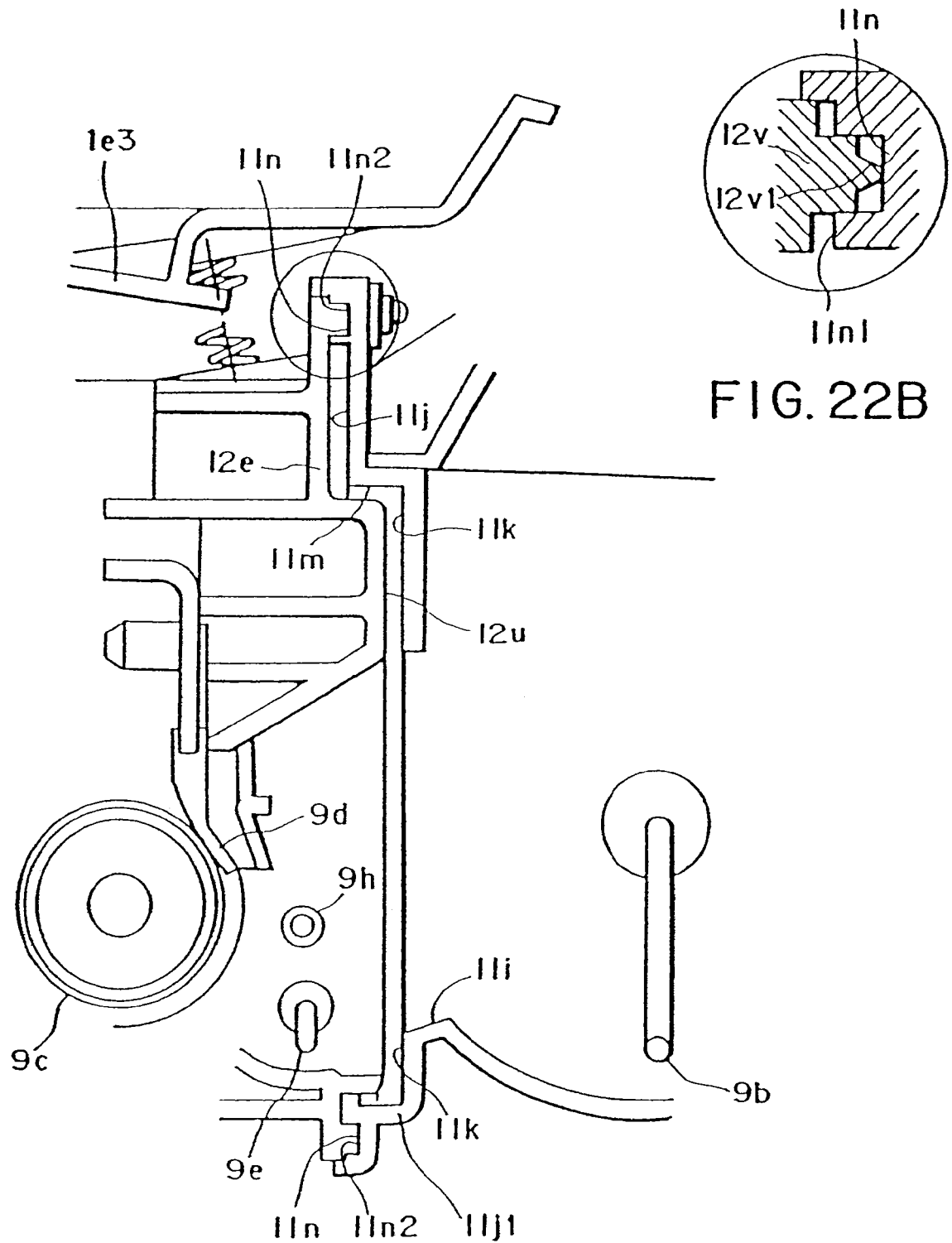
FIG. 22A is a vertical section of the toner sealing portion illustrated in FIG. 21.
FIG. 22B is a detailed view thereof
Figure 39:
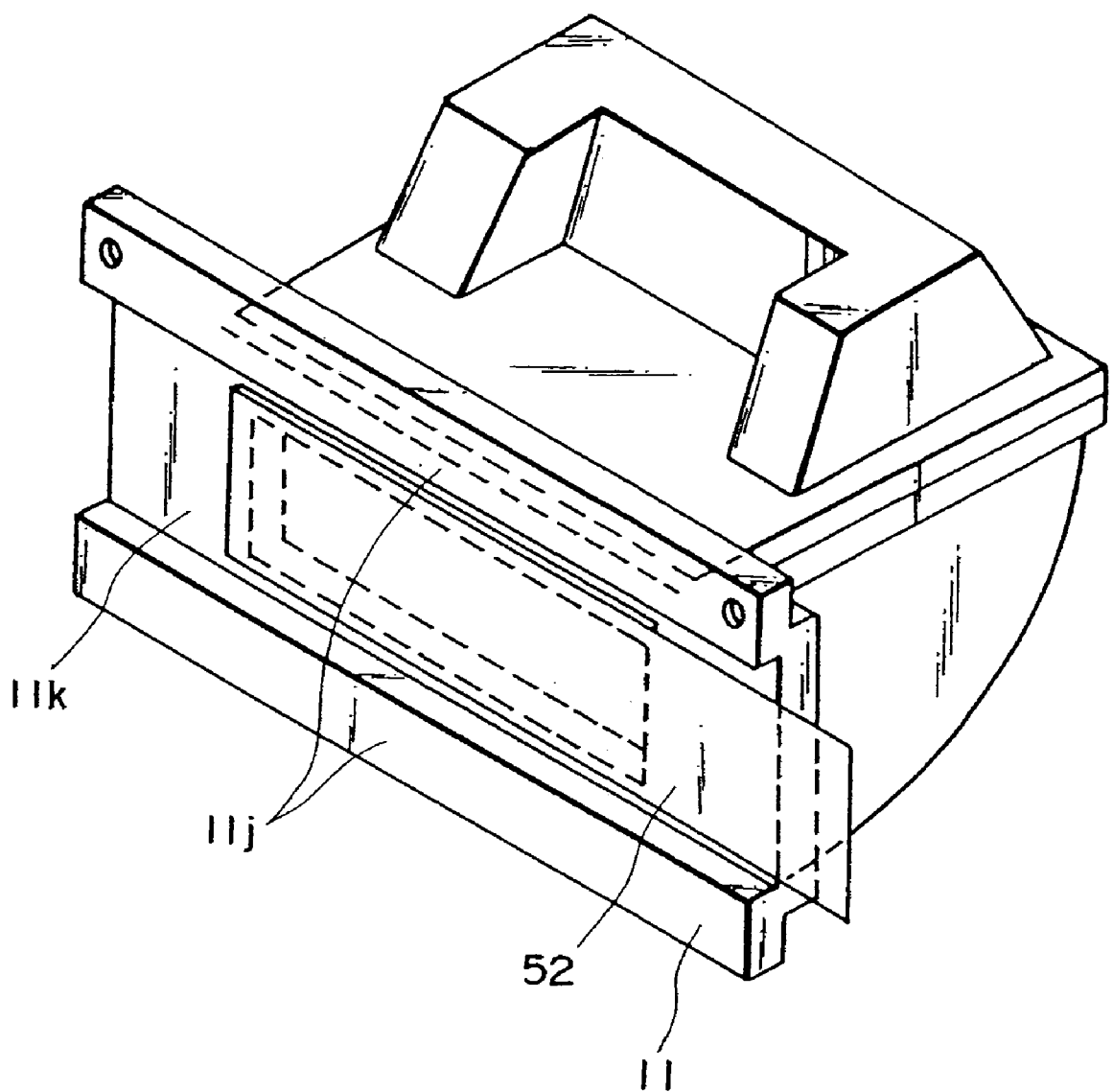
FIG. 39 is a perspective view of the opening and its adjacencies of the toner chamber frame, in one of the embodiments of the present invention.

Referring to FIGS. 3, 20 and 22, the opening 11i through which toner is fed from the toner chamber frame section 11 into the development chamber frame section is located at the joint between the toner chamber frame section 11 and the development chamber frame section 12. The opening 11i is surrounded by an recessed surface 11k which in turn is surrounded by the top and bottom portions 11j and 11j1 of the flange of the toner chamber frame 11. The lengthwise outer (top) edge of the top portion 11j and the lengthwise outer (bottom) edge of the bottom portion 11j1 are provided with grooves 11n, respectively, which are parallel to each other. The top portion 11j of the flange above the recessed surface 11k is in the form of a gate, and the surface of the bottom portion 11j1 of the flange is perpendicular to the surface of the recessed surface 11k. Referring to FIG. 22, the plane of the bottom surface 11n2 of the groove 11n is on the outward side (toward the image developing chamber frame 12) of the surface of the recessed surface 11k. However, the flange of the toner chamber frame 1 may be structured like the flange illustrated in FIG. 39 in which the top and bottom portion 11j of the flanges are in the same plane and surround the opening 11i like the top and bottom pieces of a picture frame.

Referring to FIG. 19, an alphanumeric reference 12u designates one of the flat surfaces of the image developing chamber frame 12, which faces the toner chamber frame 11. The flange 12e which is parallel to the flat surface 12u and surrounds all four edges of this flat surface 12u like a picture frame is provided at a level slightly recessed from the flat surface 12u. The lengthwise edges of the flange 12e are provided with a tongue 12v which fit into the groove 11n of the toner chamber frame 11. The top surface of the tongue 12v is provided with an angular ridge 12v1 (FIG. 22) for ultrasonic welding. After the various components are assembled into the toner chamber frame 11 and image developing chamber frame 12, the tongue of the image developing chamber frame 12 is fitted into the groove 11n of the toner chamber frame 11, and the two frames 11 and 12 are welded together along the tongue 12v and groove 11n (detail will be given later).

Referring to FIG. 21, a cover film 51, which can be easily torn in the lengthwise direction of the process cartridge B, is pasted to the recessed surface 11k to seal—the opening 11i of the toner chamber frame 11; it is pasted to the toner chamber frame 11, on the recessed surface 11k, alongside the four edges of the opening 11. In order to unseat the opening 11i by tearing the cover film 51, the process cartridge B is provided with a tear tape 52, which is welded to the cover film 51. The cover tape 52 is doubled back from the lengthwise end 52b of the opening 11i, is put between an elastic sealing member 54, such as a piece of felt (FIG. 19), and the opposing surface of the toner chamber frame 11, at the end opposite to the end 52b, and is slightly extended from the process cartridge B. The slightly extended end portion 52a of the tear tape 52 is adhered to a pull-tab 11t which is to be grasped by hand (FIGS. 6, 20 and 21). The pull-tab 11t is integrally formed with the toner chamber frame 11, wherein the joint portion between the pull-tab 11t and the toner chamber frame 11 is substantially thin so that the pull-tab 11t can be easily torn away from the toner chamber frame 11. The surface of the sealing member 54 except for the peripheral areas, is covered with a synthetic resin film tape 55 having a small friction coefficient. The tape 55 is pasted to the sealing member 54. Further, the flat surface 12e located at the other of the lengthwise end portions of the toner chamber frame 11, that is, the end portion opposite to the position where the elastic sealing member 54 is located, is covered with the elastic sealing member 56, which is pasted to the flat surface 12e (FIG. 19).

The elastic sealing members 54 and 56 are pasted on the flange 12e, at the corresponding lengthwise ends, across the entire width of the flange 12e. As the toner chamber frame 11 and the image developing chamber frame 12 are joined, the elastic sealing members 54 and 56 exactly cover the corresponding lengthwise end portions of the flange 11j surrounding the recessed surface 11k, across the entire width the flange 11j, overlapping with the tongue 12v.

Further, in order to precisely position the toner chamber frame 11 and the image developing chamber frame 12 relative to each other when they are joined, the flange 11j of the toner chamber frame 11 is provided with a round hole 11r and a square hole 11q which engage with the cylindrical dowel 12w1 and square dowel 12w2, respectively, of the image developing chamber frame 12. The round hole 11r tightly fits with the dowel 12w1, whereas the square hole 11q loosely fits with the dowel 12w2 in terms of the lengthwise direction while tightly fitting therewith in terms of the other direction.

The toner chamber frame 11 and the image developing chamber frame 12 are independently assembled as a compound component prior to a process in which they are united. Then, they are united in the following manner. First, the cylindrical positioning dowel 12w1 and square positioning dowel 12w2 of the image developing chamber frame 12 are fitted into the positioning round hole 11r and positioning square hole 11q of the toner chamber frame 11, and the tongue 12v of the image developing chamber frame 12 is placed in the groove 11n of the toner chamber frame 11. Then, the toner chamber frame 11 and the image developing chamber frame 12 are pressed toward each other. As a result, the sealing members 54 and 56 come in contact with, and are compressed by, the corresponding lengthwise end portions of the flange 11j. At the same time, rib-like projections 12z, which are located, as a spacer, at each lengthwise end of the flat surface 12u of the image developing chamber frame 12, are positioned close to the flange 11j of the toner chamber frame 11. The rib-like protections 12z are integrally formed with the image developing chamber frame 12, and are located at both sides, relative to the lengthwise direction, of the tear tape 52, so that the tear tape can be passed between the opposing projections 12z.

With the toner chamber frame 11 and the image developing chamber frame 12 being pressed toward each other as described above, ultrasonic vibration is applied between the tongue-like portion 12v and the groove 11n. As a result, the angular ridge 12v1 is melt by frictional heat and fuses with the bottom of the groove 11n. Consequently, the rim portion 11n1 of the groove 11n of the toner chamber frame 11 and the rib-like projection 12z of the image developing chamber frame 12 remain in airtight contact with each other, leaving a space between the recessed surface 11k of the toner chamber frame 11 and the flat surface 12u of the image developing chamber frame 12. The aforementioned cover film 51 and tear tape 52 fit in this space.

In order to feed the toner stored in the toner chamber frame 11 into the image developing chamber frame 12, the opening 11i of the toner chamber frame 11 must be unsealed. This is accomplished in the following manner. First, the pull-tab 11t attached to the end portion 5Za (FIG. 6) of the tear tape 52 extending from the process cartridge B is cut loose, or torn loose, from the toner chamber frame 11, and then, is pulled by hand by an operator. This will tear away the cover film 51 to unseal the opening 11i, enabling the toner to be fed from the toner chamber frame 11 into the image developing chamber frame 12. After the cover film 52 is pulled out of the process cartridge B, the lengthwise ends of the cartridge B are kept sealed by the elastic seals 54 and 56 which are located at the corresponding lengthwise ends of the flange 11j of the toner chamber frame 11. Since the elastic sealing members 54 and 56 are deformed (compressed) only in the direction of their thickness while maintaining their hexahedral shapes, they can keep the process cartridge sealed very effectively.

Since the side of the toner chamber frame 11, which faces the image developing chamber frame 12, and the side of the image developing chamber frame 12, which faces the toner chamber frame 11, are structured as described above, the tear tape 52 can be smoothly pulled out from between the two frames 11 and 12 by simply applying to the tear tape 52 a force strong enough to tear the cover film 51.

As described above, when the toner chamber frame 11 and the image developing chamber frame 12 are united, a welding method employing ultrasound is employed to generate frictional heat which melts the angular ridge 12v1. This frictional heat is liable to cause thermal stress in the toner chamber frame 11 and the image developing chamber frame 12, and these frames may become deformed due to the stress. However, according to this embodiment, the groove 1 in of the toner chamber frame 11 and the tongue 12v of the image developing chamber frame 12 engage with each other across the almost entire length of theirs. In other words, as the two frames 11 and 12 are united, the welded portion and its adjacencies are reinforced, and therefore, the two frames are not likely to be deformed by the thermal stress.

As for the material for the toner chamber frame 11 and the image developing chamber frame 12, plastic material is used; for example, polystyrene, ABS resin (acrylonitrile-butadiene-styrene), polycarbonate, polyethylene, polypropylene, and the like.

Referring to FIG. 3, this drawing is a substantially vertical cross-section of the toner chamber frame 11 of the process cartridge B in this embodiment, and illustrates the interface between the toner chamber frame 11 and the image developing chamber frame 12, and its adjacencies.

At this time, the toner chamber frame 11 of the process cartridge B in this embodiment will be described in more detail with reference to FIG. 3. The toner held in a toner container 11A is single component toner. In order to allow this toner to efficiently free fall toward the opening 11i, the toner chamber frame 11 is provided with slanted surfaces K and L, which extend across the entire length of the toner chamber frame 11. The slanted surface L is above the opening 11i, and the slanted surface K is in the rear of the toner chamber frame 11 as seen from the opening 11i (in the widthwise direction of the toner chamber frame 11). The slanted surfaces L and K are parts of the top and bottom pieces 11a and 11b, respectively, of the toner chamber frame 11. After the process cartridge B is installed in the apparatus main assembly 14, the slanted surface L faces diagonally downward, and the slanted surface K faces diagonally upward, an angle θ3 between the slanted surface K and the line m perpendicular to the interface between the toner chamber frame 11 and the image developing chamber frame 12 being approximately 20 deg.-40 deg. In other words, in this embodiment, the configuration of the top portion 11a of the toner chamber frame 11 is designed so that the slanted surfaces K and L hold the aforementioned angles, respectively, after the top and bottom portions 11a and 11b of the toner chamber frame 11 are united. This, according to this embodiment, the toner container 11A holding the toner is—enabled to efficiently feed the toner toward the opening 11i.

Next, the image developing chamber frame will be described in detail.

(Image Developing Chamber Frame)

Figure 14:
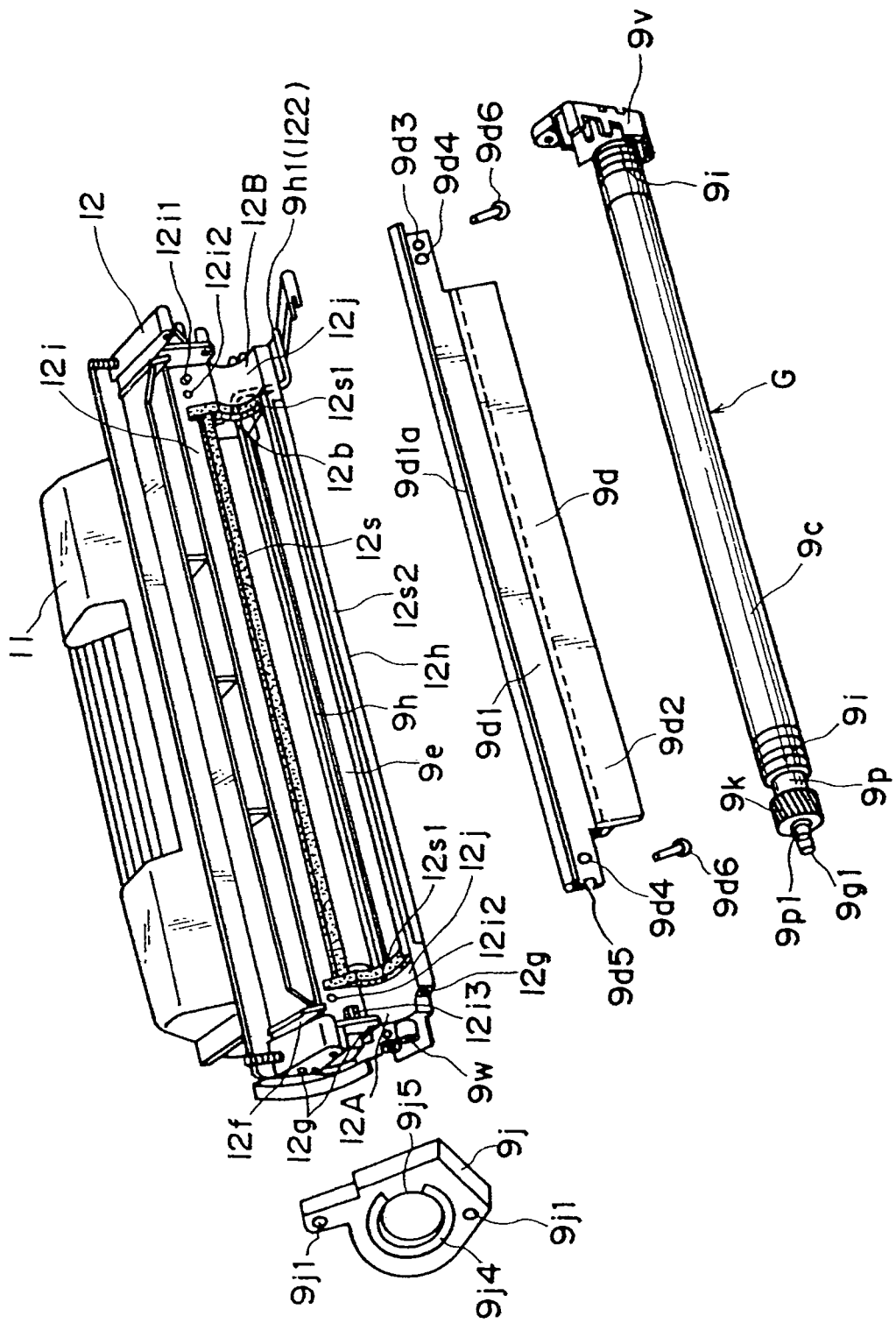
FIG. 14 is a partially exploded perspective view of an image developing unit.
Figure 15:
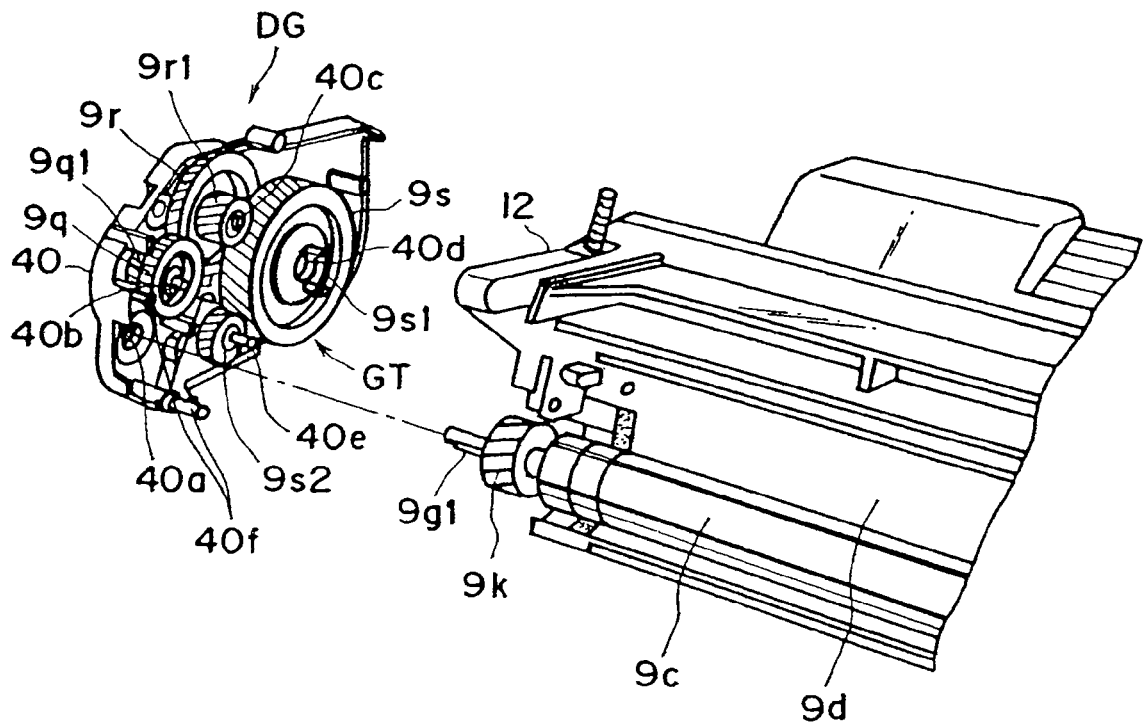
FIG. 15 is a partially exploded perspective view of a gear holding frame portion of the image developing chamber frame, and the gears which drive the image developing unit, depicting the back side of thereof.
Figure 17:
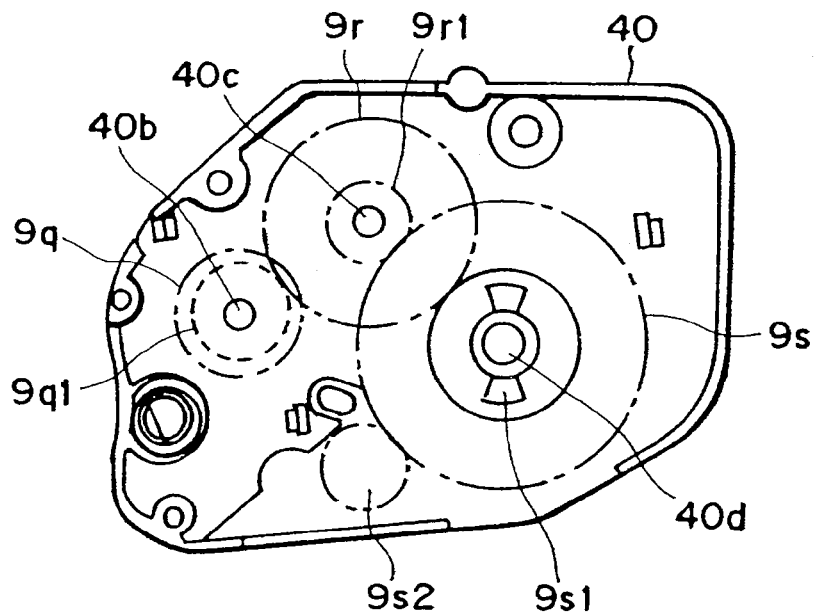
FIG. 17 is a plan view of the gear holding frame portion illustrated in FIG. 15, as seen from the inside of the image developing unit.
Figure 18:
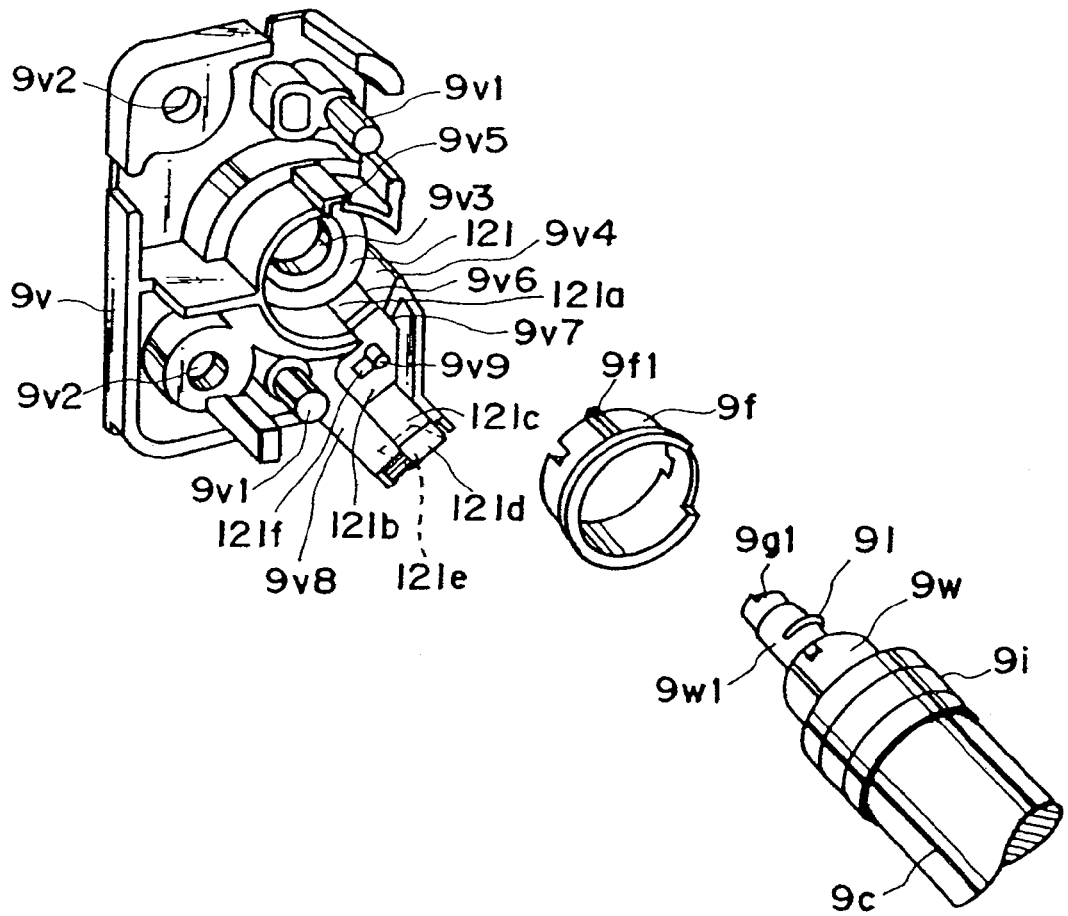
FIG. 18 is a perspective view of an image developing roller bearing box.

The image developing chamber frame 12 of the process cartridge B will be described with reference to FIGS. 3, 14, 15, 16, 17, and 18. FIG. 14 is a perspective view depicting the way various components are assembled into the image developing chamber frame 12; FIG. 15, a perspective view depicting the way a developing station driving force transmitting unit DG is assembled into the image developing chamber frame 12; FIG. 16, a side view of the development unit before the driving force transmitting unit DG is attached; FIG. 17, a side view of the developing station driving force transmitting unit DG as seen from inside the image developing chamber frame 12; and FIG. 18 is a perspective view of the bearing box as seen from inside.

As described before, the developing roller 9c, the developing blade 9d, the toner stirring member 9e, and the rod antenna 9h for detecting the toner remainder, are assembled into the image developing chamber frame 12.

Referring to FIG. 14, the developing blade 9d comprises an approximately 1-2 mm thick metallic plate 9d1, and an urethane rubber 9d2 glued to the metallic plate 9d1 with the use of hot melt glue, double-side adhesive tape, or the like. It regulates the amount of the toner to be carried on the peripheral surface of the developing roller 9c as the urethane rubber 9d2 is placed in contact with the generatrix of the developing roller 9c. The lengthwise ends of the blade mounting reference flat surface 12i, as a blade mount, of the image developing chamber frame 12, are provided with a dowel 12i1, a square projection 12i3, and a screw hole 12i2. The dowel 12i1 and the projection 12i3 are fitted in a hole 9d3 and a notch 9d5, respectively, of the metallic plate 9d1. Then, a small screw 9d6 is put through a screw hole 9d4 of the metallic plate 9d1, and is screwed into the aforementioned screw hole 12i2 with female threads, to fix the metallic plate 9d1 to the flat surface 12i. In order to prevent toner from leaking out, an elastic sealing member 12s formed of MOLTPLANE, or the like, is pasted to the image developing chamber frame 12, along the lengthwise top edge of the metallic plate 9d1. Also, an elastic sealing member 12s1 is pasted to the developing chamber frame 12, along the edge 12j of the curved bottom wall portion which accommodates the developing roller 9c, starting from each lengthwise end of the elastic sealing member 12s. Further, a thin elastic sealing member 12s2 is pasted to the image developing chamber frame 12, along a mandible-like portion 12h, in contact with the generatrix of the developing roller 9c.

The metallic plate 9d1 of the developing blade 9d is bent 90 deg. on the side opposite to the urethane rubber 9d2, forming a bent portion 9d1 a.

Next, referring to FIGS. 14 and 18, the image developing roller unit G will be described. The image developing roller unit G comprises: (1) image developing roller 9c; (2) spacer roller 9i for keeping constant the distance between the peripheral surfaces of the developing roller 9c and the photosensitive drum 7, being formed of electrically insulative synthetic resin and doubling as a sleeve cap which covers the developing roller 9c at each lengthwise end to prevent electrical leak between the aluminum cylinder portions of the photosensitive drum 7 and the developing roller 9c; (3) developing roller bearing 9j (illustrated in enlargement in FIG. 14); (4) developing roller gear 9k (helical gear) which receives driving force from a helical drum gear 7b attached to the photosensitive drum 7 and rotates the developing roller 9c; (5) a coil spring type contact 91, one end of which is in contact with one end of the developing roller 9c (FIG. 18); and (6) a magnet 9g which is contained in the developing roller 9c to adhere the toner onto the peripheral surface of the developing roller 9c. In FIG. 14, the bearing box 9v has been already attached to the developing roller unit G. However, in some cases, the developing roller unit G is first disposed between the side plates 12A and 12B of the image developing chamber frame 12, and then is united with the bearing box 9v when the bearing box 9v is attached to the image developing chamber frame 12.

Figure 38:
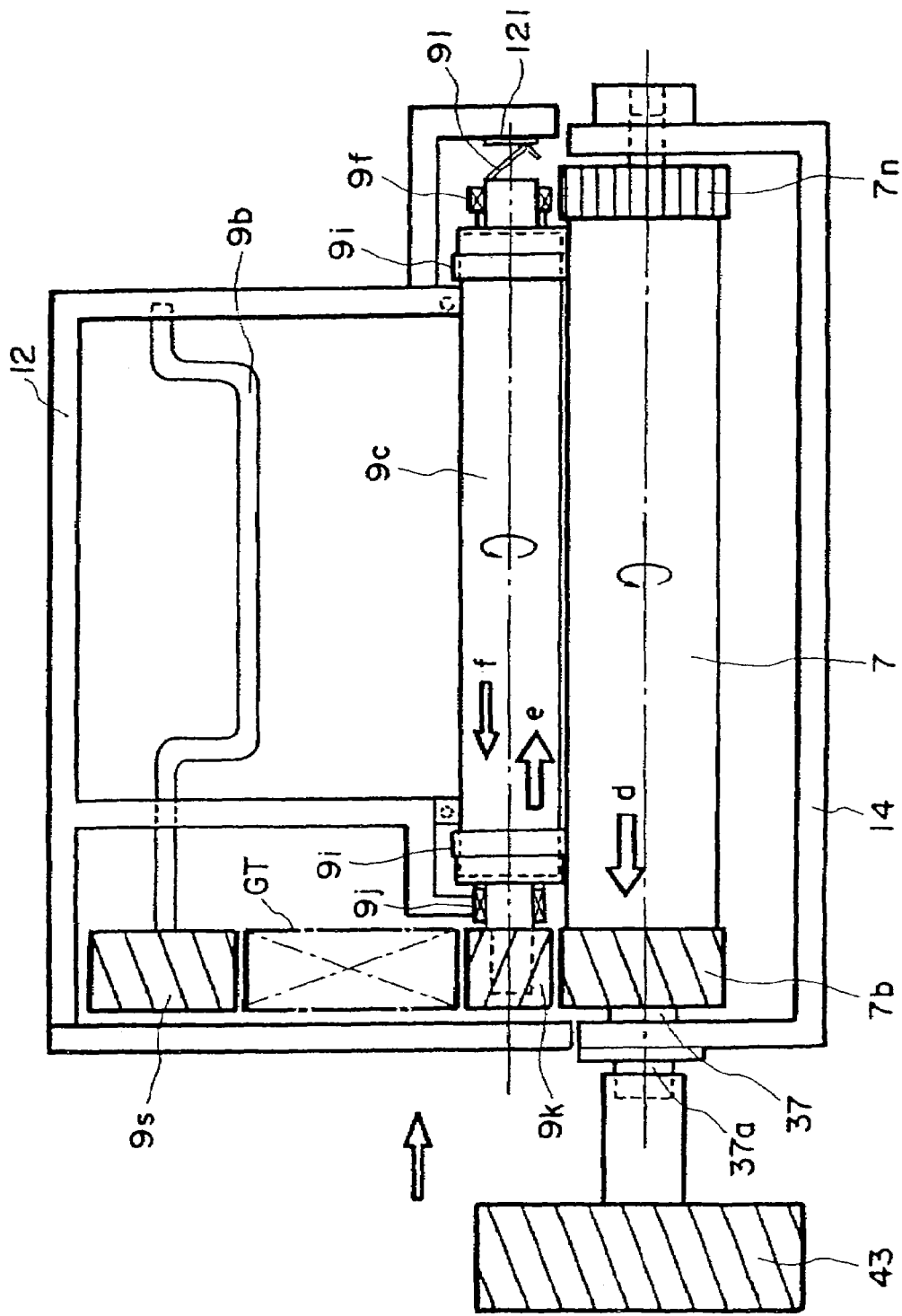
FIG. 38 is a plan view of the process cartridge, depicting the relationship among the various thrust generated in the cartridge, in terms of direction and magnitude.

Referring again to FIG. 14, in the developing roller unit G, the developing roller 9c is rigidly fitted with a metallic flange 9p at one lengthwise end. This flange 9p has a developing roller gear shaft portion 9p1 which extends outward in the lengthwise direction of the developing roller 9c. The developing roller gear shaft portion 9p1 has a flattened portion, with which the developing roller gear 9k mounted on the developing gear shaft portion 9p1 is engaged, being prevented from rotating on the developing roller gear shaft portion 9p1. The developing roller gear 9k is a helical gear, and its teeth are angled so that the thrust generated by the rotation of the helical gear is directed toward the center of the developing roller 9c (FIG. 38). One end of the shaft of the magnet 9g, which is shaped to give it a D-shaped cross-section, projects outward through the flange 9p, and engages with the developing means gear holder 40 to be nonrotatively supported. The aforementioned developing roller bearing 9j is Provided with a round hole having a rotation preventing projection 9j5 which projects into the hole, and in this round hole, the C-shaped bearing 9j4 perfectly fits. The flange 9p rotatively fits in the bearing 9j4. The developing roller bearing 9j is fitted into a slit 12f of the image developing chamber frame 12, and is supported there as the developing means gear holder 40 is fixed to the image developing chamber frame 12 by putting the projections 40g of the developing means gear holder 40 through the corresponding-holes 9j1 of the developing roller gear bearing 9j, and then inserting them in the corresponding holes 12g of the image developing chamber frame 12. The bearing 9j4 in this embodiment has a C-shaped flange. However, there will be no problem even if the cross-section of the actual bearing portion of the bearing 9j4 is C-shaped. The aforementioned hole of the development roller bearing 9j, in which the bearing 9j1 fits, has a step. In other words, it is consisted of a large diameter portion and a small diameter portion, and the rotation preventing projection 9j5 is projecting from the wall of the large diameter portion in which the flange of the bearing 9j4 fit. The material for the bearing 9j, and the bearing 9f which will be described later, is polyacetal, polyamide, or the like.

Although substantially encased in the developing roller 9c, the magnet 9g extends from the developing roller 9c at both lengthwise ends, and is fitted in a D-shaped supporting hole 9v3 of the developing roller bearing box 9v illustrated in FIG. 18, at the end 9g1 having the D-shaped cross-section. In FIG. 18, the D-shaped supporting hole 9v3, which is located in the top portion of the developing roller bearing box 9v, is not visible. At one end of the developing roller 9c, a hollow journal 9w formed of electrically insulative material is immovably fitted within the developing roller 9c, in contact with the internal peripheral surface. A cylindrical portion 9w1 which is integral with the journal 9w and has a smaller diameter than the journal 9w electrically insulates the magnet 9g from a coil spring type contact 91 which is electrically in contact with the developing roller 9c. The bearing 9f with the aforementioned flange is formed of electrically insulative synthetic resin, and fits in the bearing accommodating hole 9v4 which is coaxial with the aforementioned magnet supporting hole 9v3. A key portion 9f1 integrally formed with the bearing 9f fits in a key groove 9v5 of the bearing accommodating hole 9v4, preventing the bearing 9f from rotating.

The bearing accommodating hole 9v4 has a bottom, and on this bottom, a doughnut-shaped development bias contact 121 is disposed. As the developing roller 9c is assembled into the developing roller bearing box 9v, the metallic coil spring type contact 91 comes in contact with this doughnut-shaped development bias contact 121, and is compressed, establishing thereby electrical connection. The doughnut-shaped development bias contact 121 has a lead which comprises: a first portion 121a which perpendicularly extends from the outer periphery of the doughnut-shaped portion, fitting in the recessed portion 9v6 of the bearing accommodating hole 9v4, and runs along the exterior wall of the bearing 9f up to the cutaway portion 9v7 located at the edge of the bearing accommodating hole 9v4; a second portion 121b which runs from the cutaway portion, being bent outward at the cutaway portion; a third portion 121c which is bent from the second portion 121b; a fourth portion 121d which is bent from the third portion 121c in the outward, or radial, direction of the developing roller 9c; and an external contact portion 121e which is bent from the fourth portion 121d in the same direction. In order to support the development bias contact 121 having the above described shape, the developing roller bearing box 9v is provided with a supporting portion 9v8, which projects inward in the lengthwise direction of the developing roller 9c, The supporting portion 9v8 is in contact with the third and fourth portion 121c and 121d, and the external contact portion 121e, of the lead of the development bias contact 121. The second portion 121b is provided with an anchoring hole 121f, into which a dowel 9v9 projecting inward from the inward facing wall of the developing roller bearing box 9v in the lengthwise direction of the developing roller 9c is pressed. The external contact portion 121e of the development bias contact 121 comes in contact with the development bias contact member 125 of the apparatus main assembly 14 as the process cartridge B is installed in the apparatus main assembly 14, so that development bias is applied to the developing roller 9c. The development bias contact member 125 will be described later.

Two cylindrical projections 9v1 of the developing roller bearing box 9v are fitted into the corresponding holes 12m of the image developing chamber frame 12, which are provided at the lengthwise end as illustrated in FIG. 19. As a result, the developing roller gearing box 9v is precisely positioned on the image developing chamber frame 12. Then, an unillustrated small screw is put through each screw hole of the developing roller bearing box 9v, and then is screwed into the female-threaded screw hole 12c of the image developing chamber frame 12 to fix the developing roller bearing box 9v to the image developing chamber frame 12.

As is evident from the above description, in this embodiment, in order to mount the developing roller 9c in the image developing chamber frame 12, the developing roller unit G is assembled first, and then, the assembled developing roller unit G is attached to the image developing chamber frame 12.

The developing roller unit G is assembled following the steps described below. First, the magnet 9g is put through the developing roller 9c fitted with the flange 9p, and the journal 9w and the coil spring type contact 91 for development bias are attached to the end of the developing roller 9c. Thereafter, the spacer roller 9i and the developing roller bearing 9j are fitted around each lengthwise end portion of the developing roller 9c, the developing roller bearing 9j being on the outer side relative to the lengthwise direction of the developing roller 9c. Then, the developing roller gear 9k is mounted on the developing roller gear shaft portion 9p1 located at the end of the developing roller 9c. It should be noted here that the lengthwise end 9g1 of the magnet 9g, which has a D-shaped cross-section, projects from the developing roller 9c, on the side where the developing roller gear 9k is attached; it projects from the end of the cylindrical portion 9w1 of the hollow journal 9w.

Next, the rod antenna 9h for detecting the toner remainder will be described. Referring to FIGS. 14 and 19, one end of the rod antenna 19h is bent like that of a crank shaft, wherein the portion comparable to the arm portion of the crank shaft constitutes a contact portion 9h1 (toner remainder detecting contact 122), and must be electrically in contact with the toner detecting contact member 126 attached to the apparatus main assembly 14. The toner detection contact member 126 will be described later. In order to mount the rod antenna 9h in the image developing chamber frame 12, the rod antenna 9h is first inserted into the image developing chamber frame 12 through a through hole 12b of a side plate 12B of the image developing chamber frame 12, and the end which is put through the hole 12b first is placed in an unillustrated hole of the opposite side plate of the image developing chamber frame 12, so that the rod antenna 9h is supported by each side plate. In other words, the rod antenna 9h is properly positioned by the through hole 12b and the unillustrated hole on the opposite side. In order to prevent toner from invading the through hole 12b, an unillustrated sealing member (for example, a ring formed of synthetic resin, a piece of felt or sponge, or the like) is insert in the through hole 12b.

As the developing roller gear box 9v is attached to the image developing chamber frame 12, the contact portion 9h1 of the rod antenna 9h, that is, the portion comparable to the arm portion of a crank shaft, is positioned so that the rod antenna 9h is prevented from moving or coming out of the image developing chamber frame 12.

After the toner chamber frame 11 and the image developing chamber frame 12 are united, the side plate 12A of the image developing chamber frame 12, through which the rod antenna 9h is inserted, overlaps with the side plate of the toner chamber frame 11, partially covering the toner sealing cap 11f of the bottom portion 11b of the toner chamber frame 11. Referring to FIG. 16, the side plate 12A is provided with a hole 12x, and a shaft fitting portion 9s1 (FIG. 15) of the toner feeding gear 9s for transmitting driving force to the toner feeding member 9b is put through this hole 12x. The shaft fitting portion 9s1 is a part of the toner feeding gear 9s, and is coupled with the coupling member 11e (FIGS. 16 and 20) to transmits driving force to the toner feeding member 9b. As described before, the coupling member 11e is engaged with one of the lengthwise ends of the toner feeding member 9b and is rotatively supported by the toner chamber frame 11.

Referring to FIG. 19, in the image developing chamber frame 12, the toner stirring member 9e is rotatively supported in parallel to the rod antenna 9h. The toner stirring member 9e is also shaped like a crank shaft. One of the crank shaft journal equivalent portions of the toner stirring member 9e is fitted in a bearing hole (unillustrated) of the side plate 12B, whereas the other is fitted with the toner stirring gear 9m which has a shaft portion rotatively supported by the side plate 12A illustrated in FIG. 16. The crank arm equivalent portion of the toner stirring member 9e is fitted in the notch of the shaft portion of the toner stirring gear 9m so that the rotation of the toner stirring gear 9m is transmitted to the toner stirring member 9e.

Next, transmission of driving force to the image developing unit D will be described.

Referring to FIG. 15, the shaft 9g1 of the magnet 9g, which has the D-shaped cross-section, engages with a magnet supporting hole 40a of the image developing means gear holder 40. As a result, the magnet 9g is nonrotatively supported. As the image developing mean gear holder 40 is attached to the image developing chamber frame 12, the developing roller gear 9k meshes with a gear 9q of a gear train GT, and the toner stirring gear 9m meshes with a small gear 9s2. Thus, the toner feeding gear 9s and the toner stirring gear 9m are enabled to receive the driving force transmitted from the developing roller gear 9k.

All the gears from the gear 9q to the toner gear 9s are idler gears. The gear 9q which meshes with the developing roller gear 9k, and a small gear which is integral with the gear 9q, are rotatively supported on a dowel 40b which is integral with the image developing means gear holder 40. A large gear 9r which engages with the small gear 9q1, and a small gear 9r1 which is integral with the gear 9r, are rotatively supported on the dowel 40c which is integral with the image developing means gear holder 40. The small gear 9r1 engages with the toner feeding gear 9s. The toner feeding gear 9s is rotatively supported on a dowel 40d which is a part of the image developing means gear holder 40. The toner feeding gear 9s has the shaft fitting portion 9s1. The toner feeding gear 9s engages with a small gear 9s2. The small gear 9s2 is rotatively supported on a dowel 40e which is a part of the image developing means gear holder 40. The dowels 40b, 40c, 40d, and 40e have a diameter of approximately 5-6 mm, and support the corresponding gears of the gear train GT.

With the provision of the above described structure, the gears which constitute the gear train can be supported by a single component (image developing means gear holder 40). Therefore, when assembling the process cartridge B, the gear train GT can be partially preassembled onto the image developing means gear holder 40; compound components can be preassembled to simplify the main assembly process. In other words, first, the rod antenna 9h, and the toner stirring member 9e are assembled into the image developing chamber frame 12, and then, the developing roller unit G and the gear box 9v are assembled into the developing station driving force transmission unit DG and the image developing chamber frame 12, respectively, completing the image developing unit D.

Referring to FIG. 19, an alphanumeric reference 12p designates an opening of the image developing chamber frame 12, which extends in the lengthwise direction of the image developing chamber frame 12. After the toner chamber frame 11 and the image developing chamber frame 12 are united, the opening 12p squarely meets with the opening 11i of the toner chamber frame 11, enabling the toner held in the toner chamber frame 11 to be supplied to the developing roller 9c. The aforementioned toner stirring member 9e and rod antenna 9h are disposed along one of the lengthwise edges of the opening 12p, across the entire length thereof.

The materials suitable for the image developing chamber frame 12 are the same as the aforementioned materials suitable for the toner chamber frame 11.

(Structure of Electrical Contact)

Next, referring to FIGS. 8, 9, 11, 23, 30A and 30B, connection and positioning of the contacts which establish electrical connection between the process cartridge B and the image forming apparatus main assembly 14 as the former is installed into the latter will be described. A drum grounding mechanism for discharging the electric charge on the drum 7 to the main assembly 14 will be described hereinafter.

Referring to FIG. 8, the process cartridge B has a plurality of electrical contacts: (1) electrically conductive charge bias contact 120 electrically connected to the charging roller shaft 8a to apply charge bias to the charging roller 8 from the apparatus main assembly 14; (2) electrically conductive development bias contact 121 electrically connected to the developing roller 9c to apply development bias to the developing roller 9c from the apparatus main assembly 14; (3) electrically conductive toner remainder detecting contact 122 electrically connected to the rod antenna 9h to detect the toner remainder. These four contacts 119-122 are exposed from the side or bottom wall of the cartridge frame. More specifically, they all are disposed so as to be exposed from the left wall or bottom wall of the cartridge frame, as seen from the direction from which the process cartridge B is installed, being separated from each other by a predetermined distance sufficient to prevent electrical leak. The grounding contact 119 and the charge bias contact 121 belong to the cleaning unit C, and the development bias contact 121 and the toner remainder detection contact 122 belong to the image developing chamber frame 12. The toner remainder detection contact 122 doubles as a process cartridge detection contact through which the apparatus main assembly 14 detects whether or not the process cartridge B has been installed in the apparatus main assembly 14.

The charge bias contact 120 and the development bias contact 121 are formed of approximately 0.1-0.3 nun thick electrically conductive metallic plate (for example, stainless steel plate and phosphor bronze plate), and are laid (extended) along the internal surface of the process cartridge. The charge bias contact 120 is exposed from the bottom wall of the cleaning unit C, on the side opposite to the side from which the process cartridge B is driven. The development bias contact 121 and the toner remainder detection contact 122 are exposed from the bottom wall of the image developing unit D, also on the side opposite to the side from which the process cartridge B is driven.

This embodiment will be described further in detail.

As described above, in this embodiment, the helical drum gear 7b is provided at one of the axial ends of the photosensitive drum 7 as illustrated in FIG. 11. The drum gear 7b engages with the developing roller gear 9k to rotate the developing roller 9c. As it rotates, it generates thrust in the direction (indicated in an arrow mark d in FIG. 11). This thrust pushes the photosensitive drum 7, which is disposed in the cleaning chamber frame 13 with a slight play in the longitudinal direction, toward the side on which the drum gear 7b is mounted. As a result, the outward edge 7b1 of the drum gear 7b remains in contact with the surface of the inward end of the bearing 38 fixed to the cleaning chamber frame 13. Thus, the position of the photosensitive drum 7 relative to the process cartridge B in the axial direction of the photosensitive drum 7 is regulated. The drum shaft 7a extends into the base drum 7d (aluminum drum in this embodiment) coated with a photosensitive layer 7e, along the axial line.

Figure 23:
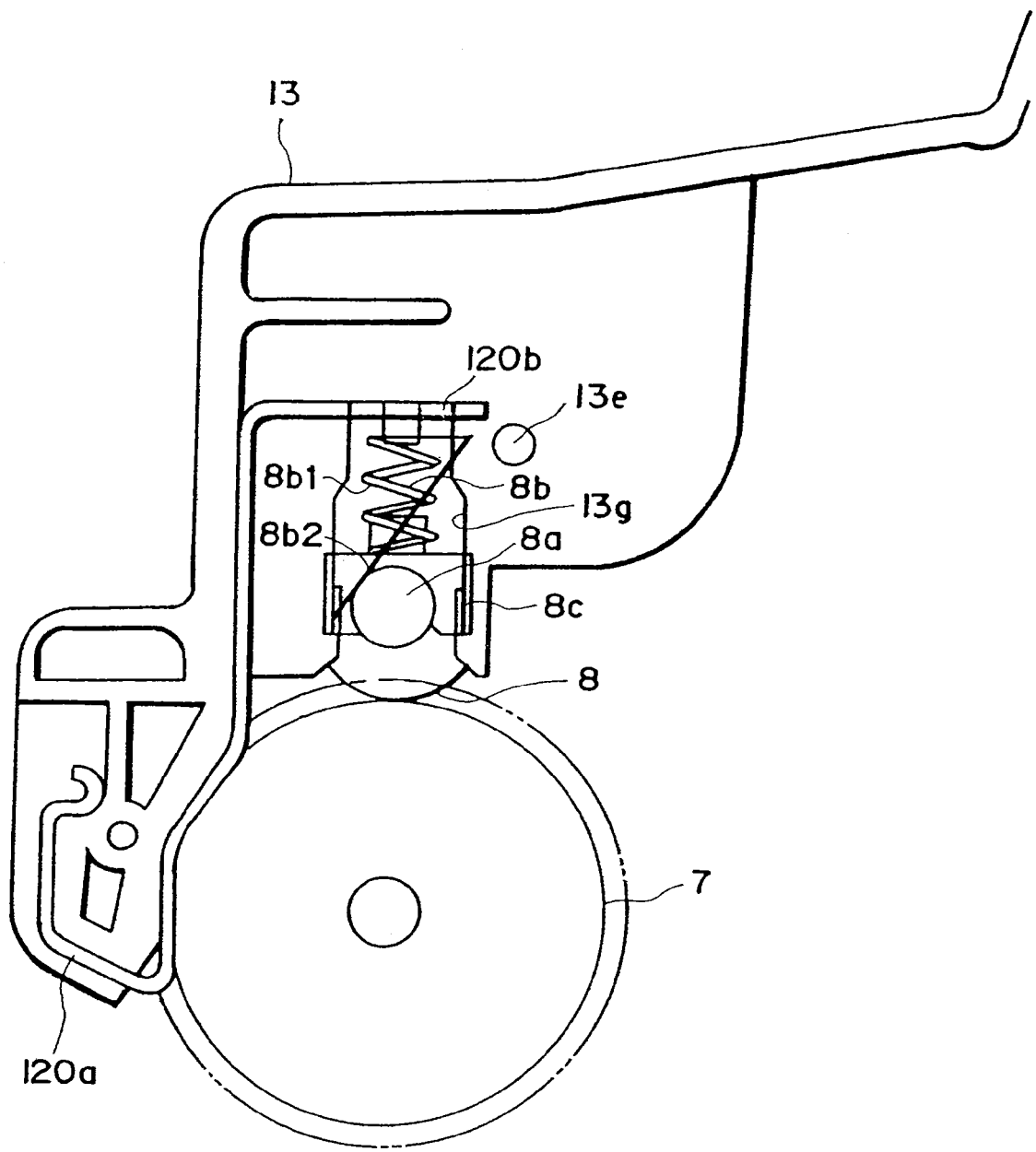
FIG. 23 is a vertical section of the structure which supports the photosensitive drum charging roller.
Figure 24:
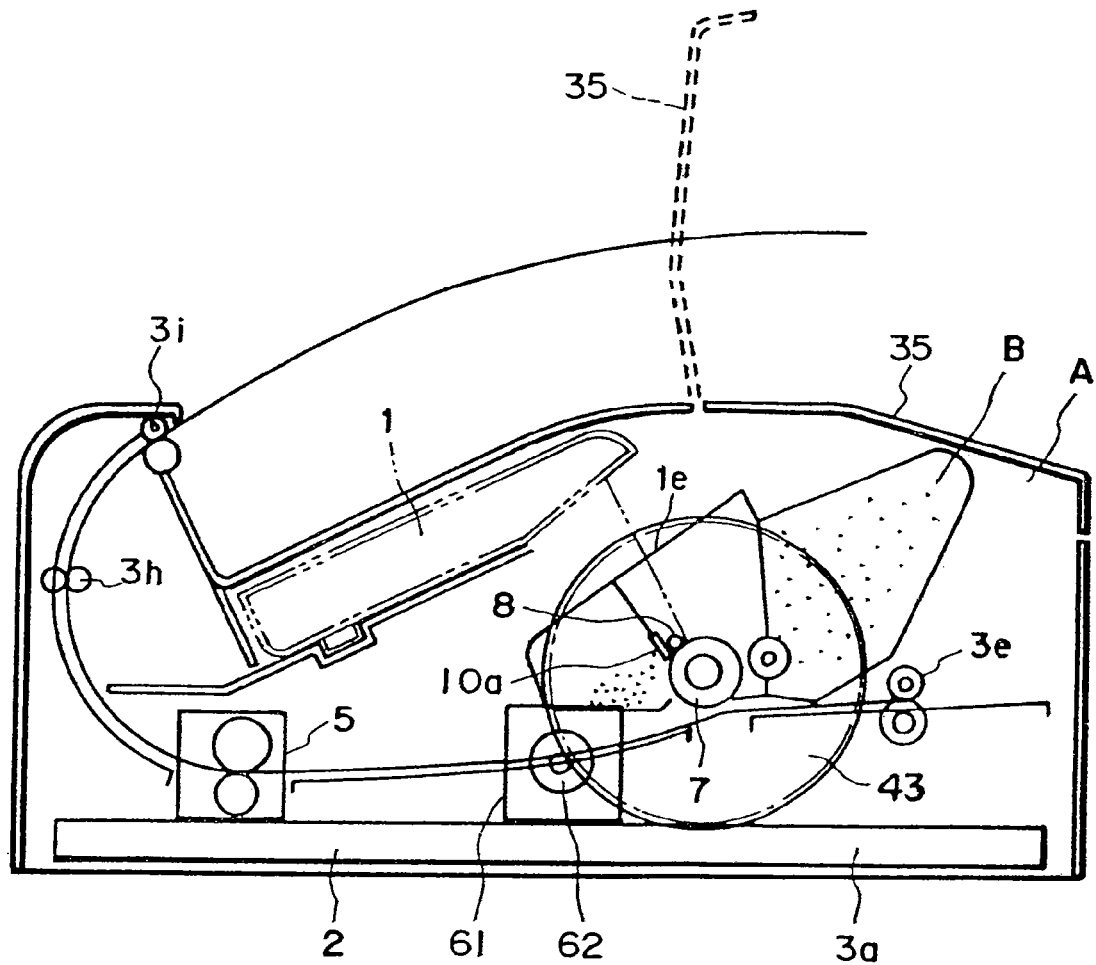
FIG. 24 is a schematic section of the driving system for the main assembly of the apparatus illustrated in FIG. 1.

The charge bias contact 120 is attached to the cleaning chamber frame 13, adjacent to where the charging roller 8 is supported (FIG. 8). Referring to FIG. 23, the charge bias contact 120 is electrically in contact with the shaft 8a of the charging roller 8 by way of a compound spring 8b which is in contact with the charge roller shaft 8a. This compound spring 8b is constituted of a compression spring portion 8b1 and an internal contact portion 8b2. The compression coil portion 8b1 is placed between the spring seat 120b and a charging roller bearing 8c. The internal contact portion 8b2 extends from the spring seat side end of the compression spring portion 8b1 and presses on the charge roller shaft 8a. The charging roller bearing 8c is slidably fitted in a guide groove 13g, and the spring seat 120b is located at the closed end of the guiding groove 13g. The guide groove 13g extends in the direction of an imaginary line which runs through the centers of the cross-sections of the charging roller 8 and photosensitive drum 7, the center line of the guiding groove 3g substantially coinciding with this imaginary line. Referring to FIG. 23, the charge bias contact 120 enters the cleaning chamber frame 13 at the location 120a where it is exposed, runs along the internal wall of the cleaning chamber frame 13, bends in the direction which intersects with the direction in which the charge roller shaft 8a of the charging roller 8 is moved, and ends at the spring seat 120b.

Next, the development bias contact 121 and the toner remainder detection contact 122 will be described. Both contacts 121 and 122 are disposed on the bottom surface which faces downward when the process cartridge B is in the apparatus main assembly 14 of the image developing unit D, on the same side as the side plate 13k of the cleaning chamber frame 13. The aforementioned third portion 121e of the development contact 121, that is, the portion exposed from the image developing unit D, is disposed so as to oppose the charge bias contact 120 across the spur gear 7n. As described previously, the development bias contact 121 is electrically in contact with the developing roller 9c through the coil spring type contact 91 which is electrically in contact with the lengthwise end of the developing roller 9c (FIG. 18).

FIG. 38 schematically illustrates the relationship between the thrusts generated by the drum gear 7b and the developing roller gear 9k and the development bias contact 121. As stated before, the photosensitive drum 7 is shifted in the direction of the arrow mark d in FIG. 38 as the process cartridge B is driven. As a result, the end surface of the photosensitive drum 7 on the drum gear 7b side remains in contact with the end surface of the bearing 38 (FIG. 32) which is not illustrated in FIG. 38; the position of the photosensitive drum 7 in terms of the lengthwise direction thereof becomes fixed. On the other hand, the developing roller gear 9k which meshes with the drum gear 7b is thrusted in the direction of an arrow mark e, which is opposite to the direction of the arrow mark d. As a result, it presses the coil spring type contact 91 which is pressing the development bias contact 121. Consequently, the pressure generated by the coil spring type contact 91 in the direction of an arrow mark f, that is, in the direction to press the developing roller 9c against developing roller bearing 9j, is reduced. Thus, it is assured that the coil spring type contact 91 and the development bias contact 121 remain in contact with each other, while the friction between the end surfaces of the developing roller 9c and developing roller bearing 9j is reduced to allow the developing roller 9c to rotate smoothly.

The toner remainder detection contact 122 illustrated in FIG. 8 is attached to the image developing chamber frame 12, being exposed upstream of development bias contact 121 relative to the direction in which the process cartridge B is inserted (direction of an arrow mark X in FIG. 9). As is evident from FIG. 19, the toner remainder detection contact 122 is a part of the rod antenna 9h which is formed of electrically conductive material such as metallic wire and is extended in the lengthwise direction of the developing roller 9c. As described previously, the rod antenna 9h stretches across the entire length of the developing roller 9c, holding a predetermined distance from the developing roller 9c. It comes in contact with the toner detection contact member 126 of the apparatus main assembly 14 as the process cartridge B is inserted into the apparatus main assembly 14. The capacitance between the rod antenna 9h and the developing roller 9c changes according to the amount of the toner prevent between the two. Therefore, the change in this capacitance is detected as potential difference by a control section (unillustrated) electrically connected to the toner detection contact member 126 of the apparatus main assembly 14 to determine the amount of the toner remainder.

The toner remainder means an amount of toner which induces a predetermined amount of capacitance when the toner is placed between the developing roller 9c and the rod antenna 9h. In other word, the control section detects that the amount of the toner in the toner container 11A has been reduced to a predetermined amount; the control section of the apparatus main assembly 14 detects through the toner remainder detection contact 122 that the capacitance has reached a first predetermined value, and therefore, determines that the amount of the toner within the toner container 11A has dropped to a predetermined amount. Upon detecting that the capacitance has reached the first value, the control section of the apparatus main assembly 14 informs the user that the process cartridge B should be replaced; for example, it flashes an indicator light or sounds a buzzer. On the contrary, when the control section detects that the capacitance shows a predetermined second value which is smaller than the predetermined first value, it determines whether the process cartridge B has been replaced in the apparatus main assembly 14. It does not allow the image forming operation of the apparatus main assembly 14 to be started unless it detects the completion of the process cartridge B installation in the apparatus main assembly 14.

The control section may be enabled to inform the user of the absence of the process cartridge B in the apparatus main assembly 14, by flashing an indicator light, for example.

Next, connection between the electrical contacts of the process cartridge B and the electrical contact members of the apparatus main assembly 14 will be described.

Referring to FIG. 9, disposed on the internal surface of on the left-hand side wall of the cartridge accommodating space S in the image forming apparatus A are four contact members which come in contact with the aforementioned contacts 120-122 as the process cartridge B is inserted into the apparatus main assembles 14; a charge bias contact member 124 which comes electrically in contact with the charge bias contact 120; a development bias contact member 125 which electrically come in contact with the development bias contact 121; and a toner detection contact member 126 which comes electrically in contact with the toner remainder detection contact 122.

As illustrated in FIG. 9, the development bias contact member 125, the toner detection contact member 126, and the charging roller contact member 124 are disposed, facing upward, on the bottom surface of the cartridge accommodating space S, below the guide portion 16a and adjacent to the left-hand side wall. They are enabled to move elastically in the vertical direction.

At this point, the positional relationship between each contact and the guide will be described.

Referring to FIG. 6 which illustrates the process cartridge B in a substantially horizontal position, the toner remainder detection contact 122 is at the lowest level. The development bias contact 121 is positioned higher than the toner remainder detection contact 122, and the charge bias contact 120 is positioned higher than the development bias contact 121. The rotation controlling guide 13bL and the cylindrical guide 13aL are positioned higher than the charge bias contact 120, being approximately at the same level. In terms of the direction (indicated by the arrow mark X) in which the process cartridge B is inserted, positioned most upstream is the toner remainder detection contact 122, and the rotation controlling guide 13bL, the development bias contact 121, the cylindrical guide 13aL, and the charge bias contact 120, are disposed in this order toward downstream. With the provision of this positional arrangement, the charge bias contact 120 is positioned close to the charging roller 8; the development bias contact 121, close to the developing roller 9c; and the toner remainder detection contact 122, close to the rod antenna 9h. In other words, the distance between each contact and the related component can be reduced without intricately laying a long electrode in the process cartridge B and the image forming apparatus main assembly 14.

The dimension of the actual contact area of each contact is as follows. The charge bias contact 120 measures approximately 10.0 mm in both the horizontal and vertical directions; the development bias contact 121, approximately 6.5 mm in the vertical direction and approximately 7.5 mm in the horizontal direction; and the toner remainder detection contact 122, 2.0 mm in diameter and approximately 18.0 mm in the horizontal direction. The charge bias contact 120 and the development bias contact 121 are rectangular. In measuring the dimension of the contact area, "vertical" means the direction parallel to the direction X in which the process cartridge B is inserted, and "horizontal" means the direction perpendicular to the direction X.

The toner remainder detection contact member 126 is also an electrically conductive plate spring. It is disposed adjacent to the guide portion 16a, being next to the guide portion 16a in terms of the horizontal direction, but below in terms of the vertical direction. The other contact members 124 and 125 are also disposed adjacent to the guide portion 16a, being slightly farther away from the guide portion 16a than the toner remainder detection contact member 126 is terms of the horizontal direction, and below the guide portion 16a in terms of the vertical direction. The contact members 124 and 125 are each provided with a compression type coil spring 129, and therefore, they project upward from their holders 127. This arrangement will be described more specifically referring to the charging roller contact member 124. Referring to the enlarged view of the charging roller contact member 124 in FIG. 30B, the charging roller contact member 124 is placed in the holder 127 so that it is allowed to project upward from the holder 127 without slipping out. Then, the holder 127 is fixed to the electrical substrate 128 attached to the apparatus main assembly 14. The contact member 124 is electrically connected to the wiring pattern through an electrically conductive compression type coil spring 129.

Before the process cartridge B inserted in the image forming apparatus A is guided to a predetermined position by the guide portion 16a, the contact members 124-126 of the image forming apparatus A remain projected by the springs as far as they are allowed to project. In this state, none of the contact members 124-126 is in contact with their counterparts, that is, the contacts 120-122 of the process cartridge B. As the process cartridge B is inserted farther, the contact members 124-126 come in contact with the corresponding contacts 120-122 of the process cartridge B one by one. Then, as the cylindrical guide 13aL of the process cartridge B is fitted into the positioning groove 16b by additional inward movement of the process cartridge B, the contact members 124-126 of the apparatus main assembly 14 are pushed down by the corresponding contacts 120-122 of the process cartridge B (in the case of contacts 124 and 125, against the elastic force of the compression type coil springs 129 in the holder 127). As a result, the contact pressures between the contact members 124-126 and the corresponding contacts 120-122 are increased.

As described above, according to this embodiment of the present invention, as the process cartridge B is guided to a predetermined position in the apparatus main assembly 14 by the guide member 16, the contacts of the process cartridge B reliably make contact with the contact members of the apparatus main assembly 14.

As the process cartridge B is installed in the predetermined position, the charge bias contact 120 and the charging roller contact member 124 becomes electrically connected to allow high voltage (voltage composed by superposing AC voltage and DC voltage) to be applied to the charging roller 8. The development bias contact 121 and the development bias contact member 125 make electrical connection to each other to allow high voltage to be applied to the developing roller 9*c*. The toner remainder detection contact 122 comes electrically in contact with the toner detection contact member 126, and information reflecting the capacitance between the developing roller 9*c* and the rod antenna 9*h* (contact 122) is transmitted to the apparatus main assembly 14 through the contact 122.

Further, said contacts of the process cartridge B are positioned on one side of the cartridge frame. Therefore, the mechanical members and the electrical wiring members of the image forming apparatus main assembly 14 and the process cartridge B can be separately positioned on the appropriate sides of the cartridge accommodating space S, and the process cartridge B, to reduce the number of assembly steps and simplify the maintenance.

As the lid 35 is closed after the process cartridge B is inserted into the image forming apparatus main assembly 14, the coupling device on the process cartridge side connects with the coupling device on the apparatus main assembly side (discussed below) in synchronism with the movement of the lid 35, enabling the photosensitive drum 7 and the like to receive driving force from the apparatus main assembly 14 to be rotated.

Further, positioning each electrical contact in the above described manner makes it possible to reduce the distance the corresponding electrode must be routed in the cartridge frame.

(Coupling and Driving Structure)

The description will be made as to a structure of coupling means which is a drive transmission mechanism for transmitting the driving force to the process cartridge B from the main assembly 14 of the image forming apparatus.

Referring to FIG. 11, there is shown a longitudinal sectional view of a coupling portion wherein the photosensitive drum 7 is mounted to the process cartridge B.

Cartridge side coupling means is provided at one longitudinal end of the photosensitive drum 7 mounted to the process cartridge B, as shown in FIG. 11. The coupling means is in the form of a male coupling shaft 37 (circular column configuration) formed on a drum flange 36 fixed to the one end of the photosensitive drum 7. The end surface 37*a*1 of the projection 37*a* is parallel with the end surface of the male shaft 37. The male shaft 37 is engageable with a bearing 38 to function as a drum shaft. In this example, the drum flange 36, male coupling shaft 37 and the projection 37*a* are integrally formed. The drum flange 36 is integrally provided with a helical drum gear 7*b* to transmit the driving force to the developing roller 9*c* in the process cartridge B. Therefore, as shown in FIG. 11, the drum flange 36 is an integrally molded product of plastic resin material having a drum gear (helical gear) 7*b*, male shaft 37, and the projection 37*a* to constitute a driving force transmitting part having a function of transmitting a driving force.

Figure 40A:
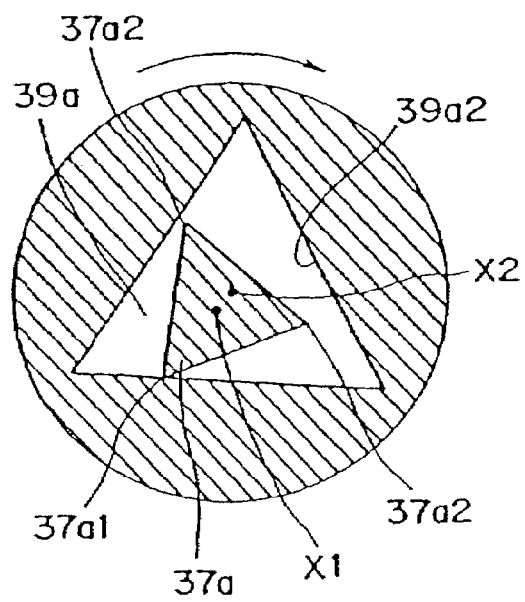
FIG. 40 (a) is a cross section of a projection and a recess and FIG. 40 (b) depicts the state of engagement between the projection and the recess.
Figure 40B:
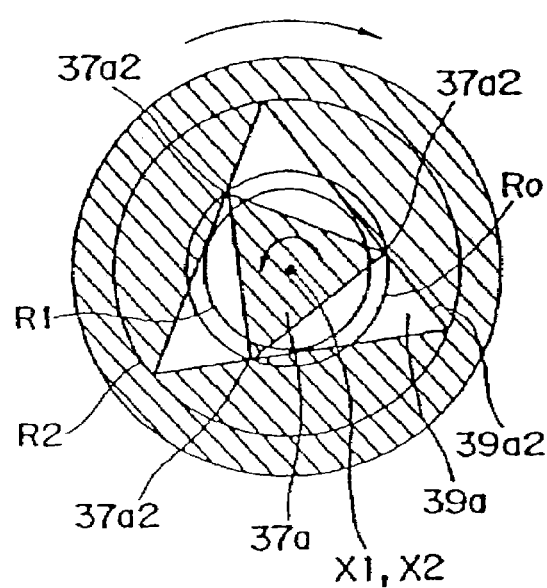

The projection 37*a* has a configuration of twisted prism, and more particularly, it has a cross-section of a substantially equilateral triangle, and is gradually twisted to a small extent in the axial direction. The corner portion of the prism is rounded. The recess 39*a* for engaging with the projection 37*a* has a cross-section of polygonal shape, and is gradually twisted to a small extent in the axial direction. The projection 37*a* and the recess 39*a* are twisted in the same direction with the same twisting pitch. The section of said recess 39*a* is of a substantially triangular shape in this embodiment. The recess 39*a* is provided in a female coupling shaft 39*b* which is integral with a gear 43 in the main assembly 14 of the apparatus. The female coupling shaft 39*h* is rotatable and movable in the axial direction relative to the main assembly 14 of the apparatus. With this structure of this example, when the process cartridge B is mounted to the main assembly 14 of the apparatus, the projection 37*a* enters the recess 39*a* provided in the main assembly 14 (FIG. 40(*a*)). When the recess 39*a* starts to rotate, the recess 39*a* and the projection 37*a* are brought into engagement with each other. When the rotating force of the recess 39*a* is transmitted to the projection 37*a*, the edge lines 37*a*2 of the substantially equilateral triangle projection 37*a* and the inner surfaces 39*a*2 of the recess 39*a*, are uniformly contacted to each other, and therefore, the axes are aligned (FIG. 4(*b*)). To accomplish this, the diameter of the circumscribed circle R0 of the male coupling projection 37*a* is larger than that of the inscribed circle R1 of the female coupling recess 39*a*, and is smaller than that of the circumscribed circle R2 of the female coupling recess 39*a*. The twisting produces such a force that projection 37*a* is pulled toward the recess 39*a*, so that end surface of the projection 37*a*1 is abutted to the bottom 39*a*1 of the recess 39*a*. Thus, a thrust force is produced to urge the drum gear 7*b* in the direction of an arrow d, and therefore, the photosensitive drum 7 integral with the projection 37*a* is stably positioned in the main assembly 14 of the image forming apparatus both in the axial direction and in the radial direction.

In this example, the twisting direction of the projection 37*a* is opposite from the rotational direction of the photosensitive drum 7 in the direction from the bottom trunk of the projection 37*a* toward the free end thereof, as seen from the photosensitive drum 7; the twisting direction of the recess 39*a* is opposite in the direction from the inlet of the recess 39*a* toward the inside; and the twisting direction of the drum gear 7*b* of the drum flange 36 is opposite from the twisting direction of the projection 37*a*.

The male shaft 37 and the projection 37*a* are provided on the drum flange 36 such that when the drum flange 36 is mounted to end of the photosensitive drum 7, they are coaxial with the axis of the photosensitive drum 7. Designated by 36*b* is an engaging portion which is engaged with the inner surface of the drum cylinder 7*d* when the drum flange 36 is mounted to the photosensitive drum 7. The drum flange 36 is mounted to the photosensitive drum 7 by crimping or bonding. The circumference of the drum cylinder 7*d* is coated with a photosensitive layer 7*e*.

As described hereinbefore, the process cartridge B of this embodiment is as follows:

A process cartridge detachably mountable to a main assembly of an forming apparatus 14, wherein said main assembly includes a motor 61, a main assembly side gear 43 for receiving driving force from said motor 61 and a hole 39*a* defined by twisted surfaces, said hole 39a being substantially coaxial with said gear 43; an electrophotographic photosensitive drum 7;

process means (8, 9, 10) actable on said photosensitive drum 7; and a twisted projection 37 engageable with said twisted surfaces, said projection 37 being provided at a longitudinal end of said photosensitive drum 7, wherein when said main assembly side gear 43 rotates with said hole 39a and projection 37 engaged with each other, rotational driving force is transmitted from said gear 43 to said photosensitive drum 7 through engagement between said hole 39a and said projection 37.

The twisted projection 37 is provided at a longitudinal end of said photosensitive drum 7, and has a non-circular cross-section and substantially coaxial with a rotation axis of said photosensitive drum 7, wherein said projection 37 of said photosensitive drum 7 has such a dimension and configuration that it can take a first relative rotational position with respect to a recess 39a of the driving rotatable member (main assembly side gear 43) in which relative rotational movement therebetween is permitted, and a second relative rotational position with respect to said recess 39a of said driving rotatable member in which relative rotational movement is prevented in one rotational direction, while the rotation axis of said driving rotatable member and the rotation axis of said photosensitive drum 7 are substantially aligned.

As described in the foregoing, a spur gear 7n is fixed to the other end of the photosensitive drum 7.

Examples of the material of the spur gear 7n and the drum flange 36 include polyacetal, polycarbonate, polyamide and polybutylene terephthalate or another resin material. However, another material is usable.

Around the projection 37a of the male coupling shaft 37 of the process cartridge B, there is provided a cylindrical projection 38a (cylindrical guide 13aR) coaxial with the male shaft 37, which projection 38a is integral with a bearing 38 fixed to a cleaning frame 13. The projection 37a of the male coupling shaft 37 is protected when, for example, the process cartridge B is mounted or demounted, and therefore, it is not damaged or deformed. Thus, the possible play or vibration during driving through the coupling due to damage of the projection 37a, can be prevented.

The bearing 38 may function as a guiding member when the process cartridge B is mounted or demounted relative to the main assembly 14 of the image forming apparatus. More particularly, when the process cartridge B is mounted to the main assembly 14 of the image forming apparatus, the projection 38a of the bearing 38 and the side guide portion 16c of the main assembly are contacted, and the projection 38a functions to position the process cartridge B to the mounting position (guide 13aR) to facilitate the mounting and demounting of the process cartridge B relative to the main assembly 14 of the apparatus. When the process cartridge B is mounted to the mounting position, the projection 38a is supported by a positioning groove 16d formed in the guide portion 16c.

Among the photosensitive drum 7, drum flange 36 and the male coupling shaft 37, there is a relation shown in FIG. 11. More particularly, H>F≧M, and E>N, where H is an outer diameter of the photosensitive drum 7; E is circle diameter of a dedendum of the drum gear 7b; F is a diameter of the bearing of the photosensitive drum 7 (an outer diameter of the shaft portion of the male coupling shaft 37, and an inner diameter of the bearing 38); M is a circumscribed circle diameter of the male coupling projection 37a; and N is a diameter of the engaging portion between the photosensitive drum 7 and the drum flange 36 (the inner diameter of the drum).

By E>F, the sliding load torque at the bearing portion can be reduced than when the drum cylinder 7d is born; by F>M, the mold structure can be simplified since no undercut portion is provided, in view of the fact that when the flange portion is molded, the mold is divided normally in the direction of a direction of arrow p in the Figure.

By E>N, the mold configuration of the gear portion is formed above the left mold as seen in the direction of mounting of the process cartridge B, and therefore, the right-hand mold can be simplified to improve the durability of the mold.

Figure 25:
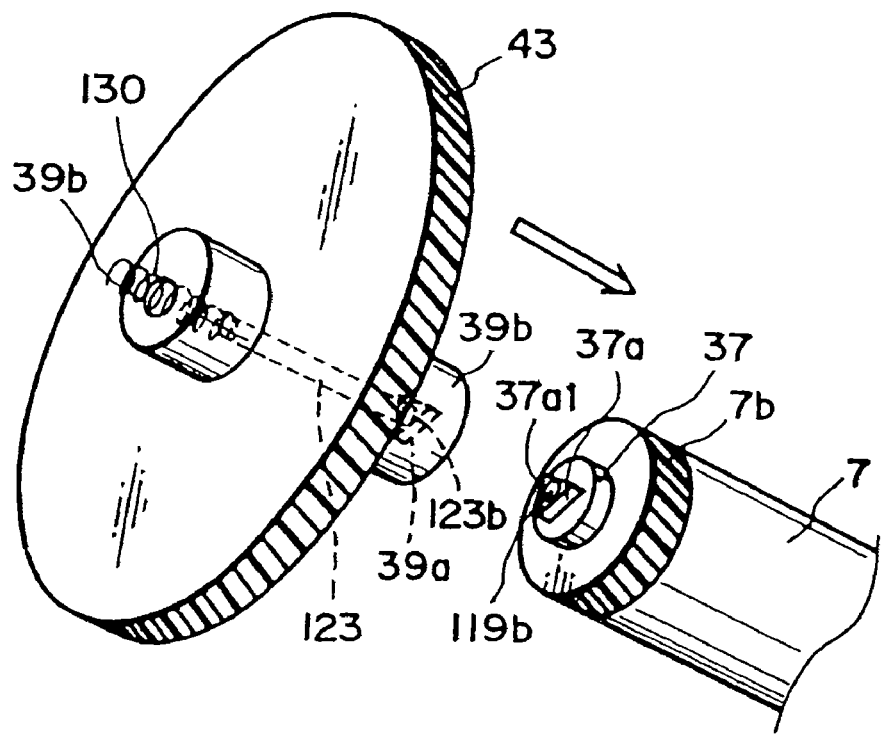
FIG. 25 is a perspective view of a coupling provided on the apparatus main assembly side, and a coupling provided on the process cartridge side.
Figure 26:
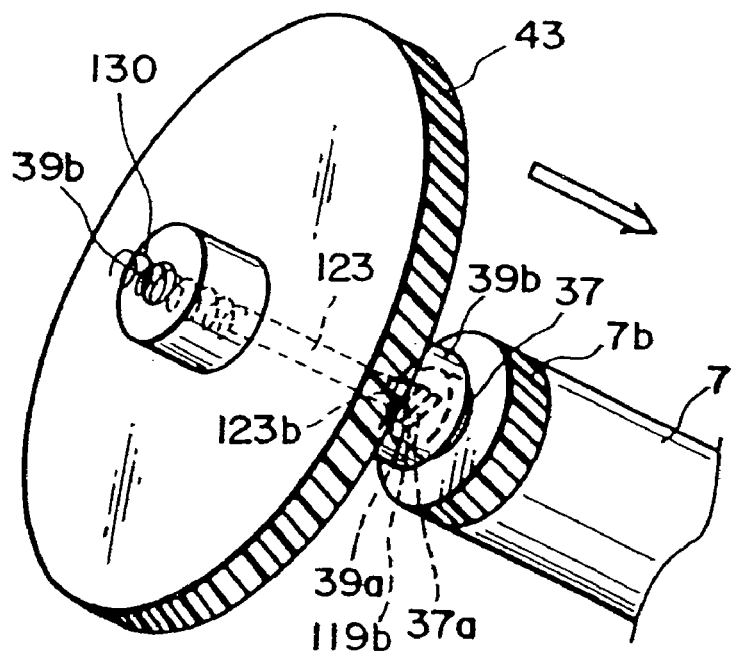
FIG. 26 is a perspective view of the coupling provided on the apparatus main assembly side, and the coupling provided on the process cartridge side.

The main assembly 14 of the image forming apparatus is provided with coupling means of the main assembly. The coupling means of the main assembly has the female coupling shaft 39b (circular column configuration) at a position aligned with the rotation axis of the photosensitive drum when the process cartridge B is inserted (FIGS. 11, 25). The female coupling shaft 39b, as shown in FIG. 11, is a driving shaft integral with the large gear 43 for transmitting the driving force to the photosensitive drum 7 from the motor 61. The female shaft 39b is projected from the lateral edge of the large gear 43 at the center of rotation of the large gear 43. In this example, the large gear 43 and the female coupling shaft 39b are integrally molded.

The large gear 43 in the main assembly 14 is a helical gear, which is in meshing engagement with a small helical gear 62 fixed to or integral with the shaft 61a of the motor 61; the twisting directions and the inclination angles thereof are such that when the driving force is transmitted from the small gear 62, female shaft 39b is moved toward the male shaft 37 by the thrust force produced. Thus, when the motor 61 is driven for image formation, the female shaft 39b is moved toward the male shaft 37 by the thrust force to establish engagement between the recess 39a and the projection 37a. The recess 39a is provided at the end of the female shaft 39b in alignment with the center of rotation of the female shaft 39b.

In this embodiment, the driving force is directly transmitted from the small gear 62 of the motor shaft 61a to the large gear 43, but it may be transmitted through a speed reduction gear train, belt-pulley means, a couple of friction rollers, a combination of a timing belt and a pulley.

Referring to FIGS. 24 and 27 to 29, a description will be made as to a structure for engaging the recess 39a and the projection 37a in interrelation with the closing operation of the openable cover 35.

Figure 29:
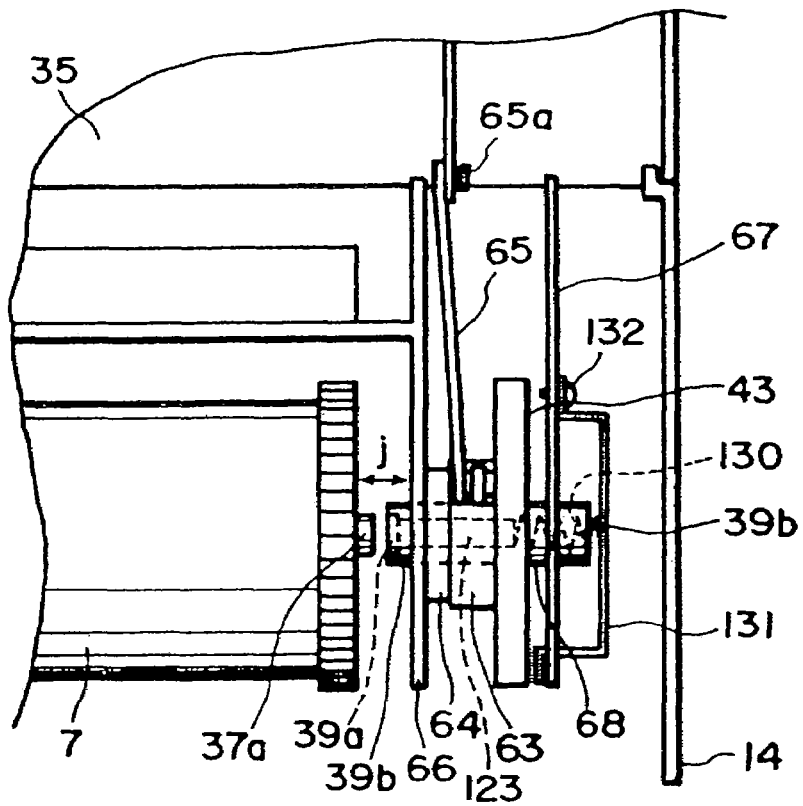
FIG. 29 is a front view of the indented coupling shaft and its adjacencies as seen while the process cartridge in the apparatus main assembly is driven.

As shown in FIG. 29, the larger gear 43 is between the side plate 67 and the side plate 66 in the main assembly 14, and the female coupling shaft 39b coaxially integral with the large gear 43 is rotatably supported by the side plates 66, 67. An outer cam 63 and an inner cam 64 are closely inserted between the large gear 43 and the side plate 66. The inner cam 64 is fixed to the side plate 66, and the outer cam 63 is rotatably engaged with the female coupling shaft 39b. The surfaces of the outer cam 63 and the inner cam 64 which are substantially perpendicular to the axial direction and which are faced to each other, are cam surfaces, and are screw surfaces coaxial with the female coupling shaft 39b and are contacted to each other. Between the large gear 43 and the side plate 67, a compression coil spring 68 is compressed and fitted around the female coupling shaft 39b.

Figure 27:
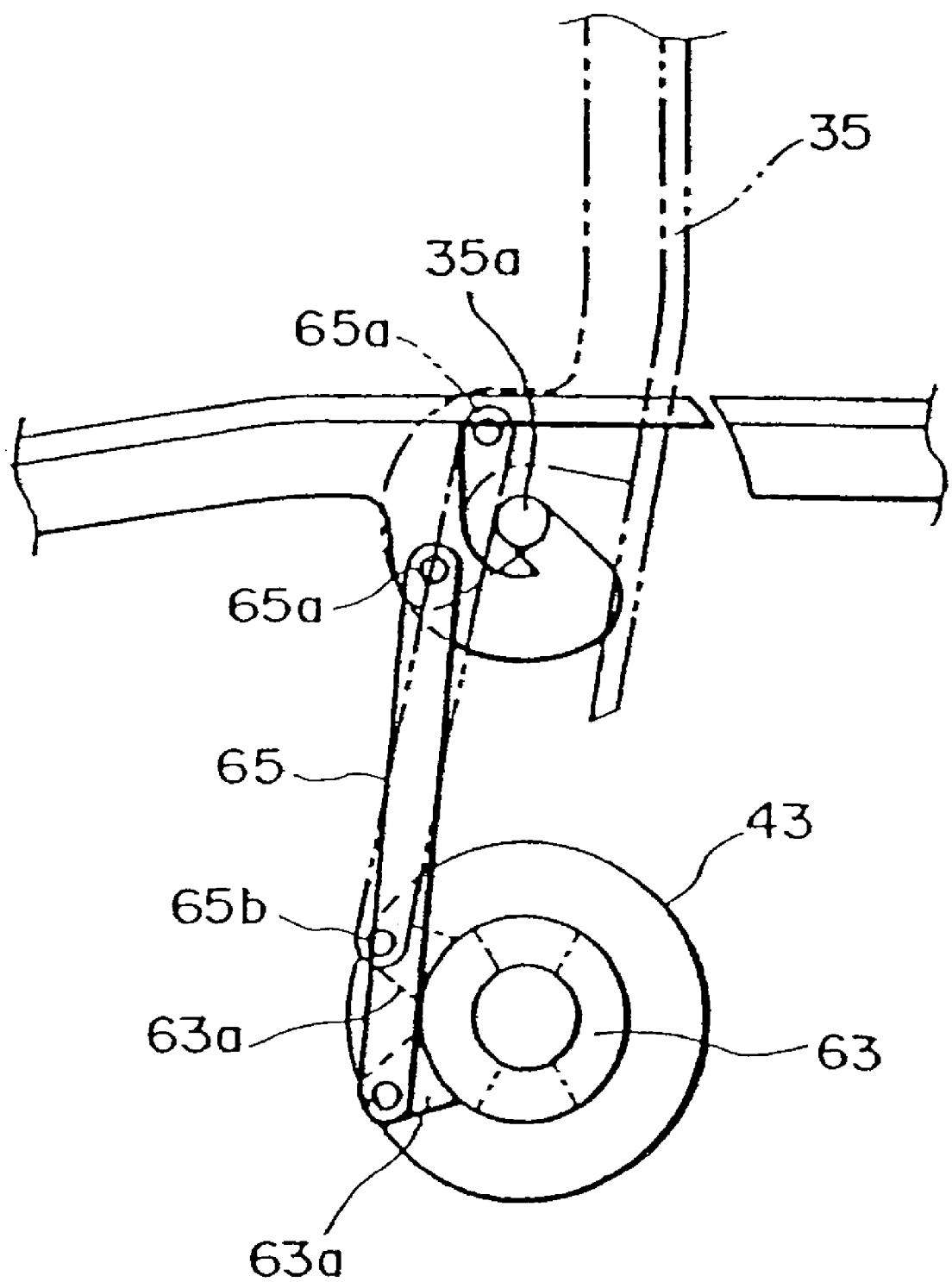
FIG. 27 is a section of the structure which links the lid of the apparatus main assembly, and the coupling portion of the apparatus main assembly.

As shown in FIG. 27, an arm 63a is extended from an outer periphery of the outer cam 63 in a radial direction, and an end of the arm 63a is coupled with an end of a link 65 by a pin 65b at a position opposite from the openable cover 35. The other end of the link 65 is coupled to the cover 35 by a pin 65a.

Figure 28:
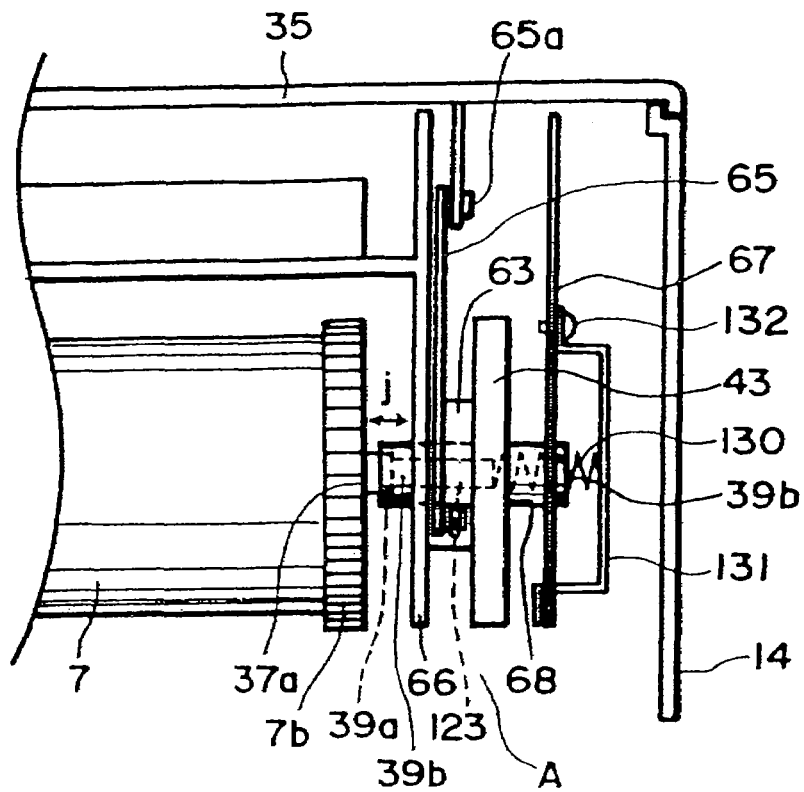
FIG. 28 is a front view of the indented coupling shaft and the adjacencies thereof as seen while the process cartridge in the apparatus main assembly is driven.

FIG. 28 is a view as seen from the right in FIG. 27, and when the openable cover 35 is closed, the link 65, outer cam 63 and the like are at the positions shown in the figure, where the male coupling projection 37a and the recess 39a are engaged so that driving force can be transmitted from the large gear 43 to the photosensitive drum 7. When the openable cover 35 is opened, the pin 65a is rotated upward about the fulcrum 35a, so that arm 63a is pulled up through the link 65, and the outer cam 63 is rotated; thus, relative sliding motion is caused between the outer cam 63 and the inner cam 64 to move the large gear 43 away from the photosensitive drum 7. At this time, the large gear 43 is pushed by the outer cam 63, and is moved against the compression coil spring 68 mounted between the side plate 67 and the large gear 43, by which the female coupling recess 39a is disengaged from the male coupling projection 37a as shown in FIG. 29 to release the coupling to bring the process cartridge B into demountable state.

On the contrary, when the openable cover 35 is closed, the pin 65a connecting the link 65 with the openable cover 35, is rotated downward about the fulcrum 35a, and the link 65 is moved downward to push the arm 63a down, so that outer cam 63 is rotated in the opposite direction, by which the large gear 43 is moved to the left by the spring 68 to a position shown in FIG. 28, so that large gear 43 is set again at a position of FIG. 28, and the female coupling recess 39a is engaged with the male coupling projection 37a to re-establish a drive transmittable state. Thus, the demountable state and the drive transmittable state of the process cartridge B are established in response to opening and closing of the openable cover 35. When the outer cam 63 is rotated in the opposite direction by the closing of the openable cover 35 to move the large gear 43 to the left from the position of FIG. 29, the female coupling shaft 39b and the end surface of the male coupling shaft 37 may be abutted to each other so that male coupling projection 37a and the female coupling recess 39a may not be engaged with each other. However, they will be brought into engagement as soon as starting of the image forming apparatus A, as will be described hereinafter.

Thus, in this embodiment, as the process cartridge B is mounted to or demounted from the main assembly 14 of the apparatus, the openable cover 35 is opened. In interrelation with the opening and closing of the openable cover 35, the female coupling recess 39a is moved in the horizontal direction (the direction of arrow j). As the process cartridge B is mounted to or demounted from the main assembly 14, the coupling (37a, 39a) of the main assembly 14 and the process cartridge B are not to be engaged. And, they should not be engaged. Thus, the mounting and demounting of the process cartridge B relative to the main assembly 14 can be carried out smoothly. In this example, the female coupling recess 39a is urged toward the process cartridge B by the large gear 43 being urged by the compression coil spring 68. When the male coupling projection 37a and the recess 39a are initially brought into engagement, they may abut each other, and therefore, they are not properly engaged. When, however, the motor 61 is first rotated after the process cartridge B is mounted to the main assembly 14, the female coupling recess 39a is rotated, permitting the projection 37a and the recess 39a to be brought into engagement.

A description will now be made as to the configurations of the projection 37a and the recess 39a constituting the engaging portion of the coupling means.

The female coupling shaft 39b provided in the main assembly 14 is movable in the axial direction, as described hereinbefore, but it not movable in the radial direction. The process cartridge B is movable in its longitudinal direction and the cartridge mounting direction (x direction (FIG. 9)) when it is mounted in the main assembly. In the longitudinal direction, the process cartridge B is permitted to move between the guiding members 16R, 16L provided in the cartridge mounting space S.

When the process cartridge B is mounted to the main assembly 14, a portion of a cylindrical guide 13aL (FIGS. 6, 7 and FIG. 9) formed on the flange 29 mounted to the longitudinal end of the cleaning frame 13, is fitted substantially without gap into the positioning groove 16b (FIG. 9) of the main assembly 14 to accomplish correct positioning, and the spur gear 7n fixed to the photosensitive drum 7 is brought into meshing engagement with a gear (unshown) for transmitting the driving force to the transfer roller 4. On the other hand, at the other longitudinal end (driving side) of the photosensitive drum 7, a cylindrical guide 13aR formed on the cleaning frame 13, is supported by a positioning groove 16d provided in the main assembly 14.

By the cylindrical guide 13aR being supported in the positioning groove 16d of the main assembly 14, the drum shaft 7a and the female shaft 39b are aligned with the deviation not more than 2.00 mm, so that first aligning function in the coupling action process is accomplished.

By closing the openable cover 35, the female coupling recess 39a is moved horizontally to enter the projection 37a.

Then, at the driving side (coupling side), the positioning and the drive transmission are carried out as follows.

When the driving motor 61 of the main assembly 14 is rotated, the female coupling shaft 39b is moved toward the male coupling shaft 37 (the direction opposite from the direction of arrow d in FIG. 11), and when the phase alignment is reached between the male coupling projection 37a and the recess 39a (in this embodiment, the projection 37a and the recess 39a have substantially equilateral triangle configurations, the phase alignment is reach at each 120 degrees of rotation), they are brought into engagement, so that rotating force is transmitted to the process cartridge B from the main assembly 14 (from the state shown in FIG. 29 to the state shown in FIG. 28).

The sizes of the equilateral triangles of the male coupling projection 37a and the recess 39a are different; more particularly, the cross-section of the triangular recess of the female coupling recess 39a is larger than the cross-section of the triangular projection of the male coupling projection 37a, and therefore, they are smoothly bought into engagement.

The lower limit of the inscribed circle diameter of the triangular shape of the projection is about 8.0 mm from the standpoint of the necessary rigidity, and in this embodiment, it is 8.5 mm, and the inscribed circle diameter of the triangular shape of the recess is 9.5 mm, so that the gap is 0.5 mm.

In order to establish engagement of coupling with a small gap, it is desirable to establish a certain degree of alignment before the engagement. In this embodiment, in order to provide the concentricity of 1.0 mm desirable for the engagement with the gap of 0.5 mm, the projection length of the projection 38 of the cylindrical bearing is made longer than the projection length of the male coupling projection 37a, and the outside circumference of the female shaft 39a is guided by more than two projected guides 13aR4 provided in the projection 38a of the bearing, by which the concentricity before the coupling engagement between the projection 37 and the female shaft 39a is maintained at less than 1.0 mm, so as to stabilize the engaging action of the coupling (second aligning function).

When the image forming operation is started, the female coupling shaft 39b is rotated while the male coupling projection 37a is in the recess 39a, the inner surfaces of the female coupling recess 39a are brought into abutment to the three edge lines of the substantially equilateral triangular prism of the projection 37a, so that driving force is transmitted. At this time, the male coupling shaft 37 is moved to be aligned with the female shaft 39b such that inner surfaces of the female coupling recess 39a of the regular prism are uniformly contacted to the edge lines of the projection 37a.

Thus, the alignment between the male coupling shaft 37 and the female shaft 39b, are automatically established by the actuation of the motor 61. By the driving force transmitted to the photosensitive drum 7, the process cartridge B tends to rotate, by which a regulating abutment 13j (FIGS. 4, 5, FIGS. 6, 7 and FIG. 30) formed on the upper surface of the cleaning frame 13 of the process cartridge B, is urged to the fixing member 25 (FIGS. 9, 10 and FIG. 30) fixed to the main assembly 14 of the image forming apparatus, thus correctly positioning the process cartridge B relative to the main assembly 14.

When the driving is not effected (image forming operation is not carried out), the gap is provided in the radial direction between the male coupling projection 37a and the recess 39a, so that engagement and disengagement of the coupling are easy. When the driving is effected, the urging force is provided with stabilization, so that play or vibration there can be suppressed.

In this embodiment, the male coupling projection and recess have substantially equilateral triangle shapes, but the same effects can be provided when they are substantially regular polygonal in configuration. Substantially regular polygonal configuration is desirable since then the positioning can be effected with high precision, but this is not limiting, and another polygonal shape is usable if the engagement is established with axial force. The male coupling projection may be in the form of a male screw having a large lead, and the female coupling recess may be in the form of a complementary female screw. In such a case, triangle male and female screws having three leads corresponds the foregoing male coupling projection and female recess.

When the male coupling projection and the female recess are compared, the projection is more easily damaged, and has poorer mechanical strength. In view of this, this embodiment is such that male coupling projection is provided in the exchangeable process cartridge B, and the female coupling recess is provided in the main assembly 14 of the image forming apparatus which is required to have a higher durability than the process cartridge. However, the process cartridge B may have a recess, and the main assembly may have the projection, correspondingly.

Figure 33:
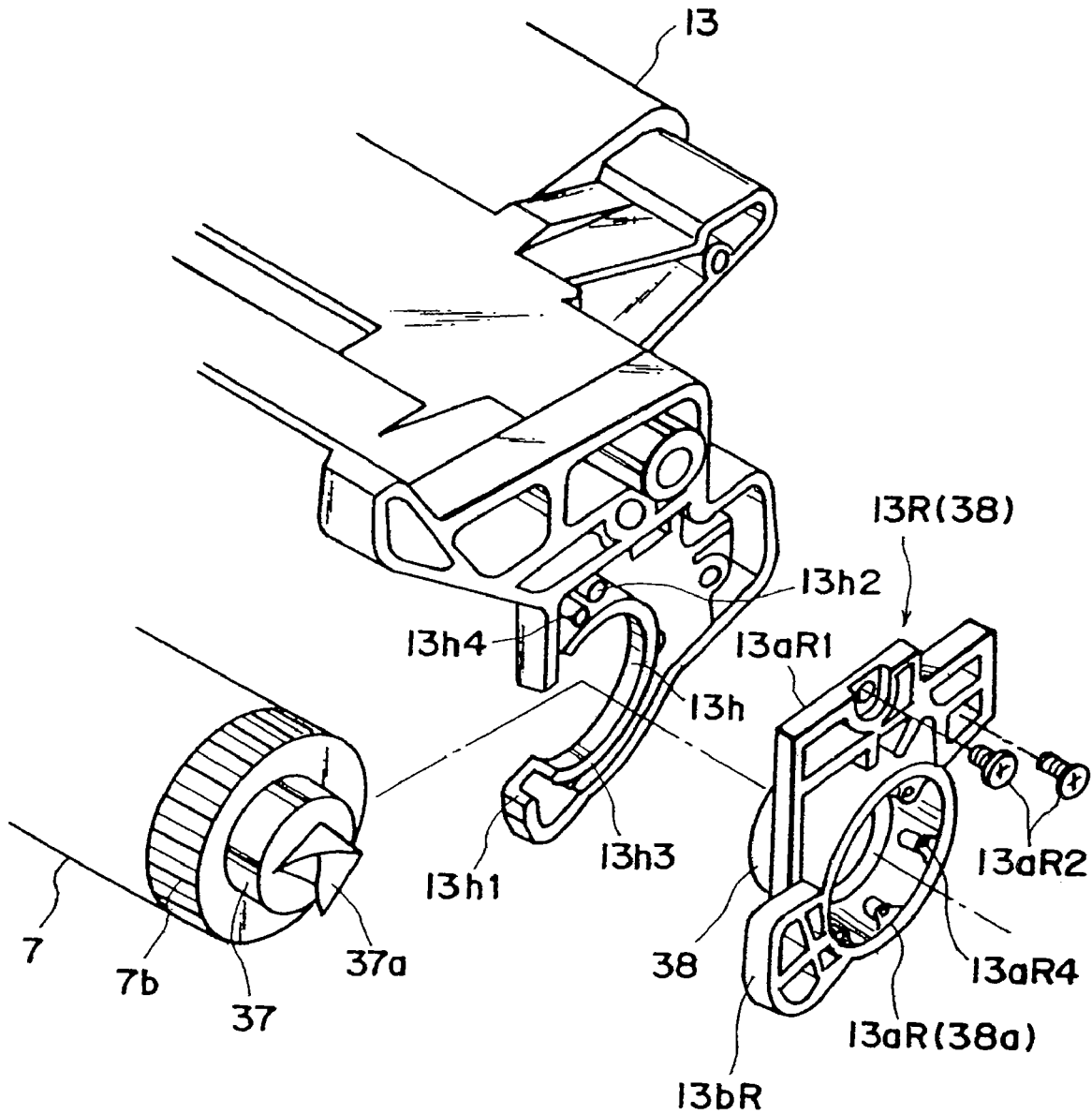
FIG. 33 is a perspective view of the longitudinal end portion of the process cartridge, depicting how the photosensitive drum is mounted in the cleaning chamber frame.

FIG. 33 is a perspective view showing in detail the mounting relation between the right-hand guiding member 13R and the cleaning frame 13;

FIG. 34 is a longitudinal sectional view wherein the right hand guiding member 13R is mounted to the cleaning frame 13; and FIG. 35 shows a part of a right side of the cleaning frame 13. FIG. 35 is a side view showing an outline of a mounting portion of the bearing 38 integrally formed with the right-hand guiding member 13R.

The description will be made as to the mounting to the cleaning frame 13 shown in FIG. 111 illustrating the right-hand guiding member 13R (38) having the integral bearing 38, and as to the mounting of the photosensitive drum 7 to the cleaning frame 13.

A rear surface of the right-hand guiding member 13R has the integral bearing 38 concentric with the cylindrical guide 13aR and having a small diameter, as shown in FIGS. 33, 34. The bearing 38 is extended to a cylindrical end thereof through a disk member 13aR3 provided at an axially (longitudinally) middle portion of the cylindrical guide 13aR. Between the bearing 38 and the cylindrical guide 13aR, a circular groove 38aR4 open to inside of the cleaning frame 13, is formed.

As shown in FIGS. 33-35, a side surface of the cleaning frame 13 is provided with a partly circular-cylindrical shaped hole 13h for receiving the bearing, and the gap portion 13h1 has faced end portions with a gap therebetween smaller than the diameter of the bearing mounting hole 13h and larger than the diameter of the coupling projected shaft 37. Since the coupling projected shaft 37 is engaged with the bearing 38, it is spaced from the bearing mounting hole 13h. A positioning pin 13h2 is formed integrally on the side surface of the cleaning frame 13, and is fitted closely into the flange 13aR1 of the guiding member 13R. By dosing so, the photosensitive drum 7 in the form of an unit can be mounted to the cleaning frame 13 in a transverse direction crossing with the axial direction (longitudinal direction), and the position of the right-hand guiding member 13R is correctly determined relative to the cleaning frame when the right-hand guiding member 13R is mounted to the cleaning frame 13 in the longitudinal direction.

When the photosensitive drum 7 unit is to be mounted to the cleaning frame 13, the photosensitive drum 7 unit is moved in the direction crossing with the longitudinal direction, as shown in FIG. 33, to insert it into the bearing mounting hole 13h while moving the male coupling shaft 37 through the gap portion 13h1 with the drum gear 7b being inside the cleaning frame 13. With this state, the drum shaft 7a integral with the left-hand guide 13aL shown in FIG. 11 is inserted through a lateral edge 13k of the cleaning frame 13 to be engaged with the spur gear 7n, and a small screw 13d is threaded through the flange 29 of the guide 13aL into the cleaning frame 13, thus fixing the guide 13aL to the cleaning frame to support one end portion of the photosensitive drum 7.

Then, the outer periphery of the bearing 38 integral with the right-hand guiding member 13R, is fitted into the bearing mounting hole 13h, and the inner circumference of the bearing 38 is engaged with the male coupling shaft 37; and then, the positioning pin 13h2 is fitted into the hole of the flange 13aR1 of the right-hand guiding member 13R. Then, a small screw 13aR2 is threaded through the flange 13aR1 into the cleaning frame 13, thus fixing the right-hand guiding member 13R to the cleaning frame 13.

In this manner, the photosensitive drum 7 is correctly and securely fixed to the cleaning frame 13. Since the photosensitive drum 7 is mounted to the cleaning frame 13 in the direction transverse to the longitudinal direction, the longitudinal end structures are simplified, and the longitudinal dimension of the cleaning frame 13 can be reduced. Therefore, the main assembly 14 of the image forming apparatus can be downsized. The cylindrical guide 13aL has the large flange 29 securely abutted to the cleaning frame 13, the drum shaft 7a integral with the flange 29 is closely fitted into the cleaning frame 13. The right-hand side cylindrical guide 13aR is coaxial with and integral with the bearing 38 supporting the photosensitive drum 7. The bearing 38 is enlarged into the bearing mounting hole 13h of the cleaning frame 13, and therefore, the photosensitive drum 7 can be positioned correctly perpendicularly to the feeding direction of the recording material 2.

The left side cylindrical guide 13aL, the large area flange 29 and the drum shaft 7a projected from the flange 29, are of integral metal, and therefore, the position of the drum shaft 7a is correct, and the durability is improved. The cylindrical guide 13aL is not worn even if the process cartridge B is repeatedly mounted to or demounted from the main assembly 14 of the image forming apparatus. As described hereinbefore in connection with the electric contacts, the electrical ground of the photosensitive drum 7 is easy. The right-hand side cylindrical guide 13aR has a larger diameter than the bearing 38, and the bearing 38 and the cylindrical guide 13aR are coupled by a disk member 13aR3. The cylindrical guide 13aR is coupled with the flange 13aR1, and therefore, the cylindrical guide 13aR and the bearing 38 are reinforced and stiffened each other. Since the right-hand cylindrical guide 13aR has a large diameter, it has enough durability against the repeated mounting-and-demounting of the process cartridge B relative to the image forming apparatus, although it is made of synthetic resin material.

Figure 37:
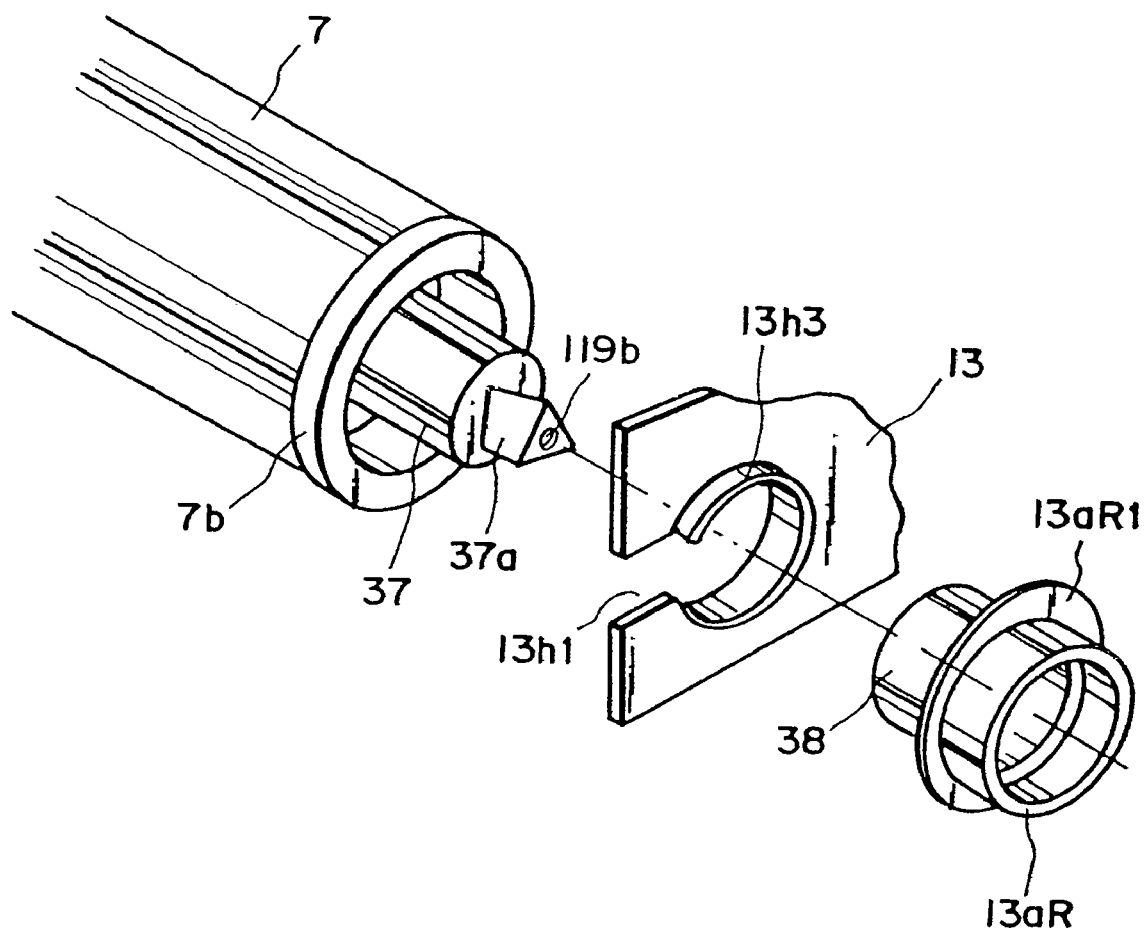
FIG. 37 is an exploded schematic view of the drum bearing portion.

FIGS. 36 and 37 illustrate another mounting method of the bearing 38 integral with the right-hand guiding member 13R to the cleaning frame 13.

These are schematic views and show the bearing 38 of the photosensitive drum 7 as a major part.

As shown in FIG. 36, there is provided a rib 13h3 extended circumferential at the outside edge of the bearing mounting hole 13h, and the outer periphery of the rib 13h3 is a partial cylindrical configuration. In this example, a portion of the right-hand cylindrical guide 13aR extended beyond the disk member 13aR3 to the flange 13aR1, is closely fitted around the outer periphery of the rib 13h3. The bearing mounting portion 13h of the bearing 38 and the outer periphery of the bearing 38 are loosely fitted. With this structure, although the bearing mounting portion 13h is non-continuous because of the gap portion 13h1, the opening of the gap portion 13h1 can be prevented.

For the same purpose, a plurality of confining bosses 13h4 may be provided at the outer periphery of the rib 13h3, as shown in FIG. 34.

The confining boss 13h4 is manufactured by metal mold with the following accuracy, for example; IT tolerance of 9 the grade for the circumscribed circle diameter, and the concentricity of −0.01 mm or less relative to the inside circumference of the mounting hole 13h.

When the drum bearing 38 is mounted to the cleaning frame 13, an inner peripheral surface 13aR5 of the drum bearing 38 opposed to the outside circumference confines the confining boss 13h4 of the cleaning frame 13, while the mounting hole 13h of the cleaning frame 13 and the outside circumference of the bearing 38 are engaged, so that possible misalignment during assembling due to the opening of the gap portion 13h1 can be prevented.

(Structure for Connecting Cleaning Chamber Frame (Drum Chamber Frame) and Image Developing Chamber Frame)

As stated previously, the cleaning chamber frame 13 and image developing chamber frame 12 of the process cartridge B are united after the charging roller 8 and the cleaning means 10 are assembled into the cleaning chamber frame 13 and the developing means 9 is assembled into the image developing chamber frame 12.

The essential characteristics of the structure which units the drum chamber frame 13 and the image developing chamber frame 12 will be described below with reference to FIGS. 12, 13 and 32. In the following description, "right-hand side and left-hand side" means the right-hand side and left-hand side as seen from above, with reference to the direction in which the recording medium 2 is conveyed.

The process cartridge removably installable in the main assembly 14 of an electrophotographic image forming apparatus comprises: an electrophotographic photosensitive drum 7; a developing means 9 for developing a latent image formed on the electrophotographic photosensitive drum 7; an image developing chamber frame 12 which supports the developing means 9; a drum chamber frame 13 which supports the electrophotographic photosensitive drum 7; a toner chamber frame 11 which houses toner storing portion; a compression type coil spring, one end of which is attached to the image developing chamber frame 12, being located above one of the lengthwise ends of the developing means, and the other end of which is in contact with the drum chamber frame 13; a first projection (right-hand side arm portion 19) which is projecting from the image developing chamber frame 12 in the direction perpendicular to the lengthwise direction of the developing means 9, being located above the lengthwise end of the developing means 9; a second projection (left-hand side arm portion 19); a first hole (right-hand side hole 20) of the first projection; a second hole (left-hand side hole 20) of the second projection; a first joint portion (recessed portion 21 on the right-hand side) which is located in the right-hand side lengthwise end of the drum chamber frame 13, above the electrophotographic photosensitive drum 7, and engages with the first projection (arm portion 19 on the right-hand side); a second joint portion (recessed portion 21 on the left-hand side) which is located in the left-hand side lengthwise end of the drum chamber frame 13, above the photosensitive drum 7, and is engaged with the second projection (arm portion 19 on the left-hand side); a third hole (hole 13e illustrated on the right-hand side in FIG. 12) of the first joint portion (recessed portion 21 on the right-hand side); a fourth hole (hole 13e illustrated on the left-hand side in FIG. 12) of the second joint portion (recessed portion 21 on the left-hand side); a first penetration member (joining member 22 on the right-hand side in FIG. 12) which is put through the first hole (right hole 20 and the third hole (right hole 13e), with the first projection (right arm portion 19) and the first joint portion (right recessed portion 21) being engaged with each other, to connect the drum chamber frame 13 and the image developing chamber frame 12; a second penetrating member (joining member 22 on the left-hand side in FIG. 12) which is put through the second hole (left hole 20) and the fourth hole (left hole 13e), with the second projection (left arm portion 19) and the second joint portion (left recessed portion 21) being engaged with each other, to connect the drum chamber frame 13 and the image developing chamber frame 12.

The image developing chamber frame 12 and drum chamber frame 13 of the process cartridge B, which are structured as described above, are joined through the following steps: the first joining step for joining the first projection (right arm portion 19) of the image developing chamber frame 12 and the first joint portion (right recessed portion 21) of the drum chamber frame 13; the second joining step for joining the second projection (left arm portion 19) and the second joint portion (left recessed portion 21); the first penetrating step for putting the first penetrating member (right joining member 22) through the first hole (right hole 20) of the first projection (right arm portion 19) and the third hole (right hole 13e) of the first joint portion (right recessed portion 21), with the first projection (right arm portion 19) and the first joint portion (right recessed portion 21) being engaged with each other, to connect the drum chamber frame 13 and the image developing chamber frame 12; the second penetrating step for putting the second penetrating member (left joining member 22) through the second hole (left hole 20) of the second projection (left arm portion 19) and the fourth hole (left hole 13e) of the second joint portion (left recessed portion 21), with the second projection (left arm portion 19) and the second joint portion (left recessed portion 21) being engaged with each other, to connect the image developing chamber frame 12 and the drum chamber frame 13. After being joined with each other through the above described steps, the image developing chamber frame 12 and the drum chamber frame 13 together constitute the process cartridge B.

According to this embodiment, the image developing chamber frame 12 and the drum chamber frame 13 can be easily joined simply putting the joining members 22 through their connective portions, and also can be easily separated simply by pulling the joining members 22 out, as is evident from the above description.

Among the above described steps, the developing means 9 comprises the developing roller 9c in advance, and the first joining step for joining the first projection and the first joint portion, and the second joining step for joining the second projection and the second joint portion, are carried out at the same time, wherein (1) the photosensitive drum 7 and the developing roller 9c are held in parallel;
(2) the developing roller 9c is moved along the peripheral surface of the photosensitive drum 7;
(3) the image developing chamber frame 12 is rotatively moved as the developing roller 9c is moved:
(4) the first and second projections (arm portions 19 on the right- and left-hand sides) enter the first and second joint portions (recesses 21 on the right- and left-hand sides) due to the rotative movement of the image developing chamber frame 12;
(5) the first and second projections (both arm portions 19) fully engage with the first and second joint portions (both recessed portions 21).

With the above steps being strictly followed, the arm portion 19 can be moved toward the recessed portion 21 by circularly moving the developing roller 9c along the peripheral surface of the photosensitive drum 7, with lengthwise ends of the photosensitive drum 7 having been already fitted with the spacer roller 9i. Thus, the point at which the arm portion 19 and the recessed portion 21 join becomes fixed. Therefore, the configuration of the arm portion 19 and the recessed portion 21 can be designed to make it easier to align the holes 20 of the arm portion 119 of the image developing chamber frame 12 and the holes 13e of both side walls of the recessed portion 21.

As stated previously, it is common practice to unite the image developing unit D and the cleaning unit C after the image developing unit D is formed by joining the toner chamber frame 11 and image developing chamber frame 12, and the cleaning chamber frame 13 and the charging roller 8 are assembled into the cleaning unit C.

The image developing chamber frame 12 and the drum chamber frame 13 are designed so that the holes 20 of the first and second projections, respectively, and the holes 13e of the first and second joint portions, respectively, become substantially aligned as the image developing chamber frame 12 and the drum chamber frame 13 are placed in contact with each other following the steps described above.

Figure 32:
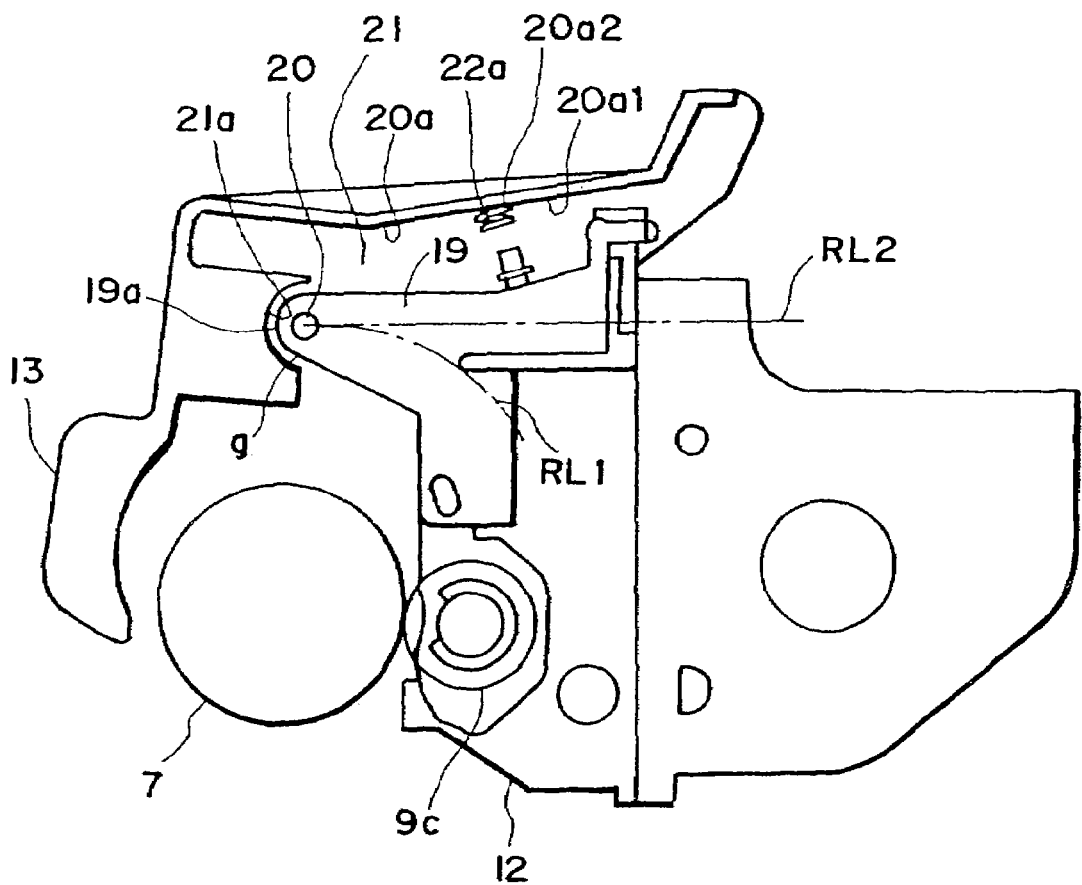
FIG. 32 is a vertical section of the joint between the drum chamber frame and the image developing chamber frame.

Referring to FIG. 32, the profile of the tip 19a of the arm portion 19 forms an arc whose center coincides with the center of the hole 20, and the profile of the bottom portion 21a of the recessed portion 21 forms an arc whose center coincides with the center of the hole 13e. The radius of the arc-shaped portion of the tip 19a of the arm portion 19 is slightly smaller than the radius of the arc-shaped bottom portion 21a of the recessed portion 21. This slight difference in radius between the arm portion 19 and the recessed portion 21 is such that when the bottom 21a of the recess is placed in contact with the tip 19a of the arm portion 19, the joining member 22 with a chambered tip can be easily put through the hole 13e of the drum chamber frame 13 (cleaning chamber frame 13) and then inserted into the hole 20 of the arm portion 19a. As the joining member 22 is inserted, an arc-shaped gap is formed between the tip 19 of the arm portion 19 and the bottom 21a of the recessed portion 21, and, the arm portion 19 is rotatively supported by the joining member 22. The gap g in FIG. 32 is exaggerated for ease of depiction, but the actual gap g is smaller than the size of the cambered portion of the tip of the joining member 22 or the size of the cambered edge of the hole 20.

Also referring to FIG. 32, when the image developing chamber frame 12 and drum chamber frame 13 are joined, they are moved so that the hole 20 of the arm portion 19 forms a locus RL1 or RL2, or a locus which falls between the loci RL1 and RL2. The interior surface 20a of the top wall of the recessed portion 21 is angled so that the compression type coil spring 22a is gradually compressed as the image developing chamber frame 12 and drum chamber frame 13 are moved toward each other as described above. In other words, the image developing chamber frame 12 and the drum chamber frame 13 are shaped so that as they are moved toward each other as described above, the distance between the portion of the image developing chamber frame 12, to which the compression type spring 22a is attached, and the aforementioned interior surface 20a of the top wall of the recessed portion 21, is gradually reduced. In this embodiment, the top end of the compression type coil spring 22a comes in contact with a portion 20a1 of the slanted interior surface 20a in the middle of the joining process, and after the image developing chamber frame 12 and the drum chamber frame 13 are completely joined, the compression type coil spring 22a remains in contact with a spring seat portion 20a2 of the slanted interior surface 20a, which continues from the slanted portion 20a1. The axial line of the compression type coil spring 22a and the plane of the spring seat portion 20a2 perpendicularly intersect.

Because the image developing chamber frame 12 and the drum chamber frame 13 are structured as descried above, it is unnecessary to compress the compression type coil spring 22a with the use of a dedicated compression means when the image developing chamber frame 12 and the drum chamber frame 13 are united; the spring 22a is automatically placed in a proper position to press the developing roller 9c against the photosensitive drum 7. In other words, the compression type coil spring 22a can be attached to the spring seat 12t of the image developing chamber frame 12 before the image developing chamber frame 12 and the drum chamber frame 13 are united.

The locus RL1 coincides with the circle whose center coincides with the center of the cross-section of the photosensitive drum 7, and the locus RL2 is substantially a straight line whose distance from the slanted surface 20a1 gradually reduces from the right hand side of the drawing toward the left-hand side.

Figure 31:
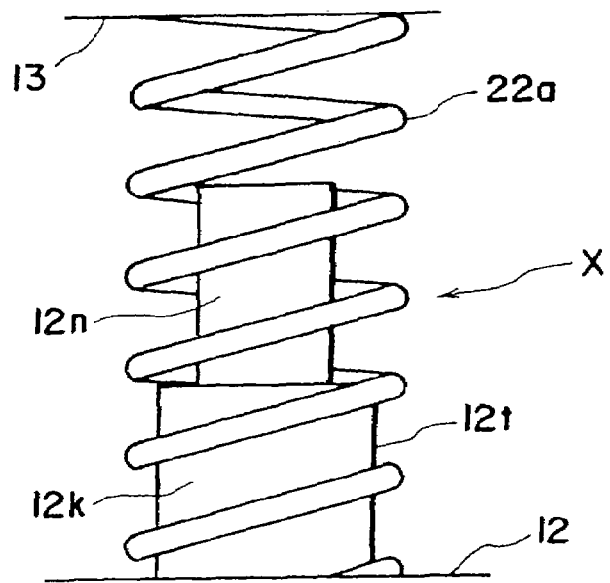
FIG. 31 is a side view of a compression type coil spring and its mount.

Referring to FIG. 31, the compression type coil spring 22a is held by the image developing chamber frame 12. FIG. 31 is a vertical section of the image developing chamber frame 12, at a vertical plane passed through the base of the arm portion 19, in parallel to the direction X in which the process cartridge B is inserted. The image developing chamber frame 12 has the spring holding portion 12t which protrudes upward from the top surface of the image developing chamber frame 12. This spring holding portion 12t comprises at least a spring holding cylindrical base portion 12k around which the compression type coil spring 22a is press-fitted, and a guide portion 12n which is given a smaller diameter than the base portion 12k so that the compression type coil spring 22a can be loosely fitted around it. The height of the spring holding base portion 12k must be greater than the height the bottommost loop of the compression type coil spring 22a reaches when the compression type coil spring 22a is in the least compressed state, and is desirable to be the height the second loop of the spring 22a reaches, or greater.

Referring to FIG. 12, the recessed portion 21 is between the external wall 13s of the drum chamber frame 13 and a partitioning wall 13t located slightly inward of the external wall 13s.

As regards the right-hand side recessed portion 21 of the drum chamber frame 13, which is located on the same lengthwise end of the drum chamber frame 13 as the drum gear 7b, the inward facing surface of the external wall 13s and the outward facing surface of the partitioning wall 13t, that is, the opposing two surfaces of the recessed portion 21, are perpendicular to the lengthwise direction of the drum chamber frame 13, and the arm portion 19 of the image developing chamber frame 12, which is located on the same lengthwise end of the image developing chamber frame 12 as the development roller gear 9k, exactly fits between these opposing two surfaces. On the other hand, the left-hand side recessed portion 21 of the drum chamber frame 13, which is located on the same lengthwise end of the drum chamber frame 13 as the spur gear 7n, and the arm portion 19 of the image developing chamber frame 12, which is inserted into this left-hand side recessed portion 21, loosely fit in terms of the lengthwise direction of the process cartridge B.

Therefore, the image developing chamber frame 12 and the cleaning chamber frame 13 are accurately positioned relative to each other in terms of the lengthwise direction of the process cartridge B. More specifically, this is due to the following reasons. It is easy to manufacture a drum chamber frame 13 having a precise distance between the opposing surfaces of the recessed portion 21 located at the lengthwise end of the drum chamber frame 13, and also an image developing chamber frame 12 having an arm portion 19 with an accurate width. Further, even when the measurement of the image developing chamber frame 12 and cleaning chamber frame 13 in the lengthwise direction thereof change due to their deformation caused by temperature increase, the distance between the opposing two surfaces of the recessed portion 21, and the width of the arm portion 19 which fits between these opposing two surfaces, scarcely change, due to their small measurements. In addition, the recessed portion 21 located on the same side as the spur gear 7n, and the arm portion 19 which is fitted into this recessed portion 21, are provided with a play in the lengthwise direction of the process cartridge B, and therefore, even if the measurements of the image developing chamber frame 12 and cleaning chamber frame 13 in the lengthwise direction change due to thermal deformation, no stress occurs between the image developing chamber frame 12 and the cleaning chamber frame 13 due to their thermal deformation.

(Drum Grounding Path)

Next, a drum grounding path through which the charge remaining in the photosensitive drum 7 is discharged to the apparatus main assembly 14 will be described.

In this embodiment, the photosensitive drum 7 is grounded through the driven side.

Referring to FIG. 11, the photosensitive drum 7 comprises a drum flange 34, which is solidly attached to one of the lengthwise ends of the drum cylinder 7d, the end opposite to the driven end, a portion of the flange 34 being fitted in the drum cylinder 7d. This drum flange 34 is rotatively supported by a drum shaft 7a fixed to a cleaning means frame 13. The material for the drum shaft 7a does not need to be limited to metallic material; for example, it may be electrically insulative synthetic resin.

On the other end of the drum cylinder 7d, the drum cylinder 7d is fitted with a drum flange 36, which is also solidly attached to the drum cylinder 7d, with a portion thereof fitted in the drum cylinder 7d. The flange 36 is provided with a lengthwise center hole, and an electrically conductive member 119 is fitted in this center hole of the flange 36, being enabled to freely move in the lengthwise direction of the photosensitive drum 7. The electrically conductive member 119 is in the form of a rod, and is formed of metallic material. One of the lengthwise ends of the member 119 is fixed to a grounding plate 118 disposed in contact with the inward surface 36c of the drum flange 36; one end 119a of the conductive member 119 is put through the center hole of the grounding plate 118 and is crimped. The grounding plate 118 is formed of metallic material and has elasticity. It has projections 118a, which are located, one for one, at the edges adjacent to the internal wall of the drum cylinder 7d. Each projection 118a is slightly tilted toward the driven end of the photosensitive drum 7, and bites into the internal surface 7d1 of the drum cylinder 7d due to the elasticity of the projection 18a. With the above arrangement, the electrically conductive member 119 is moved in the lengthwise direction thereof due to the elasticity of the grounding plate 118.

Figure 41:
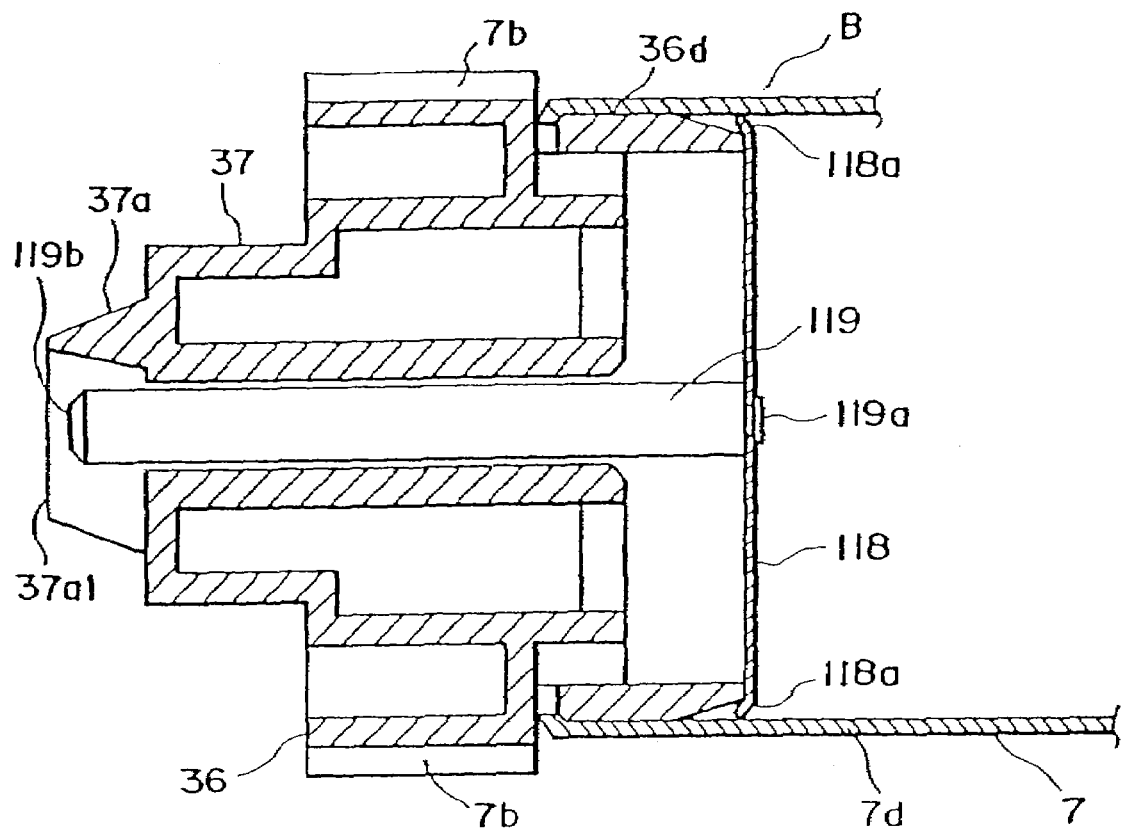
FIG. 41 is a lengthwise section of the ground contact on the photosensitive drum side.
Figure 42:
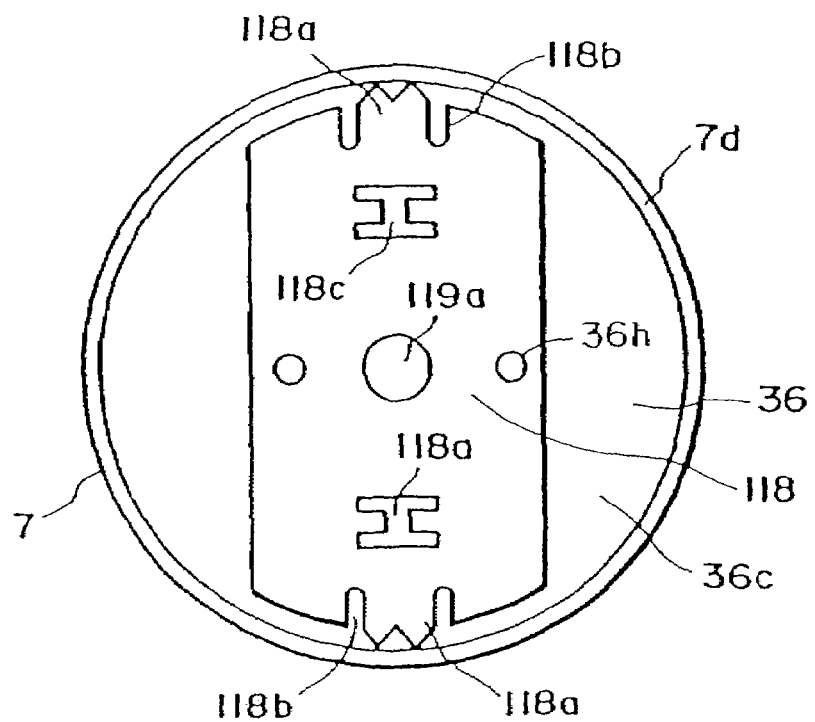
FIG. 42 is a frontal elevation of a grounding plate.

FIG. 41 is a lengthwise section of the ground contact on the photosensitive drum side illustrated in FIG. 11, depicting the sectional detail thereof. FIG. 42 is an elevation of the grounding plate 118. Referring to FIG. 42, the grounding plate 118 has a pair of opposing straight edges, and a pair of opposing curved edges, the contours of which are correspondent to the contour of the internal surface of the drum cylinder 7d. Each of the curved edge portions of the grounding plate 118 is provided with a pair of parallel grooves 118b, which separate the projections 118a from the rest of the grounding plate 118. Each projection 118a is slightly bent at the deepest end of the grooves 118b, that is, at the base of the projection 118a. A referential FIG. 36h designates a dowel which projects from the inward surface 36c of the drum flange 36. These dowels 36h are fitted in the corresponding holes 118d of the grounding plate 118d to prevent the grounding plate 118 from rotating relative to the drum flange 36. Further, the grounding plate 118 is provided with a pair of holes 118c, which are located between the projection 118a, and the center hole at which the inward end 119a of the electrically conductive shaft 119 is crimped to fix the shaft 119 and the grounding plate to each other. The hole 118c is provided to increase the flexibility of the grounding plate 118, around the hole 118c, so that the grounding plate 118 does not flex near the center hole, that is, the area adjacent to the crimped portion 119a of the electrically conductive shaft 119.

The outward end, that is, the ground contact portion 119b, of the electrically conductive member 119, is located on the inward side of the brim 37a1 of the hollow projection 37a located on the outward end of a male type coupler shaft portion 37. Therefore, when a process cartridge B is inserted into, or removed from, the apparatus main assembly 14, and when the process cartridge B is handled outside the apparatus main assembly 14, the ground contact 119b is well protected.

With the provision of the above arrangement, as the ground contact 119b is pushed inward in the lengthwise direction thereof, the center portion of the grounding plate 118 flexes inward of the drum cylinder 7d, so that the ground contact 119b is enabled to move in the axial direction thereof, even though the grounding plate 118 remains fixed to the drum cylinder 7d by the projections 118a located at the curved edge portions of the grounding plate 118.

Figure 43:
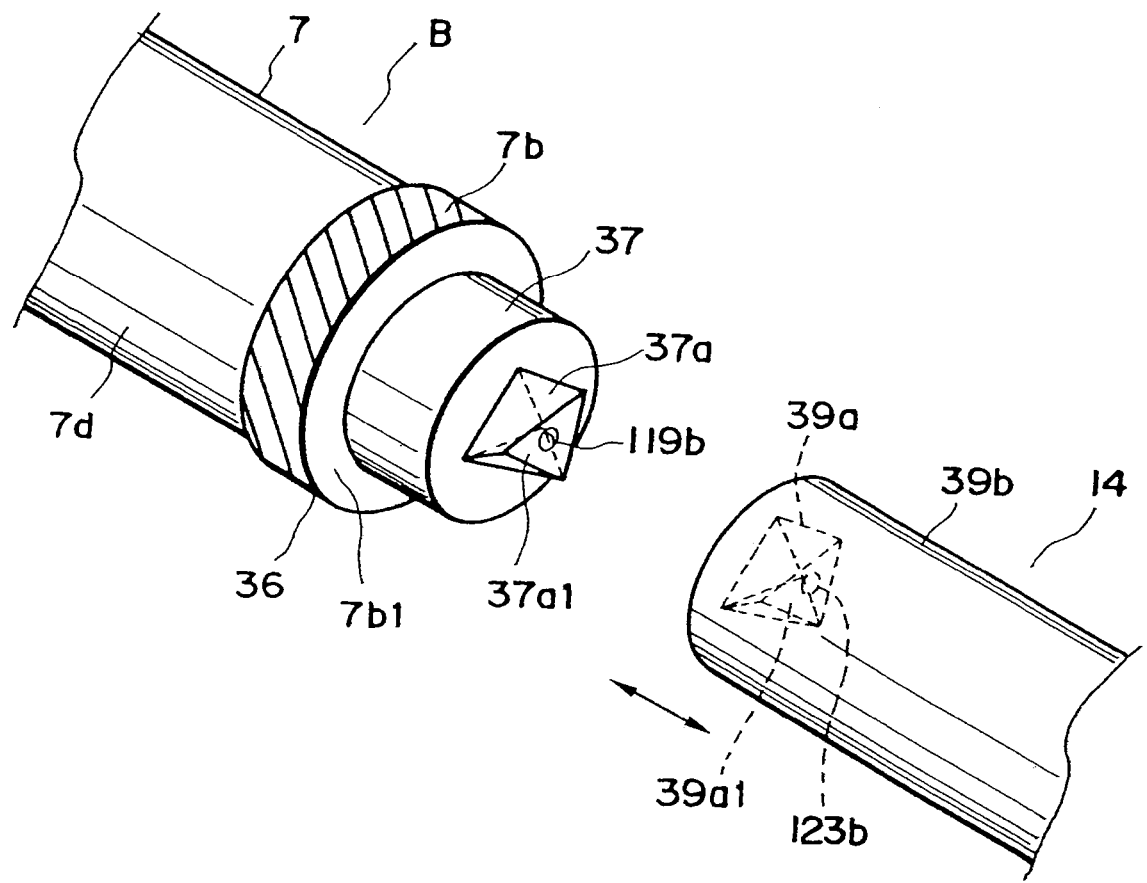
FIG. 43 is a perspective view of the coupling means with grounding contacts.

Referring to FIG. 43, the ground contact 119b is on the axial line of the hollow projection 37a (male type coupler shaft portion 37).

Next, referring to FIG. 11, on the apparatus main assembly side 14, a ground contact member 123 is put through the lengthwise axial portion of a female type coupler shaft 39b, being solidly fixed to the female type coupler shaft 39b. One end of the ground contact member 123 on the main assembly side constitutes a ground contact 123b on the apparatus main side which comes in contact with the ground contact 119b on the process cartridge side. The other end of the ground contact member 123 constitutes a sliding type terminal 123a, which is placed in contact with a free end portion of a plate spring 117 which is fixed to a steel side plate 67 of the apparatus main assembly 14 with the use of small screws 116. The ground contact 123b on the main assembly side slightly projects above the bottom surface of the coupling recess 39a of the coupling end of the female type coupler shaft 39b, simplifying a maintenance checkup. The plate spring 117 is formed of electrically conductive material, for example, spring steel, stainless steel, phosphor bronze, beryllium, bronze, or the like.

As for the material for the electrically conductive member 119, phosphor bronze, stainless steel, plated steel, or the like are usable. As for the material for the ground contact member 123, the same materials as those for the electrically conductive member 119 may be employed. It should be noted here that when spring steel is used as the material for the plate spring 117, phosphor bronze or beryllium bronze is desirable as the material for the sliding type terminal 123a from the standpoint of wear resistance.

As an operator closes a lid 35 of the apparatus main assembly 14 after mounting the process cartridge B in the apparatus main assembly 14, the female type coupler shaft 39b on the apparatus main assembly side moves toward the hollow projection 37a, and couples with the projection 37a, immediately or as soon as the female type coupler shaft 39b begins to rotate. During this coupling process, the ground contact 119b on the process cartridge side comes in contact with the ground contact 123b on the apparatus main assembly side before the brim 37a1 on the process cartridge side makes contact with the bottom surface 39a1 of the coupling recess 39a of the female type coupler shaft 39b. After making contact with the counterparts on the process cartridge side, the female type coupler shaft 39b and the ground contact member 123 are farther advanced against the elastic force of the grounding plate 118 by the elastic force of a compression type coil spring 68 (FIG. 28) which presses the female type coupler shaft 39b toward the male type coupler shaft portion 37, until the bottom surface 39a1 of the coupling recess 39a of the female type coupler shaft 39b makes contact with the brim 37a1 of the coupling projection 37a. Meanwhile, the elasticity of the plate spring 117 keeps the plate spring 117 in contact with the sliding type terminal 123a which advances with the female type coupler shaft 39b.

As the female type coupler shaft 39b begins to rotate, the coupling recess 39a generates such force that keeps on thrusting the coupling projection 37a into the coupling recess 39a, since the front end, relative to the inward direction, of the female type coupler shaft 39b is regulated. Therefore, the contact between the brim 37a1 of the coupling projection 37a and the bottom surface of the coupling recess 39a is reliably maintained; the coupling between the process cartridge side coupler shafts and the apparatus mains assembly side coupler shaft is rendered reliable. The ground contact member 123 on the apparatus main assembly side rotates with the female type coupler shaft 39b, and the sliding type terminal 123a remains in contact with the plate spring 117, sliding and rubbing against the plate spring 117. The speed at which the sliding type terminal 123a slides on the plate spring 117 is slow, and the sliding keeps better electrical contact between the two components.

Therefore, the charge remaining in the photosensitive drum 7 can be discharged to the side plate 67 through the electrically conductive member 119, the ground contact member 123, and the plate spring 117.

On the other hand, as the lid 35 is opened, the female type coupler shaft 39b moves in the direction to separate from the coupling projection 37a More specifically, first, the bottom surface 39a1 of the coupling recess 39a separates from the brim 37a1 of the coupling projection 37a. Next, the electrically conductive member 119 is moved for a short period by the resiliency of the grounding plate 118, with the ground contact 119b on the process cartridge B side following, that is, remaining in contact with, the ground contact 123b on the apparatus main assembly 14 side, and thereafter, the ground contacts 119b and 123b become separated. At the same time as the female type coupler shaft 39b retreats, the ground contact member 123 retracts, with the sliding type terminal 123a bending the spring plate 117, until the female type coupler shaft 39b becomes completely separated from the coupling projection 37a. At this point, the process cartridge B can be removed from the apparatus main assembly 14.

Figure 44:
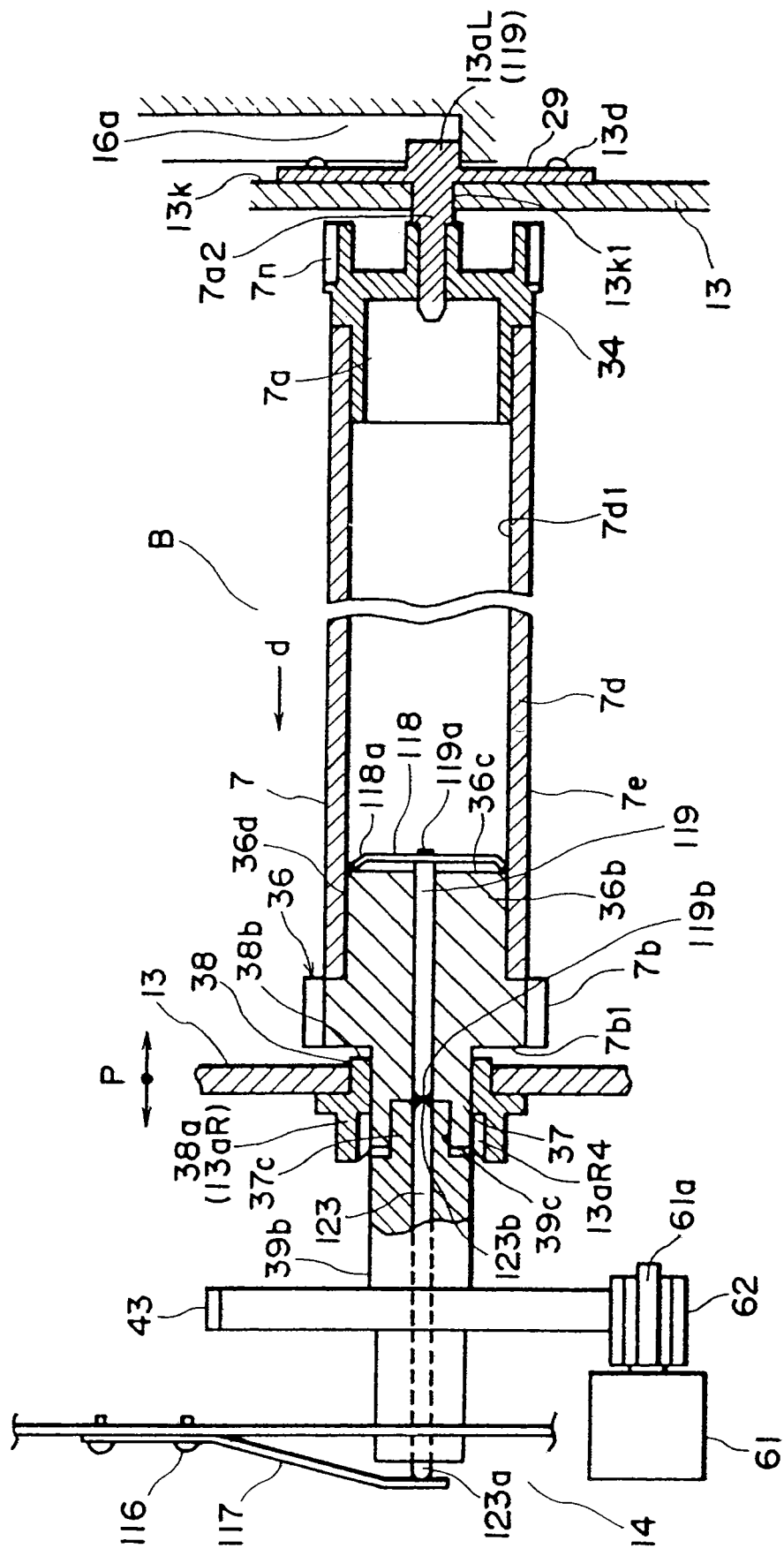
FIG. 44 is a lengthwise section of a photosensitive drum and the adjacencies thereof, depicting the structure which is capable of grounding a photosensitive member, as well as supporting it.
Figure 45:
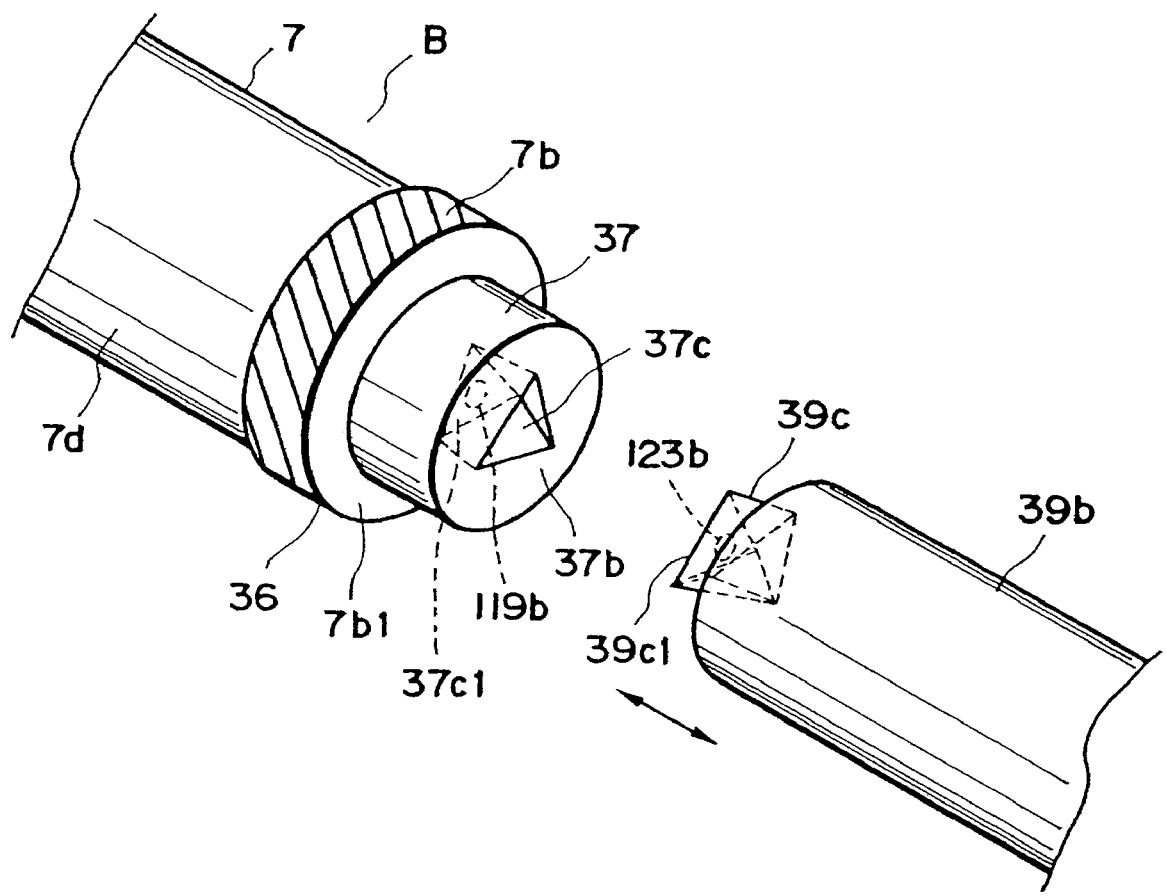
FIG. 45 is a perspective view of the coupling means with ground contacts.
Figure 46:
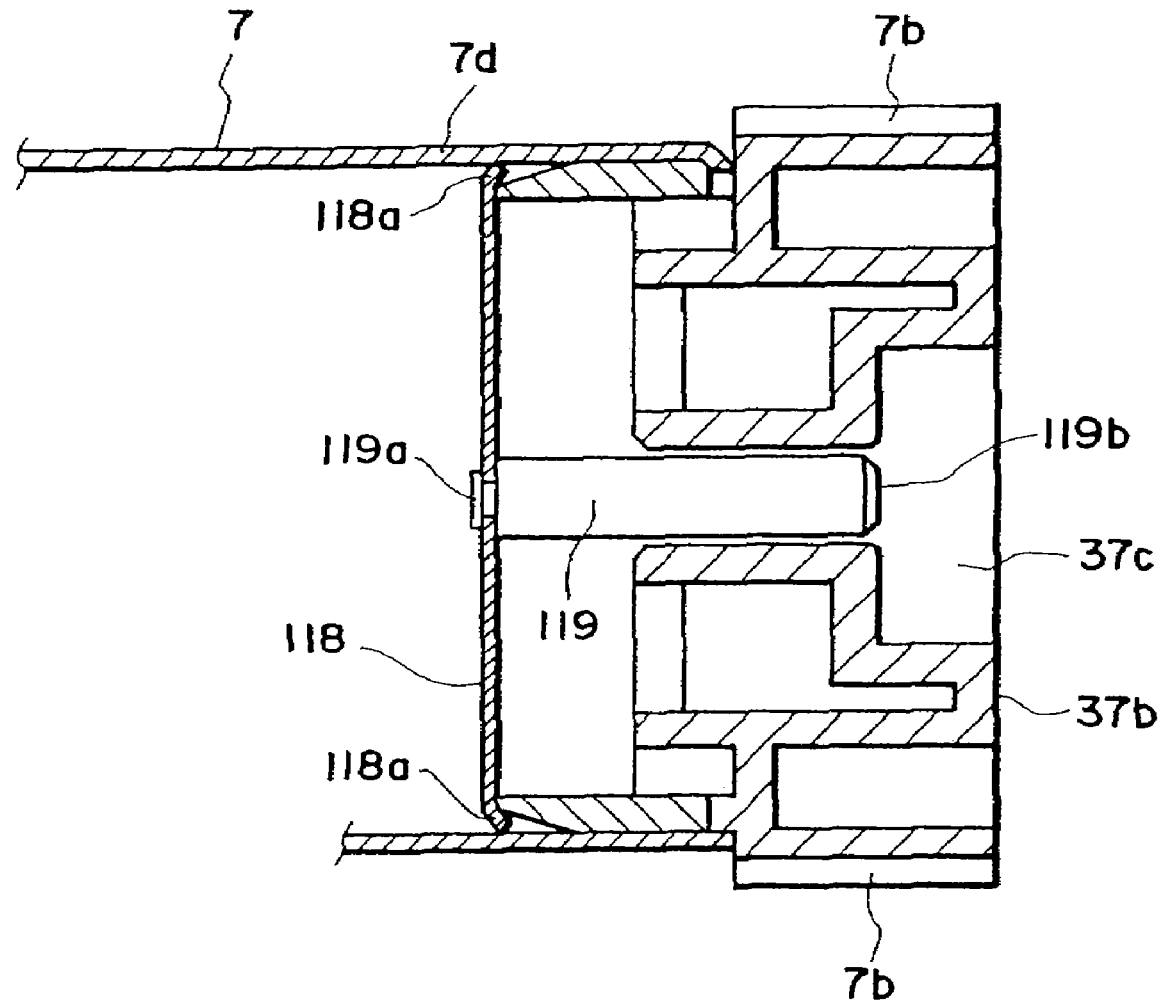
FIG. 46 is a lengthwise section of the ground contact on the photosensitive drum side.

In the above described embodiment, the process cartridge B is provided with the male type coupler shaft portion 37 with the coupling projection 37a, and the apparatus main assembly 14 is provided with the female type coupler shaft 39b with the coupling recess 39a engageable with the coupling projection 37a. On the contrary, in an embodiment which will be described next, the process cartridge B is provided with a female type coupler portion 37 with a coupling recess 37c having a brim 37b, and the apparatus main assembly 14 is provided with a male type coupler shaft 39b with a coupling projection 39c (because a male type coupler shaft does not have a recess, there is no portion correspondent to the coupling recess 39a), as illustrated in FIGS. 44, 45, and 46.

The coupling recess 37c is in the form of a twisted trigonal prism, and the coupling projection 39c is in the form of a twisted polygonal prism, more specifically, in the form of a twisted trigonal prism with a substantially equilateral triangular cross section. As for the sizes of the coupling recess 37c and the coupling projection 39c, the coupling recess 37c is larger than the coupling projection 39c, by such an amount that when the coupling projection 39c is placed in the coupling recess 37c, the edges of the coupling projection 39c can come in contact with the corresponding internal surfaces of the coupling recess 37c.

At the center of the end surface 39c1 of the coupling projection 39c, the ground contact 123b on the apparatus main assembly 14 side is exposed, and at the bottom surface 37c1 of the coupling recess 37c, the ground contact 119b on the process cartridge B side is exposed. Referring to FIG. 44, the ground contacts 19b and 123b are located at the ends of the electrically conductive member 1-19 and the ground contact member 123, respectively. As for their description, referring to the description of FIGS. 40-43 will suffice.

(Relationship Between Coupling Means and Grounding of Photosensitive Drum)

The above described coupling means comprises a female type coupler shaft portion with a coupling recess in the form of a twisted prism, and a male type coupler shaft with a coupling projection in the form of a twisted prism having the same shape as the female coupling portion, wherein driving force is transmitted by coupling the female and male coupling portions. Therefore, the driving side pulls the process cartridge 7 in the axial. direction, effectively stabilizing the position of the photosensitive drum 7, or the process cartridge B, in the lengthwise direction.

On the other hand, as for means for applying pressure to keep the ground contacts 119b and 123b in contact with each other, a coupling means which does not generate thrust may be employed because a compression type coil spring 68 which presses the male type coupler shaft 39b (coupler shaft on the apparatus main assembly side) in the axial direction is used.

Such a coupling means may comprise a coupling projection 37a in the form of a polygonal prism (for example, a substantially trigonal prism), not twisted, and a coupling recess 39a in the form of a polygonal prism (for example, a substantially trigonal prism), not twisted, wherein the coupling projection 37a is engaged in the coupling recess 39a. With this arrangement, aligning effect is generated, but thrust is not generated, and yet, the ground contacts 119b and 123b can be kept in contact with each other by the pressure from the compression type coil spring. This relationship between the apparatus main assembly side and the process cartridge side in terms of coupler configuration may be reversed as illustrated in FIG. 45, in which the apparatus main assembly side has a coupling projection 39c in the form of a polygonal prism (for example, a substantially trigonal prism), and the process cartridge side has a coupling recess 37c (straight hole) in the form of a polygonal prism (for example, a substantially trigonal prism). Also in this case, aligning effect is generated, but no thrust is generated, and yet, the ground contacts 119b and 123b can be kept in contact with each other by the pressure from the compression type coil spring.

In the above description of the coupling means, the coupling means member on the driving side, and the coupling means member on the driven side, are either both in the twisted form, relative to the axial direction, or both in the form which is not twisted. Such configuration of the coupling means may be optionally employed depending on apparatus design regarding the way the process cartridge B is installed in the apparatus main assembly 14 and/or the way the photosensitive drum 7 is attached to the process cartridge B.

For example, given that the apparatus main assembly 14 is provided with a female type coupler shaft 39a with a coupling recess in the form of a twisted polygonal prism, in order to fix the position of the process cartridge B relative to the apparatus main assembly 14 in the axial direction (for example, in the case of an arrangement in which a compressed compression spring is placed at one end of a process cartridge space in the apparatus main assembly 14, in alignment with the axial line of the photosensitive drum 7, and the photosensitive drum 7 is attached to the cartridge frame so that it does not move in the axial direction relative to the cleaning means frame 13), the coupling projection 37a of the male type coupler shaft portion 37 may be in the form of a normal polygonal prism which couples with the coupling recess 39a.

Also, it is possible to provide the apparatus main assembly 14 with a male type coupler shaft having a coupling projection in the form of a polygonal prism, and provide the process cartridge B with a female type coupler shaft portion having a coupling recess in the form of a normal polygonal prism which accommodates such a coupling projection on the apparatus main assembly 14 side.

Figure 47:
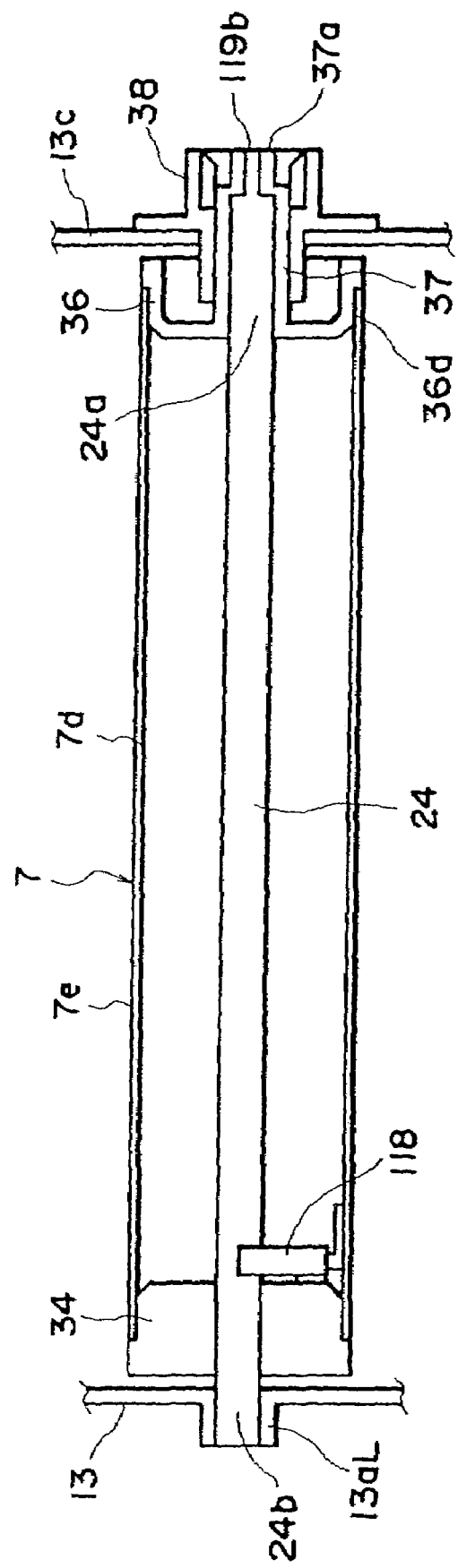
FIG. 47 is a lengthwise section of a photosensitive drum and the adjacencies thereof, depicting the ground contact of a photosensitive drum supported by a photosensitive drum shaft which penetrates through the entire length of the photosensitive drum.

Next, a grounding method, which is usable when the photosensitive drum 7 is supported by the cleaning means frame 13 differently from the way it was supported in the preceding embodiments, will be described. Referring to FIG. 47, one end of the photosensitive drum 7 is, fitted with a drum flange 34, and the other end is fitted with a drum flange 36. Both drum flanges 34 and 36 are solidly fixed to the photosensitive drum 7. The drum flange 36 comprises a hollow coupler shaft portion 37 with a coupling projection 37a. Though the internal space of this hollow coupler shaft portion 37 with the projection, a steel through shaft 24 of the photosensitive drum 7 is rotatively put by press fitting, with the end portion 24a of the steel through shaft 24 extending into the shaft 37 far enough to overlap with a bearing 38. The through shaft 24 is also rotatively fitted in the drum flange 34 on the other side of the photosensitive drum 7. Further, a grounding plate 118 which electrically connects the drum cylinder 7d and the through shaft 24 is fixed to the drum flange 34. The bearing 38 is fixedly supported by the cleaning means frame 13, and rotatively supports the coupler shaft portion 37 with the coupling projection 37a. The lengthwise end portion 24b, that is, the end opposite to the coupling means, of the through shaft 24 is fixedly supported by being pressed into the cylindrical guide portion 13aL of the cleaning means frame 13. Thus, the photosensitive drum 7 is supported by the cleaning means frame 13. The endmost portion of the end portion 24a of the through shaft 24 is reduced in diameter, being put through the core portion of the coupling projection 37a, and exposed at the outward surface of the coupling projection 37a. This exposed portion of the through shaft 24 constitutes the ground contact 119b, which is kept in contact with the ground contact 123b on the apparatus main assembly 14 side by the pressure from a spring.

As a motor 61 rotates, with the coupling projection 37a and the coupling recess 39a being in engagement, the male type coupler shaft portion 37 with the coupling projection 37a rotates, along with the drum flange 36 integral with the coupler shaft portion 37, on the stationary through shaft 24. As a result, the drum cylinder 7d and the drum flange 34, which are integrally joined with the drum flange 36, also rotate. The drum flange 34 rotates on the through shaft 24, and the ground contacts 119b and 123b slide upon each other.

One end of the grounding plate 118 is attached to the internal surface of the drum cylinder 7d by pressure welding, and the other end is elastically in contact with the peripheral surface of the through shaft 24, and therefore, as the photosensitive drum 7 rotates, the grounding plate 118 slides on the peripheral surface of the through shaft 24.

Figure 48:
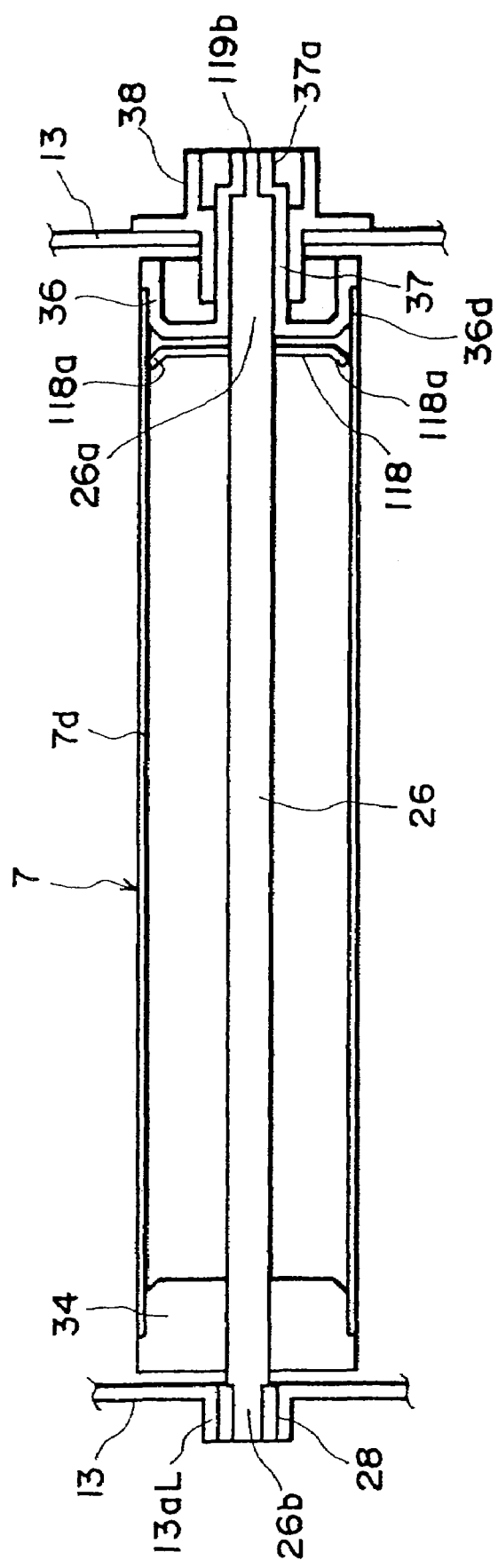
FIG. 48 is a lengthwise section of a photosensitive drum and the adjacencies thereof, depicting the ground contact of a photosensitive drum supported by a photosensitive drum shaft which penetrates through the entire length of the photosensitive drum.

Next, referring to FIG. 48, the grounding method in another embodiment of the photosensitive drum supporting structure in accordance with the present invention will be described. Also in this embodiment, one end of the photosensitive drum 7 is fitted with a drum flange 36, and the other end is fitted with a drum flange 34. The drum flanges 36 and 34 are firmly attached to the photosensitive drum 7. The drum flange 36 integrally comprises a hollow male type coupler shaft portion 37 with a coupling projection 37a. Through the internal space of this coupler shaft portion 37 with the coupling projection 37a, a steel through shaft 24 of the photosensitive drum 7 is rotatively put by press fitting, with the end Portion 24a of the steel through shaft 24 extending into the shaft 37 far enough to overlap with a bearing 38. The through shaft 24 is also rotatively fitted in the drum flange 34 on the other side of the photosensitive drum 7. The bearing 38 is fixedly supported by the cleaning means frame 13, and rotatively supports the coupler shaft portion 37 with the coupling projection 37a. The lengthwise end portion 24b, that is, the end opposite to the coupling means, of the through shaft 24 is rotatively supported by a bearing 28 which is supported by being fitted into the cylindrical guide portion 13aL of the cleaning means frame 13. Thus, the photosensitive drum 7 is supported by the cleaning means frame 13.

The grounding plate 118 is fixed to a through shaft 26 of the photosensitive drum 7, and also to the drum cylinder 7d, with the projections of the grounding plate 118 biting into their surfaces (FIGS. 41 and 42 illustrate the projection which bites into the drum cylinder 7d, and projection which bites into the through shaft 26 is similar in shape to the projection for the drum cylinder 7d).

Figure 49:
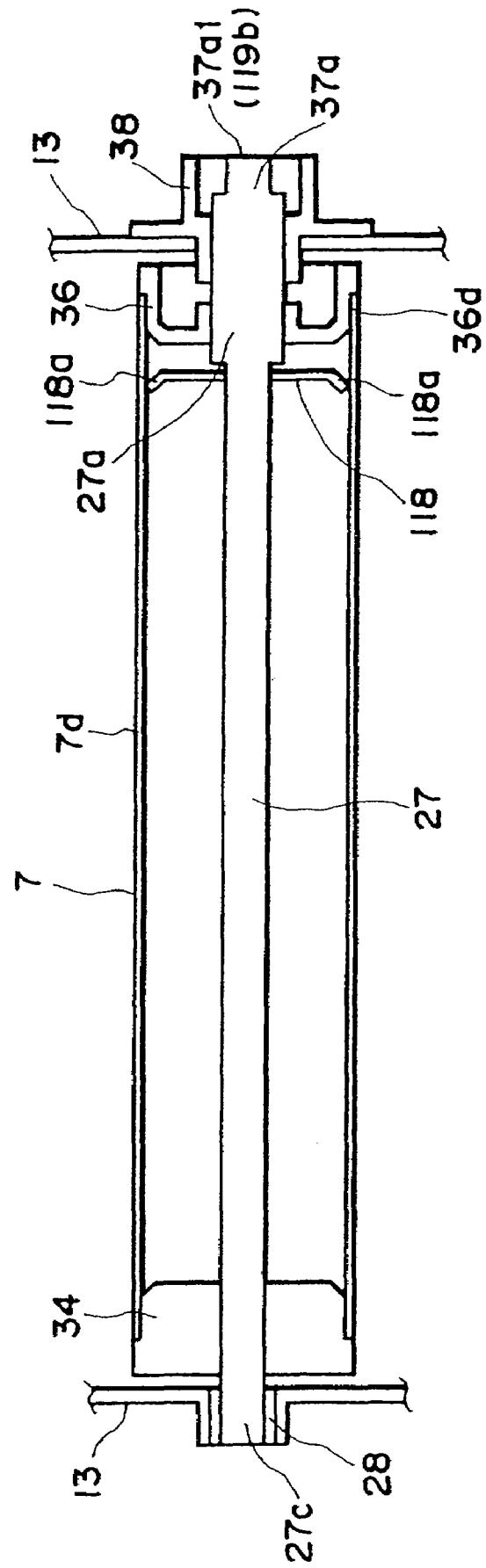
FIG. 49 is a lengthwise section of a photosensitive drum and the adjacencies thereof, depicting the ground contact of a photosensitive drum supported by a photosensitive drum shaft which penetrates through the entire length of the photosensitive drum.

Next, referring to FIG. 49, the grounding method in another embodiment of the photosensitive drum supporting structure in accordance with the present invention will be described. Each lengthwise end of the photosensitive drum 7 is fitted with drum flanges 34 and 36, respectively. In this embodiment, one end of a through shaft 27 of the photosensitive drum 7 integrally comprises a male type coupler portion 37a, and this through shaft 27 is put through the drum flanges 36 and 34 by press fitting or the like method, being thereby fixed thereto. The coupling means side end of the through shaft 27 is increased in diameter, forming an enlarged diameter portion 27a, and is rotatively fitted in a bearing 38 which is supported by the cleaning means frame 13. The other end 27c of the through shaft 27 is rotatively fitted in a bearing 28 which is fixedly supported by the cleaning means frame 13. Thus, the photosensitive drum 7 is supported by the cleaning means frame 13.

As for the electrical connection between the through shaft 27 and the drum cylinder 7d, a grounding plate 118 is provided, which is formed of spring steel, and has the same type of projections as those illustrated in FIGS. 41 and 42, which bite into the through shaft 27 and the drum cylinder 7d in order to electrically connect the through shaft 27 and the drum cylinder 7d. The through shaft 27 is formed of steel or electrically conductive resin.

As the coupling projection 37a fits into the coupling recess 39a on the apparatus main assembly 14 side, the end surface 37a1 (ground contact 119b) of the coupling Projection 37a comes in contact with the ground contact member 123 on the apparatus main assembly 14 side.

As for the direction in which the coupling recess 39a, and the coupling projection 37a, are twisted, it is opposite to the direction in which the drum gear is rotated, as seen from the entrance side of the recess looking toward the bottom side thereof.

The amount of the twist of the recess and the projection is at a rate of 1° to 15° per 1 mm of axial length.

The depth of the recess in this embodiment is approximately 4 mm, and is twisted approximately 30° overall.

Although the coupling means in the preceding embodiment comprised a twisted recess and a twisted polygonal prism, the coupling means may comprise a twisted hole and a normal polygonal prism. In the case of the latter, a normal trigonal prism, for example, fits into a twisted recess, and as the recess rotates, the trigonal prism makes contact with the internal surface of the recess by the base portion, whereby the position of the trigonal prism is fixed relative to the recess. This base portion of the trigonal prism is rendered relatively strong compared to the other portions, and therefore, the trigonal prism as the coupling projection does not deform in terms of overall shape. However, the edges of the trigonal prism, the adjacencies thereof, and/or the internal surface of the recess correspondent thereto, slightly deform as the edges and the adjacencies thereof bite into the internal wall of the hole, better stabilizing the state of the coupling between the projection and the recess. The normal prism is easier to form than the twisted one.

Since the coupling means in accordance with the present invention generates self aligning effect, the location of the rotational center of the ground contact on the process cartridge B side coincides with the location of the ground contact on the apparatus main assembly side which is at the center of the coupling means member on the apparatus main assembly side. Therefore, the sweeping area of the mutually rubbing ground contacts becomes smallest possible, and also the speed at which the ground contacts rub each other becomes slowest possible. As a result, the lives of the ground contacts become longer, and also, the state of the contact between the ground contacts become more stable. Further, because the contact surface on the process cartridge side is not outwardly exposed, it is possible to prevent such contact failure that is caused as a hand or the like comes in contact with the contact surface.

Figure 50:
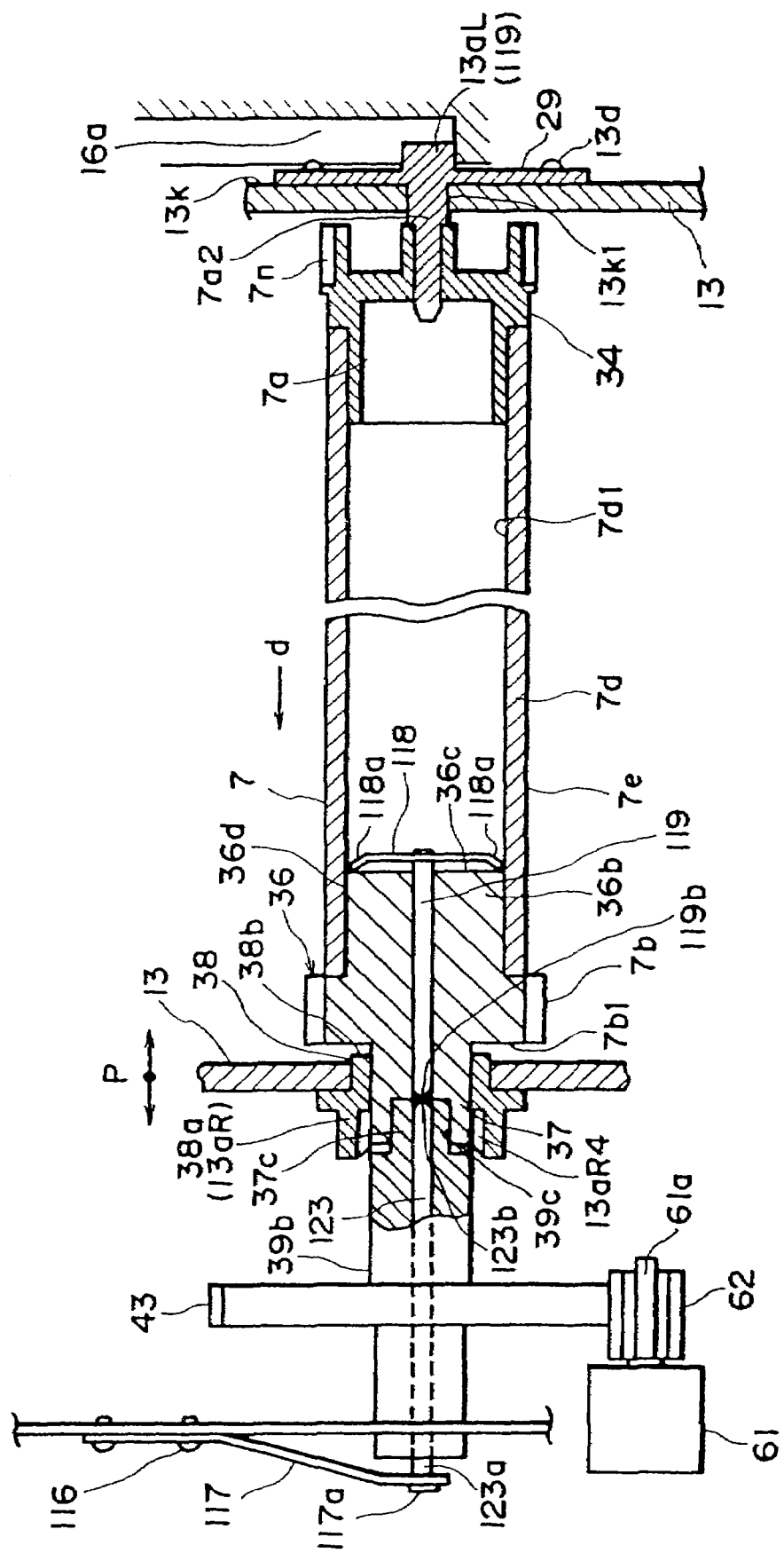
FIG. 50 is a lengthwise section of a photosensitive drum and the adjacencies thereof, depicting the structure which is capable of grounding a photosensitive drum, as well as supporting it.

FIG. 50 illustrates another embodiment of the photosensitive drum grounding method in accordance with the present invention.

A ground contact member 123 on the apparatus main assembly 14 side is loosely put through the core portion of the male type coupler shaft 39b with a coupling projection 39c, and is nonrotative. The outward end of the ground contact member 123 is fixed to a plate spring 117 by crimping. The other features of this embodiment are the same as those in the embodiment illustrated in FIG. 44.

Figure 51:
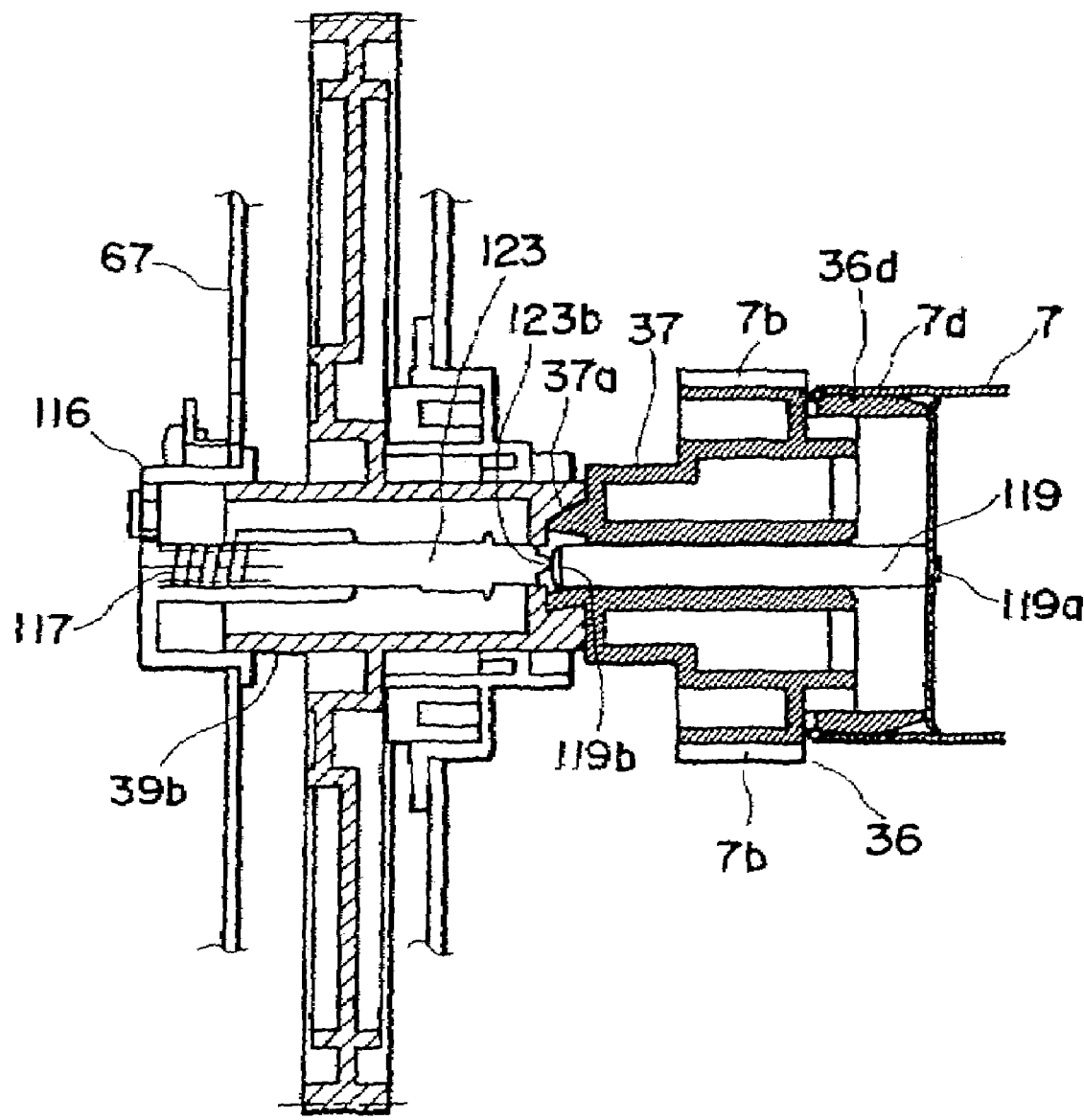
FIG. 51 is a lengthwise section of the coupling means, depicting the grounding path for a photosensitive drum.

FIG. 51 illustrates another embodiment of the photosensitive drum grounding method in accordance with the present invention.

A ground contact member 123 on the apparatus main assembly 14 side is fixed to a female type coupler shaft 39b, which is supported by a bearing 116 fixed to the side plate of the apparatus main assembly 14. Between the outward end of the ground contact member 123 and the bearing 116, a compression type coil spring 117 is nonrotatively attached, and therefore, the compression type coil spring 117 and the ground contact member 123 rub against each other. Also in this embodiment, the photosensitive drum 7 is grounded as the ground contacts 119b and 123b come in contact with each other.

In the preceding embodiments, the ground contact 119b was disposed at the center of the drum flange 36. In other words, the ground contact 119b is placed on the axial line of the drum flange 36. However, this electrically conductive member 119 can be eliminated. More specifically, the drum flange 36 is rendered solid, and electrically conductive on its own, and is placed in contact with the ground contact member 123. As for the material usable for such a drum flange 36, polyacetal which contains electrically conductive filler, polyphenylene sulfone which contains electrically conductive filler, polyamide which contains electrically conductive filler, and the like material, are proper. With the elimination of the electrically conductive member 119, the structure of the core portion of the coupler shaft can be simplified, and therefore, the number of assembly steps can be reduced. As for the electrically conductive filler, carbon powder, metal powder, metal coated glass fiber, and the like are usable.

Figure 52:
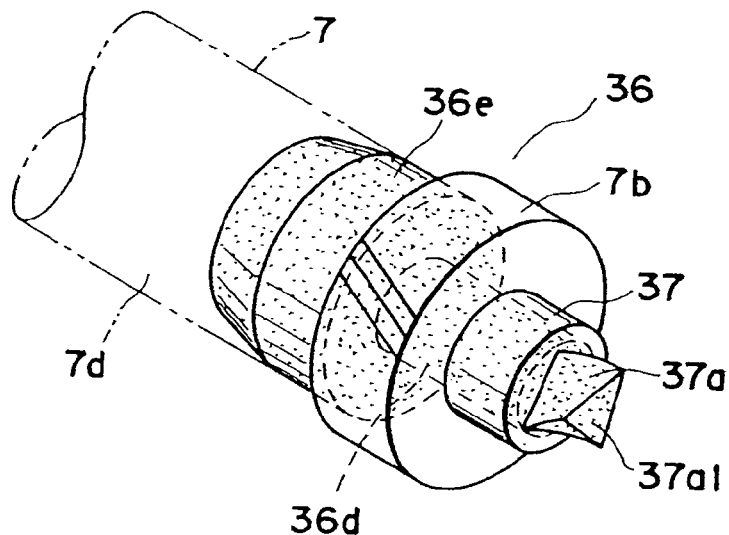
FIG. 52 is a perspective view of the drum side of the coupling means, that is, the male side.

FIG. 52 shows another embodiment of the photosensitive drum grounding structure in accordance with the present invention.

The coupling means member (drum flange 36) in this embodiment is formed by two color injection molding. In other words, a coupling projection 37a, and a narrow diameter portion 36d (dotted portion) integral with the projection 37a, are formed of the aforementioned electrically conductive material, whereas a gear 7b (helical gear) portion is formed of highly wear resistant material (for example, polyacetal or polycarbonate). The portion designated with a referential FIG. 36e is where the drum flange 36 is fitted in the drum cylinder 7d. According to this embodiment, the charge in the photosensitive drum 7 is discharged to the apparatus main assembly 14 through the narrow diameter portion 36d and the coupling projection 37a.

Figure 53:
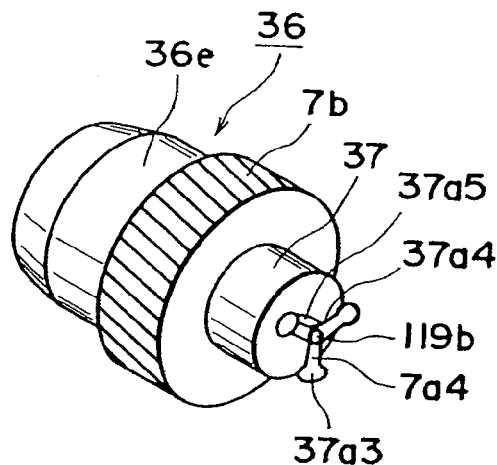
FIG. 53 is a perspective view of the projection in another embodiment of the present invention.

FIG. 53 is another embodiment of the coupling projection in accordance with the present invention. In this embodiment, a make type coupler shaft portion 37 comprises a support shaft 37a5 and a plurality of spherical contacts 37a3. The support shaft 37a5 is disposed on the end surface of the coupler shaft 37, and the plurality of spherical contacts 37a3 are attached, one for one, to the end of a plurality of radial arms extending from the support shaft 37a5. The driving force is transmitted as the plurality of spherical c-contacts 37a3 make contact with the internal surface of the coupling recess 39a. A ground contact 119b is exposed at the inward end of the support shaft 37a5.

Figure 54:
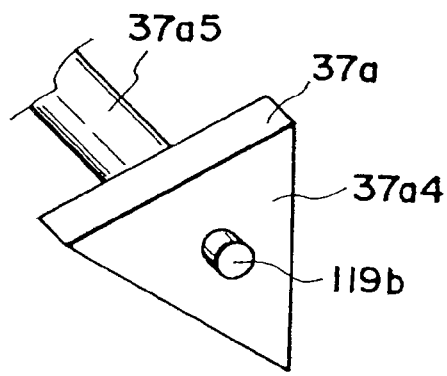
FIG. 54 is a perspective view of the projection in another embodiment of the present invention.

FIG. 54 depicts another embodiment of the coupling projection in accordance with the present invention. It is a modification of the coupling projection illustrated in FIG. 53. In this modification, the combination of the plurality of radial arms 37a4 and spherical contacts 37a3 in FIG. 53 are replaced with a single triangular plate 37a4. Also in this embodiment, a ground contact 119b is disposed on the axial line of the coupler shaft 37.

Another Embodiment of Grounding Method for Process Cartridge

In this embodiment, an electrically conductive member 119 is fixed to a coupling means member 36 (drum flange), which will be described below in detail.

Figure 55:
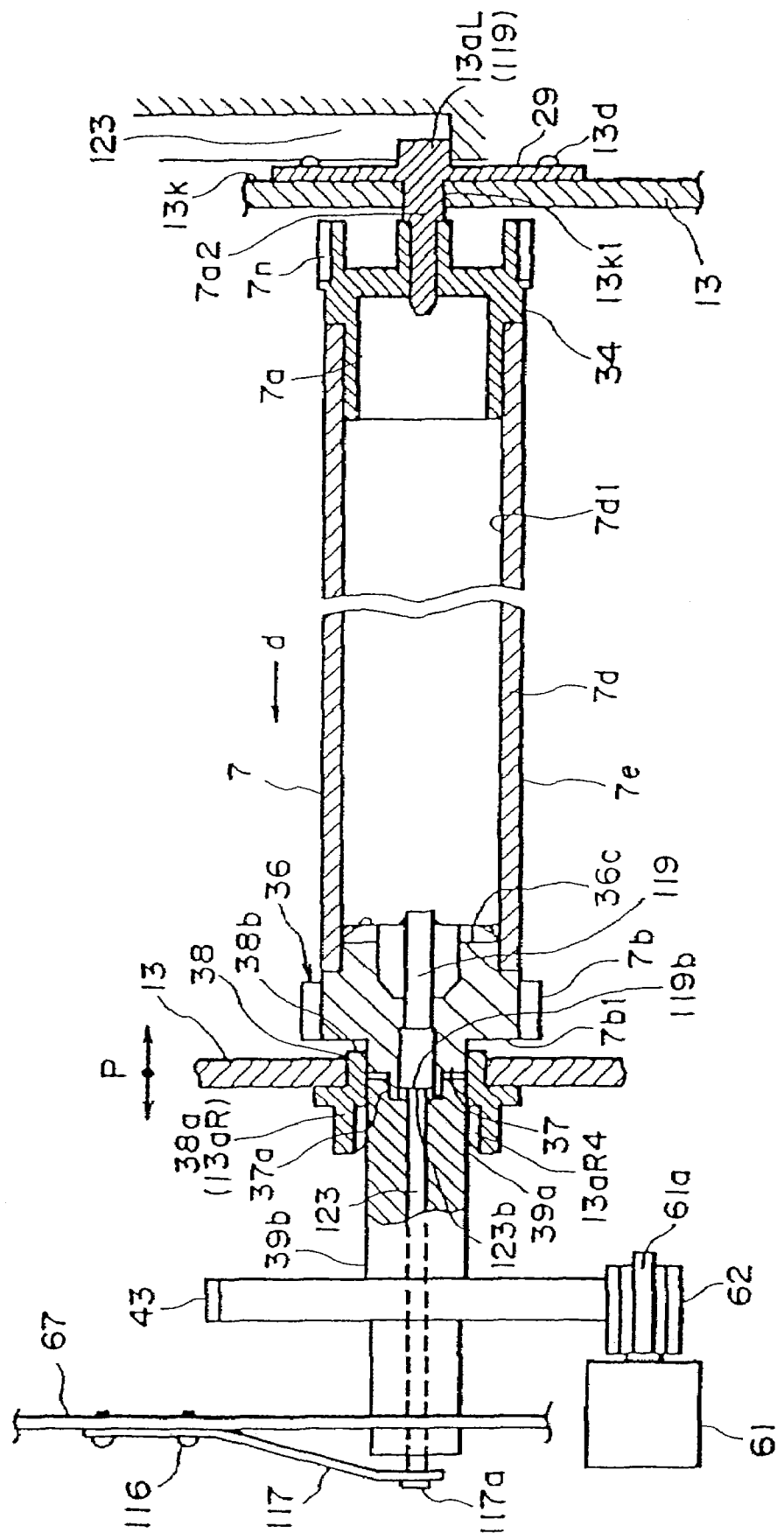
FIG. 55 is a lengthwise section of a photosensitive drum and the adjacencies thereof, depicting the grounding path for the photosensitive drum.

First, the coupling means member on the apparatus main assembly 14 side will be described. Referring to FIG. 55, a ground contact member 123 on the apparatus main assembly 14 is loosely put through the core portion of the female type coupler shaft 39b with a coupling recess 39a, and is nonrotative, as is the ground contact member 39b illustrated in FIG. 50. The outward end of the ground contact member 123 is fixed to the free end portion 117a of a plate spring 117 by crimping. The other features of the coupling means structure on the apparatus main assembly 14 side are the same as those of the structure illustrated in FIG. 44.

The ground contact 123b on the apparatus main assembly 14 side projects above the bottom surface 39a1 of the coupling recess 39a, simplifying the maintenance checkup. The plate spring 117 is formed of electrically conductive material, for example, spring steel plate, stainless steel plate, phosphor bronze plate, beryllium bronze plate, or the like plate.

As for the material for the electrically conductive member 119, phosphor bronze, stainless steel, plate steel, or the like are usable. As for the material for the ground contact member 123, the same material as those for the electrically conductive member 119 are also usable, but it is desirable that the ground contact member 123 and the electrically conductive member 119 are different in material.

Referring to FIG. 55, a photosensitive drum 7 is fitted with a drum flange 34, which is fixedly fitted in the drum cylinder 7d, on the side opposite to the driven side. This drum flange 34 is rotatively supported on a drum shaft 7a fixed to the cleaning means frame 13. Since the drum shaft 7a in this embodiment is not used for grounding the photosensitive drum 7, the material therefor does not need to be limited to metallic materials; it may be insulative synthetic resin.

Figure 56A:
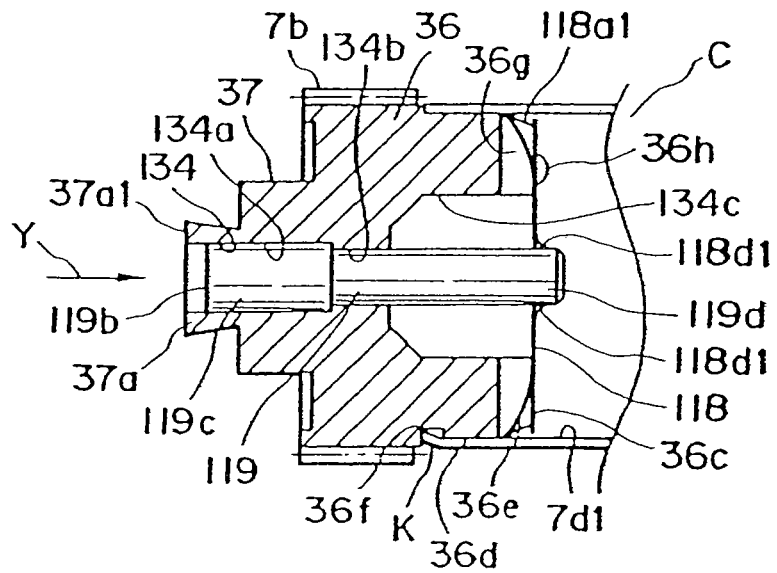
FIG. 56A is a lengthwise section of the driven end of a photosensitive drum.

On the driven side of the photosensitive drum 7, the fitting portion 36d of a drum flange 36 is fitted in the drum cylinder 7d, and a portion of the edge of the drum cylinder 7d is crimped into the recess 36f located at the peripheral surface of the fitting portion 36d, as indicated by a referential figure K in FIG. 56A, to fix the drum cylinder 7d and the drum flange 36 to each other. The drum flange 36 has a tiered cylindrical hole 134 which comprises a portion 134a, a portion 134b, and a portion 134c, which are located in this order from the coupling projection 37a side. The cylindrical hole portion 134b is slightly smaller in diameter than the cylindrical hole portion 134a, and the cylindrical hole portion 134c is greatly larger in diameter than the cylindrical hole portion 134b.

The electrically conductive member 119 is press fitted through the central hole 134 of the drum flange 36 fixed to the driven side or the photosensitive drum 7, being prevented from moving in the axial direction. This electrically conductive member 119 is a tiered rod, comprising a small diameter portion 119d and a large diameter portion 119c. The small diameter portion 119d is press fitted in the cylindrical hole portion 134b, and the large diameter portion 119c is loosely fitted in the cylindrical hole portion 134a, with some gap between itself and the internal surface of the cylindrical hole portion 134a. Further, the inward end portion of the small diameter portion 119d is fitted in the central hole of a grounding plate 118, being fixed thereto. The grounding plate 118 is placed in contact with the inward surface of the drum flange 36. Further, the curved edges of the grounding plate 118 are provided with a projection 118a, the tip of which slightly bends toward the driven side, and bites into the inward surface 7d1 of the drum cylinder 7d due to its own elasticity.

Figure 57:
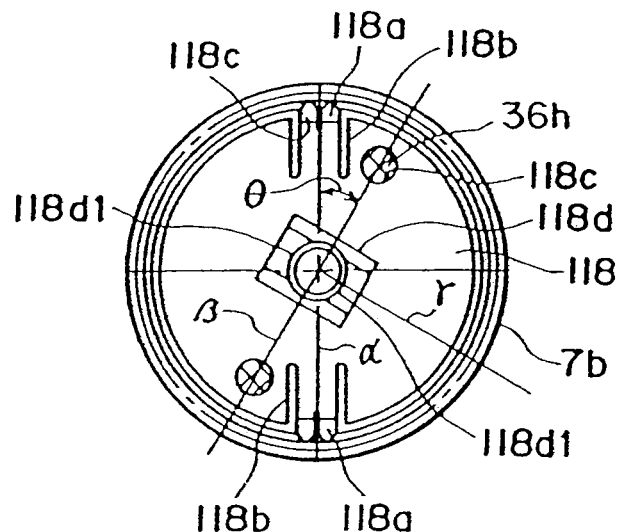
FIG. 57 is an elevation of a grounding plate and the adjacencies thereof depicted in FIG. 55, as seen from the right-hand side of FIG. 55, that is, the direction parallel to the photosensitive drum shaft.

FIG. 56A is an enlarged vertical section of the ground contact and the adjacencies thereof illustrated in FIG. 55, at a plane passed through the lengthwise axis of the photosensitive drum 7, and depicts the details thereof. FIG. 57 is a frontal elevation of the grounding plate 118. Referring to FIG. 57, the grounding plate 118 is in the form of a disc. It has two opposing pairs of parallel slits with a predetermined length, which are cut from the periphery of the grounding plate 118 in parallel to any given diameter thereof, one on each side of the diameter. The portions between these parallel slits 118b constitute projections 118a having an end portion 118a1 which is slightly bent toward the driven side. This end portion 118a1 has two pointed tips which bite into the inward surface 7d1 of the drum cylinder 7d. A referential FIG. 36h designates a dowel which projects from the inward surface 36c of the drum flange 36, and is fitted in the hole of the grounding plate 118 to prevent the grounding plate 118 from rotating relative to the drum flange 36. In order to fix the grounding plate 118 to the drum flange 36, after the dowel 36h is inserted in the hole of the grounding plate 118, the diameter of the end portion of the dowel 36h is increased by softening it with heat. The increased diameter portion of the dowel 36h prevents the grounding plate 118 from being separated from the drum flange 36 while mounting the ground contact member 119.

A ground contact 119b constituted of the other end of the ground contact member 119 is located slightly inward of the brim portion 37a1 of the hollow coupling projection 37a of the male type coupler shaft portion 37. Therefore, when the process cartridge B is inserted into, or removed from, the apparatus main assembly 14, and when the process cartridge B having been removed from the apparatus main assembly 14 is handled, the ground contact 119b is protected.

The ground contact 119b is exposed from the bottom surface of the hollow portion of the coupling projection 37a, below the brim portion 37a1, on the axial line of the coupling projection 37a, as illustrated in FIG. 41.

Figure 58:
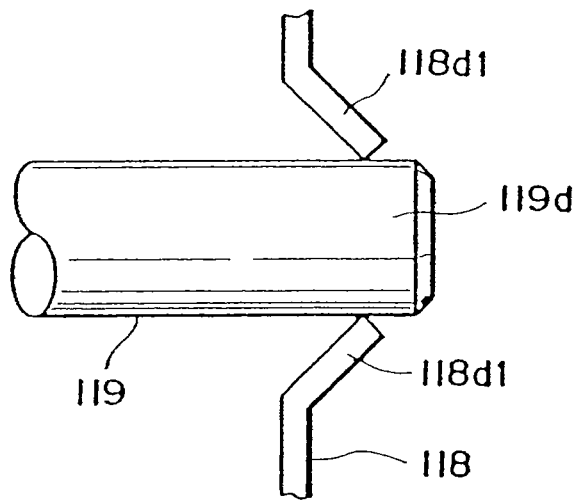
FIG. 58 is an enlarged schematic view of a portion of FIG. 56A.
Figure 59:
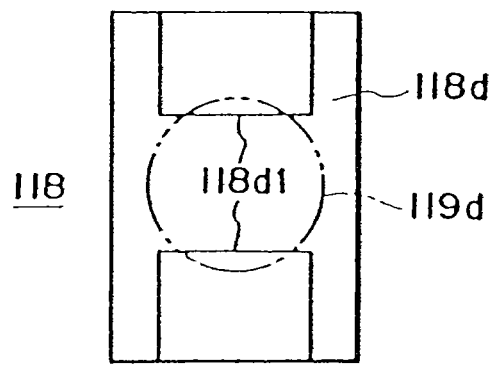
FIG. 59 is a schematic view of the portion illustrated in FIG. 58, as seen from the direction parallel to the photosensitive drum shaft.

Next, the relationship between the grounding plate 118 and the configuration of the inward end 36c of the drum flange 36 will be described. Referring to FIG. 56A, the inward end 36c of the drum flange 36 is provided with a groove 36a which extends in the diameter direction of the drum flange 36, and is aligned with the projection 118a of the grounding plate 118 so that the bent tip portion 118a1 of the projection 118a is not prevented from biting into the inward surface of 7d1 of the drum cylinder 7d. The grounding plate 118 is in the form of a disc, except for the projection 118a The diameter of the grounding plate 118 is slightly smaller than the internal diameter of the drum cylinder 7d, and the projection 118a slightly extends beyond the periphery of the disk. Referring to FIG. 59, the center hole of the grounding plate 118, in which the electrically conductive member 119 is fitted, is in the form of a letter "H," wherein the opposing edges 118d1 of the horizontal stroke portion which connects the left and right vertical strokes are bent toward the nondriver side as shown in FIG. 58. The distance between these opposing edges 118d1 is less than the diameter of the small diameter portion 119d of the electrically conductive member 119.

Next, regarding the grounding plate 118, the positional relationship among the projection 118a, the hole 118c in which the dowel 36h is fitted, and the hole 118d in which the electrically conductive member 119 is fixedly fitted, will be described. The pair of opposing projections 118a, and the pair of opposing holes 118c for the dowel, are located on lines (∝) and (β), respectively, which include the center of the grounding plate 118, and each of them is located the same distance from the center of the grounding plate 118 as is its counterpart.

The lines (∝) and (β) intersect each other, and the angle θ between the two lines in this embodiment is approximately 30°. Regarding the hole 118d in which the electrically conductive member 119 is fixedly fitted, the opposing edges 118d1 are parallel to the line (βv), and the center of the hole 118d is on a line γwhich is passed through the center of the grounding plate 118, perpendicularly to the line (βv). The distances from the center of the grounding plate 118 to the opposing edges 118d1 are equal.

The grounding plate 118 is placed in contact with the surface of the inward end 36c of the drum flange 36, with the dowel 36h of the drum flange 36 fitted in the hole 118c of the grounding plate 118. Then, the head portion of the dowel 36h is softened with heat, and is increased in diameter as it is rendered semispheric as shown in FIG. 56A. Then, as the semispheric portion end portion of the dowel 36h cools down, the drum flange 36 and the grounding plate 118 are fixed to each other. Next, the electrically conductive member 119 is inserted in the center hole 134 of the drum flange 36 in the direction of an arrow mark Y as shown in FIG. 56A. More specifically, first, the small diameter portion 119d of the electrically conductive member 119 is press fitted into the small diameter portion 134b the center hole 134 of the drum flange 36. Next, the small diameter portion 119d of the electrically conductive member 119 is forced into the electrically conductive member anchoring hole 118d located at the center of the grounding plate 118, bending inward the opposing edges 118d1. Next, the large diameter portion 119c of the electrically conductive member 119 comes in contact with the stepped portion of the center hole 134 of the drum flange 36, fixing the position of the electrically conductive member 119 relative to the drum flange 36 in the axial direction. As a result, the ground contact 119b is located within a center hole 134, a predetermined distance inward of the brim portion 37a1 of the coupling projection 37a.

Figure 56B:
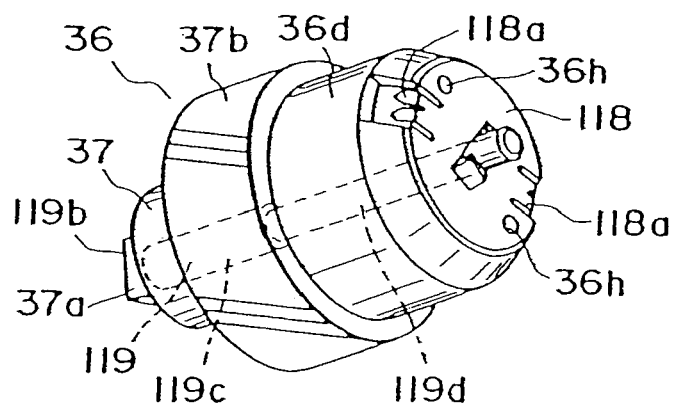
FIG. 56B, a perspective view of the inward side of the coupler portion of a drum flange.
Figure 56C:
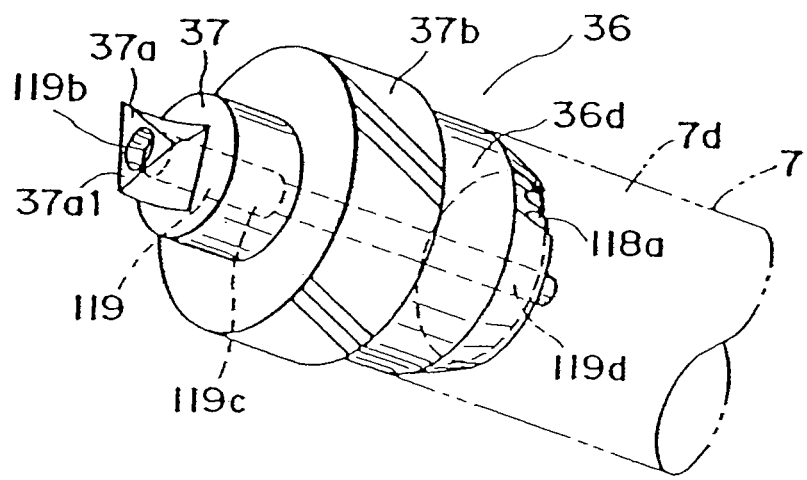
FIG. 56C, is a perspective view of the outward side of the coupler portion of the same drum flange.

As described above, the drum flange 36, the grounding plate 118, and the electrically conductive member 119 are unitized as a coupling means member. Then, the fitting portion 36d of the drum flange 36 is fitted in the drum cylinder 7d, and the drum flange 36 and the drum cylinder 7d are fixed to each other as a portion of the edge of the drum cylinder 7d is crimped into the recess 36f of the drum flange 36 as indicated by the referential figure K. FIGS. 56B and 56C are perspective views of the coupling means member C illustrated in FIG. 56A.

In this embodiment, the ground contact 119b on the cartridge side and the ground contact 123b on the apparatus main assembly side are placed in contact with, or separated from, each other in the following manner. As the gear 43 on the main assembly side is driven in the state depicted in FIG. 55, the photosensitive drum 7 is rotated, and the drum flange 36 with a drum gear 7b is rotated with the electrically conductive member 119 (ground contact 119b). Since the drum gear 7b is a helical gear, it is thrust in the direction of an arrow mark d in FIG. 55. Further, as was already described, the coupling projection 37a and the coupling recess 39a pull each other in the axial direction, and therefore, the bottom surface 39a1 of the coupling recess 39a and the brim 37a1 of the coupling projection 37a are placed in contact with each other. Also as described before, the coupling recess 39a is located at a predetermined position to which it is advanced as the lid 35 of the apparatus main assembly 14 is closed, and therefore, the position of the photosensitive drum 7 relative to the axial direction is fixed.

As described above, the elastic force of the plate spring 117 presses the ground contact member 123 into the electrically conductive member 119 of the process cartridge in the axial direction opposite to the direction of the arrow mark d, but this elastic force is set to be weaker than both the force which works in the direction to pull the coupling projection 37a into the coupling recess 39a, and the thrust generated by the drum gear 7b. Therefore, the elastic force of the plate spring 117 does not interfere with the positioning of the photosensitive drum 7 in the axial direction.

The ground contact member 123 is fixed to the plate spring 117, and is placed in contact with the electrically conductive member 119 by the elastic force of the plate spring 117. Therefore, the ground contact 119b of the electrically conductive member 119 and the ground contact 123b of the ground contact member 123 are kept in contact with each other, and their end surfaces slide against each other.

When the process cartridge B is removed from the apparatus main assembly 14, the female type coupler shaft 39b is retracted, together with the large gear 43, from the coupling projection 37a of the male type coupler shaft portion 37. At the beginning of the retraction of the female type coupler shaft 39b, the ground contact member 123 remains in contact with the ground contact 119b of the process cartridge B due to the elastic force of the plate spring 117. Then, after the outward end of the female type coupler shaft 39b comes in contact with the plate spring 117, the plate spring 117 is bent leftward in FIG. 55 against its elastic force by the further retraction of the female type coupler shaft 39b. Therefore, the ground contact member 123 is pulled away, the ground contact 123b on the apparatus main assembly 14 side is separated from the ground contact 119c on the process cartridge B side. Next, the coupling recess 39a of the female type coupler shaft 39b separates from the coupling projection 37a of the male type coupler shaft portion 37 in the axial direction, coming out of the cylindrical projection 38a of the bearing 38, which had surrounded the coupling projection 37a of the male type coupler shaft portion 37, and stops at a predetermined position. This movement of the female type coupler shaft 39b is caused by the linkage between the lid 35 and the female type coupler shaft 39b illustrated in FIGS. 27, 28 and 29.

With the female type coupler shaft 39b retracted as described above, the process cartridge B can be installed or removed. As the lid 35 is closed after the process cartridge B is inserted in the apparatus main assembly 14, the female type coupler shaft 39b advances, taking the ground contact member 123 along, and the coupling recess 39a of the female type coupler shaft 39b engages with the coupling projection 37a of the male type coupler shaft portion 37. Then, as the coupling recess 39a accepts the coupling projection 37 deeper, the ground contact 123b on the apparatus main assembly 14 side comes in contact with the ground contact 119b on the cartridge side. At this point, the advance of the ground contact member 123 under the pressure from the plate spring 117 is stopped by the electrically conductive member 119. Then, as the female type coupler shaft 39b further advances, the bottom surface 39a1 of the coupling recess 39a of the female type coupler shaft 39b comes in contact with the brim 37a1 of the coupling projection 37a of the male type coupler shaft portion 37.

Regarding the electrically conductive member 119 and the ground contact member 123 described in the foregoing paragraph, their materials may be the same as those listed before. However, in this embodiment, the opposing edges 118d1 of the electrically conductive member anchoring hole 118d located at the center of the grounding plate 118 must bite into the electrically conductive member 119, and therefore, spring steel, plated spring steel, or the like, which are greater in hardness than the electrically conductive member 119 is desirable as the material for the grounding plate 118.

According to this embodiment, the electrically conductive member 119 is fixed to the drum flange 36 simply by inserting it through the center hole of the drum flange 36, and then through the anchoring hole 118d of the grounding plate 118 to prevent it from slipping out. With this arrangement, even if the electrically conductive member 119 does not fit in the center hole 134 of the drum flange 36 as tightly as it should, the electrically conductive member 119 does not slip out of the drum flange 36. Further, the center hole 134 of the drum flange 36 has a stepped portion with which the stepped portion of the electrically conductive member 119 meets, and therefore, the electrically conductive member 119 is accurately positioned in the axial direction, relative to the drum flange 36.

The grounding plate 118 is fixed to the drum flange 36 by the dowel 36h, in contact with the surface of the inward end of the drum flange 36, and the projection 118a of the grounding plate 118, which is caused to lean toward the driven side, bites into the inward surface of the drum cylinder 7d. Therefore, the drum flange 36 is prevented from slipping out of the drum cylinder 7d, and also, the drum cylinder 7d is prevented from rotating relative to the drum flange 36. Further, since a part of the edge of the drum cylinder 7d is crimped into the recess 36f of the drum flange 36, the drum flange 36 is firmly fixed to the drum cylinder 7d.

Figure 60:
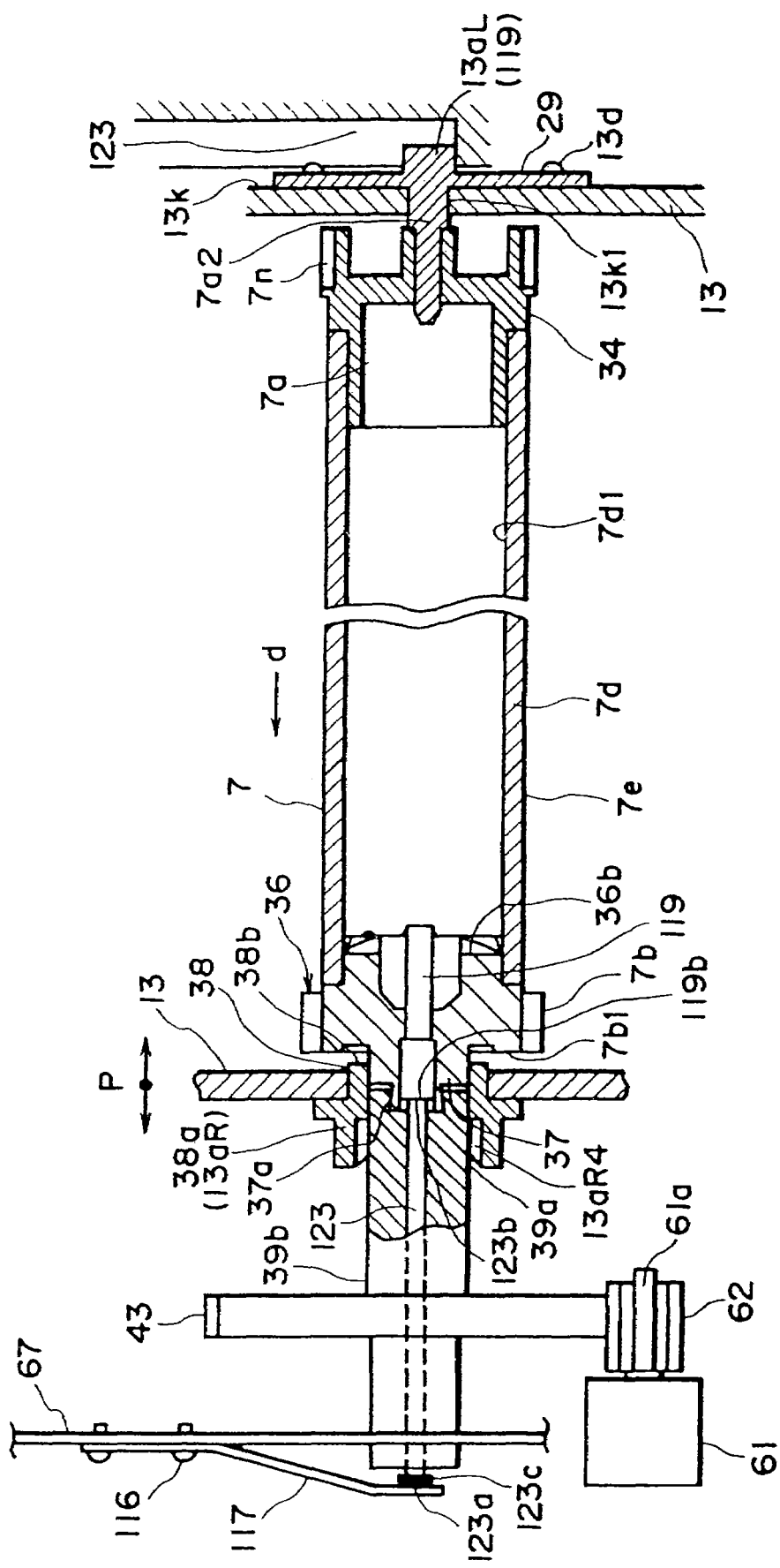
FIG. 60 is a lengthwise section of a photosensitive drum and the adjacencies thereof, depicting a modified version of the grounding path structure for the photosensitive member illustrated in FIG. 54.

Also, in the case of the embodiment in which the electrically conductive member 119 is fixed to the drum flange 36, the following arrangement is possible. That is, the center hole of the female type coupler shaft 39b is rendered square, for example, and the ground contact member 123 which is to be fitted in the center hole, is also rendered square, being perfectly fitted in the square central hole, and yet, being allowed to move freely in the axial direction. The outward end of the ground contact member 123 is made to be a contact 123a, which slides against the plate spring 117. In this case, in order to make the ground contact member 123 retract as the female type coupler shaft 39b is retracted, the ground contact member 123 is provided with a collar 123c, as illustrated in FIG. 60, which is located between the female type coupler shaft 39b and the plate spring 117, and comes in contact with the female type coupler shaft 39b as the female type coupler shaft 39b is retracted.

Figure 61:
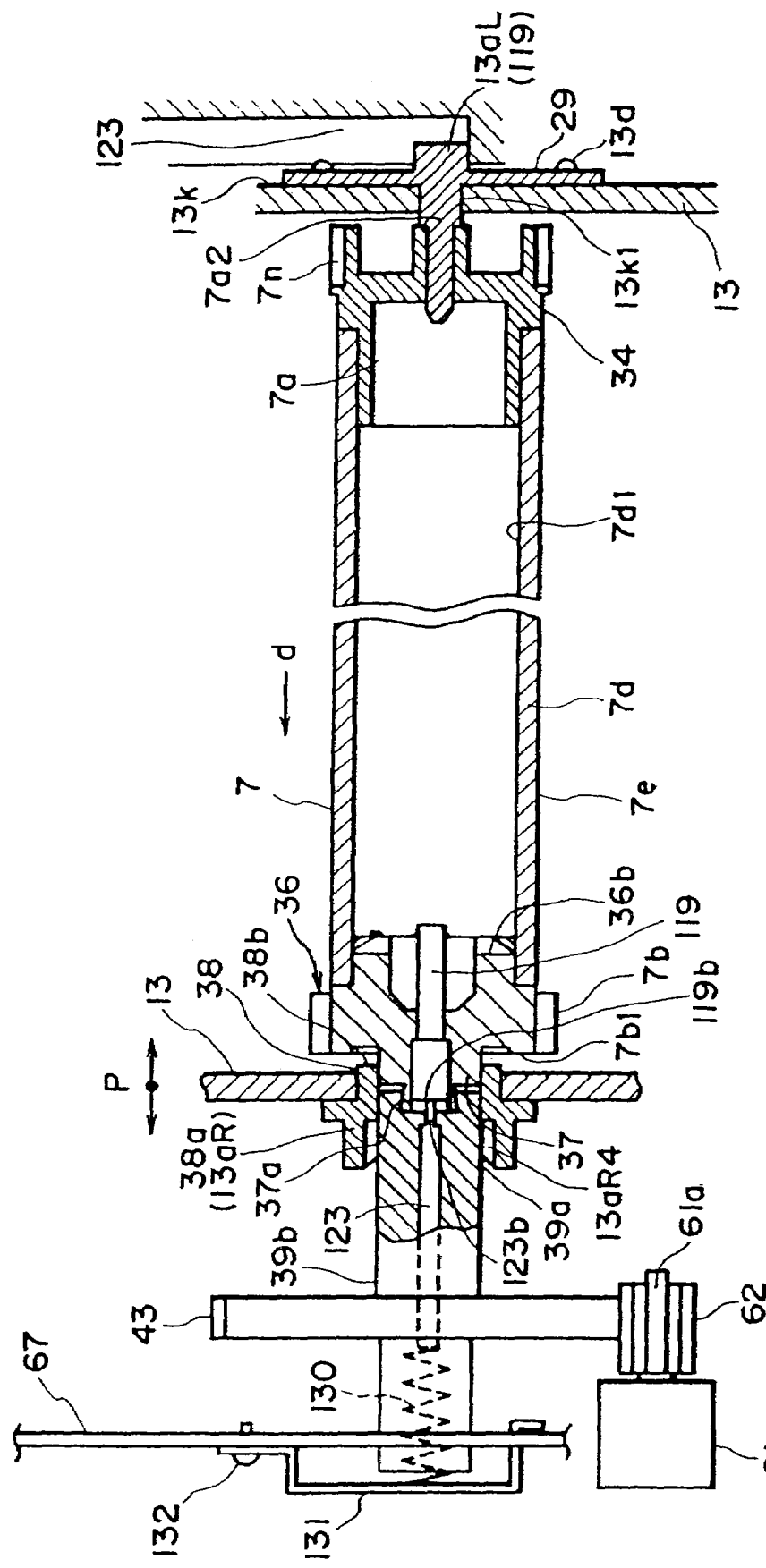
FIG. 61 is a lengthwise section of a photosensitive drum and the adjacencies thereof, depicting another modified version of the structure which is capable of grounding a photosensitive member, as well as supporting it.

In the preceding embodiments, the plate spring 117 was employed to continually press the ground contact member 123 toward the ground contact 119b, but a compression type coil spring 130 may be employed as illustrated in FIG. 61. In the case of the structure in FIG. 61, the compression type coil spring 130 is placed between the outward end of the ground contact member 123 and a rigid side plate 131, and the ground contact member 123 is placed in contact with the ground contact 119b on the cartridge side by the elastic force of the compression type coil spring 130. A reference figure 132 designates a screw, which attaches the rigid side plate 131 to the side plate 67 of the apparatus main assembly 14. FIGS. 25, 26, 28 and 29 illustrate the embodiment in which the compression type coil spring 130 is employed, but obviously, the compression type coil spring 130 is usable with structures other than the above described one.

Further, the above described embodiments may be employed in combination as needed. For example, the embodiment illustrated in FIGS. 56 and 57 may be used in combination with the embodiment illustrated in FIG. 11 or 61. The embodiment illustrated in FIGS. 53 and 54 may be used in combination with the embodiment illustrated in, for example, FIG. 11 or 61. The embodiment illustrated in FIG. 50 may be employed in combination with the embodiment illustrated in FIG. 55, 60, or 61. Further, the embodiment illustrated in FIG. 52 was described with reference to the male type member of coupling means, but obviously, the embodiment is applicable to the female type member of coupling means. The embodiment illustrated in FIG. 52 is also employable in combination with other embodiments, for example, the coupling means member on the apparatus main apparatus 14 side illustrated in FIG. 11, 55, 60, or 61.

As described above, according the preceding embodiments, the force for driving a process cartridge is transmitted from the main assembly of an image forming apparatus to the process cartridge through coupling means which comprises a coupler shaft on the process cartridge side and a coupler shaft on the apparatus main assembly side. The coupling end of either one of the coupler shafts may be provided with a hole, and the coupling end of the other shaft is provided with a projection which fits in the hole of the opposing coupler shaft. Further, one of the ground contacts either on the process cartridge side or on the apparatus main assembly side is located in the hole, and the other is located on the projection, and therefore, an electrophotographic photosensitive drum can be grounded through the rotative power transmitting portion located at one end of the drum.

According to an aspect of the present invention, the ground contacts are under continual elastic pressure, and therefore, it is assured that they remain in contact with each other.

According to another aspect of the present invention, the aforementioned recess and projection are given a twisted form, and therefore, it is further assured that the ground contacts remain in contact each other.

According to another aspect of the present invention, the recess and projection are given a substantially triangular cross section. Therefore, they automatically align with each other. Further, they do not need to be fit as tightly as otherwise, and therefore, they can be easily engaged or disengaged.

In this embodiment, the process cartridge B was described as a process cartridge which forms a monochromatic image, but the present invention is applicable, with desirable effects, to a process cartridge which comprises a plurality of developing means for forming an image composed of a plurality of colors (for example, two toner image, three tone images, full color image, or the like).

The electrophotographic photosensitive member does not need to be limited to the photosensitive drum 7. For example, the following types may be included. First, as for the photosensitive material, photoconductive material such as amorphous silicon, amorphous selenium, zinc oxide, titanium oxide, organic photoconductor, and the like, may be included. As for the configuration of the base member on which photosensitive material is placed, it may be in the form of a drum or belt. For example, the drum type photosensitive member comprises a cylinder formed of aluminum alloy or the like, and a photoconductor layer deposited or coated on the cylinder.

As for the image developing method, various known methods may be employed; for example, two component magnetic brush type developing method, cascade type developing method, touch-down type developing method, cloud type developing method, and the like Also in this embodiment, a so-called contact type charging method was employed, but obviously, charging means with a structure different from the one described in this embodiment may be employed; for example, one of the conventional structures, in which a tungsten wire is surrounded by a metallic shield formed of aluminum or the like, on three sides, and positive or negative ions generated by applying high voltage to the tungsten wire are transferred onto the surface of a photosensitive drum to uniformly charge the surface of the photosensitive drum.

The charging means may in the form of a blade (charge blade), a pad, a block, a rod, a wire, or the like, in addition to being in the form of a roller.

As for the method for cleaning the toner remaining on the photosensitive drum, a blade, a fur brush, a magnetic brush, or the like may be employed as a structural member for the cleaning means.

As described in the foregoing, the photosensitive member can be assuredly grounded electrically.

While the invention has been described with reference to the structures disclosed herein, it is not confined to the details set forth and this application is intended to cover such modifications or changes as may come within the purposes of the improvements or the scone of the following claims.

What is claimed is:

1. A process cartridge detachably mountable to a main assembly of an image forming apparatus, wherein the main assembly includes a motor, a driving rotatable member that receives a driving force from the motor, a twisted hole having a non-circular cross section and being substantially coaxial with the driving rotatable member, and a main assembly grounding contact provided in the hole, said process cartridge comprising:

an electrophotographic photosensitive drum;

process means actable on said electrophotographic photosensitive drum;

a projection provided at a longitudinal end of said electrophotographic photosensitive drum, wherein when the driving rotatable member rotates with the hole and said projection engaged with each other in the state that said process cartridge is mounted to the main assembly of the apparatus, a rotational driving force is transmitted from the driving rotatable member to said electrophotographic photosensitive drum through engagement between the hole and said projection, with said projection being pulled into the hole, wherein said projection is provided with a plurality of engaging portions engageable with the hole; and a cartridge grounding contact, electrically connected with said electrophotographic photosensitive drum, electrically connectable with the main assembly grounding contact when said process cartridge is mounted to the main assembly of the apparatus, wherein said cartridge grounding contact is surrounded by said engaging portions as seen in a direction of a rotational axis of said electrophotographic photosensitive drum so as to be electrically connectable with the main assembly grounding contact.

2. A process cartridge according to claim 1, wherein said projection is twisted.

3. A process cartridge according to claim 1, wherein said projection is not twisted.

4. An electrophotographic image forming apparatus for forming an image on a recording material, to which a process cartridge is detachably mountable, said apparatus comprising:

(a) a motor;

(b) a main assembly driving rotatable member configured and positioned to receive a driving force from said motor;

(c) a twisted hole having a non-circular cross section and being substantially coaxial with said main assembly driving rotatable member; and (d) a main assembly grounding contact provided in said hole; and (e) the process cartridge including:

an electrophotographic photosensitive drum;

process means actable on said electrophotographic photosensitive drum;

a projection provided at a longitudinal end of said electrophotographic photosensitive drum, wherein when said main assembly driving rotatable member rotates with said hole and said projection engaged with each other in the state that said process cartridge is mounted to the main assembly of said apparatus, a rotational driving force is transmitted from said main assembly driving rotatable member to said electrophotographic photosensitive drum through engagement between said hole and said projection, with said projection being pulled into said hole, wherein said projection is provided with a plurality of engaging portions engageable with said hole; and a cartridge grounding contact, electrically connected with said electrophotographic photosensitive drum, electrically connectable with said main assembly grounding contact when said process cartridge is mounted to the main assembly of said apparatus, wherein said cartridge grounding contact is surrounded by said engaging portions as seen in a direction of a rotational axis of said electrophotographic photosensitive drum so as to be electrically connectable with said main assembly grounding contact.

5. An apparatus according to claim 4, wherein said projection is twisted.

6. An apparatus according to claim 4, wherein said projection is not twisted.

7. A process cartridge detachably mountable to a main assembly of an image forming apparatus, wherein the main assembly includes a motor, a driving rotatable member that receives a driving force from the motor, a twisted hole having a non-circular cross section and being substantially coaxial with the driving rotatable member, and a main assembly grounding contact provided in the hole, said process cartridge comprising:

an electrophotographic photosensitive drum;

process means actable on said electrophotographic photosensitive drum;

a non-twisted projection which is provided at a longitudinal end of said electrophotographic photosensitive drum and which has a base portion having a non-circular cross section, said non-twisted projection being engageable with the hole at said base portion, wherein when the driving rotatable member rotates with the hole and said projection engaged with each other in the state that said process cartridge is mounted to the main assembly of the apparatus, a rotational driving force is transmitted from the driving rotatable member to said electrophotographic photosensitive drum through engagement between the hole and said base portion; and a cartridge grounding contact, electrically connected with said electrophotographic photosensitive drum, electrically connectable with the main assembly grounding contact when said process cartridge is mounted to the main assembly of the apparatus, wherein said cartridge grounding contact is surrounded by said base portion as seen in a direction of a rotational axis of said electrophotographic photosensitive drum so as to be electrically connectable with the main assembly grounding contact.

8. A process cartridge according to claim 7, wherein said projection has a shape of a non-twisted polygonal prism.

9. A process cartridge according to claim 7, wherein said non-twisted projection comprises a non-twisted polygonal prism comprising a triangular prism.

10. A process cartridge detachably mountable to a main assembly of an electrophotographic image forming apparatus, wherein the main assembly includes a motor, a driving rotatable member that receives a driving force from the motor, and a twisted hole having a substantially triangular cross section and being substantially coaxial with the driving rotatable member, and a main assembly grounding contact provided in the hole, said process cartridge comprising:

an electrophotographic photosensitive drum;

process means actable on said electrophotographic photosensitive drum;

a non-twisted projection which is provided at a longitudinal end of said electrophotographic photosensitive drum and which has a base portion having a non-circular cross section, said non-twisted projection being engageable with the hole at three portions of said base portion, wherein when the driving rotatable member rotates with the hole and said projection engaged with each other, a rotational driving force is transmitted from the driving rotatable member to said electrophotographic photosensitive drum through engagement between the hole and said base portion; and a cartridge grounding contact, electrically connected with said electrophotographic photosensitive drum, electrically connectable with the main assembly grounding contact when said process cartridge is mounted to the main assembly of the apparatus, wherein said cartridge grounding contact is surrounded by said three portions as seen in a direction of a rotational axis of said electrophotographic photosensitive drum so as to be electrically connectable with the main assembly grounding contact.

11. A process cartridge according to claim 10, wherein said projection has a shape of a non-twisted polygonal prism.

12. A process cartridge detachably mountable to a main assembly of an electrophotographic image forming apparatus, wherein the main assembly includes a motor, a driving rotatable member that receives a driving force from the motor, a twisted hole having a substantially triangular cross section and being substantially coaxial with the driving rotatable member, and a main assembly grounding contact provided in the hole, said process cartridge comprising:

an electrophotographic photosensitive drum;

process means actable on said electrophotographic photosensitive drum; and a non-twisted projection which is provided at a longitudinal end of said electrophotographic photosensitive drum and which has a base portion having a non-circular cross section, said non-twisted projection being engageable with the hole at three portions at said base portion, wherein when the driving rotatable member rotates with the hole and said projection engaged with each other, a rotational driving force is transmitted from the driving rotatable member to said electrophotographic photosensitive drum through engagement between the hole and said base portion;

a cartridge grounding contact, electrically connected with said electrophotographic photosensitive drum, electrically connectable with the main assembly grounding contact when said process cartridge is mounted to the main assembly of the apparatus, wherein said cartridge grounding contact is surrounded by said three portions as seen in a direction of a rotational axis of said electrophotographic photosensitive drum so as to be electrically connectable with the main assembly grounding contact, wherein said projection has a diameter of its circumscribing circle which is larger than a diameter of an inscribing circle of the hole and which is smaller than a diameter of a circumscribing circle of the hole such that said projection can take a first relative rotational position with respect to the hole in which relative rotational movement between said projection and the hole is permitted, and a second relative rotational position with respect to the hole in which the relative rotational movement is prevented in one direction while the rotation axis of the driving rotatable member and the rotation axis of said electrophotographic photosensitive drum are substantially aligned with each other.

13. A process cartridge according to claim 12, wherein said projection has a shape of a non-twisted polygonal prism.

14. A process cartridge according to claim 13 wherein the non-twisted polygonal prism is a triangular prism.

15. An electrophotographic image forming apparatus comprising:

a main assembly including:
a motor;
a driving rotatable member that receives a driving force from said motor;
a twisted hole having a non-circular cross section and substantially coaxial with said driving rotatable member; and
a main assembly grounding contact provided in said hole; and a process cartridge detachably mounted to said main assembly, said process cartridge including;
an electrophotographic photosensitive drum;
process means actable on said electrophotographic photosensitive drum;
a non-twisted projection which is provided at a longitudinal end of said electrophotographic photosensitive drum and which has a base portion having a non-circular cross section, said non-twisted projection being engageable with said hole and said base portion, wherein when said driving rotatable member rotates with said hole at said projection engaged with each other in the state that said process cartridge is mounted to said main assembly of said apparatus, a rotational driving force is transmitted from said driving rotatable member to said electrophotographic photosensitive drum through engagement between said hole and said base portion; and a cartridge grounding contact, electrically connected with said electrophotographic photosensitive drum, electrically connectable with said main assembly grounding contact when said process cartridge is mounted to said main assembly of said apparatus, wherein said cartridge grounding contact is surrounded by said base portion as seen in a direction of a rotational axis of said electrophotographic photosensitive drum so as to be electrically connectable with said main assembly grounding contact.

16. An electrophotographic image forming apparatus comprising:

a main assembly including:
  a motor;
  a driving rotatable member that receives a driving force from said motor;
  a twisted hole having a substantially triangular cross section and being substantially coaxial with said driving rotatable member; and
  a main assembly grounding contact provided in said hole; and
a process cartridge detachably mounted to said main assembly, said process cartridge including:
  an electrophotographic photosensitive drum;
  process means actable on said electrophotographic photosensitive drum; and
  a non-twisted projection which is provided at a longitudinal end of said electrophotographic photosensitive drum and which has a base portion having a non-circular cross section, said non-twisted projection being engageable with said hole at three portions of said base portion, wherein when said driving rotatable member rotates with said hole and said projection engaged with each other, a rotational driving force is transmitted from said driving rotatable member to said electrophotographic photosensitive drum through engagement between said hole and said base portion; and
  a cartridge grounding contact, electrically connected with said electrophotographic photosensitive drum, electrically connectable with said main assembly grounding contact when said process cartridge is mounted to said main assembly of said apparatus, wherein said cartridge grounding contact is surrounded by said three portions as seen in a direction of a rotational axis of said electrophotographic photosensitive drum so as to be electrically connectable with said main assembly grounding contact.

17. An electrophotographic image forming apparatus comprising:

a main assembly including:
  a motor;
  a driving rotatable member that receives a driving force from said motor;
  a twisted hole having a substantially triangular cross section and being substantially coaxial with said driving rotatable member; and
  a main assembly grounding contact provided in said hole; and
a process cartridge detachably mounted to said main assembly, said process cartridge including:
  an electrophotographic photosensitive drum;
  process means actable on said electrophotographic photosensitive drum; and
  a non-twisted projection which is provided at a longitudinal end of said electrophotographic photosensitive drum and which has a base portion having a non-circular cross section, said non-twisted projection being engageable with said hole at three portions at said base portion, wherein when said driving rotatable member rotates with said hole and said projection engaged with each other, a rotational driving force is transmitted from said driving rotatable member to said electrophotographic photosensitive drum through engagement between said hole and said base portion; and
  a cartridge grounding contact, electrically connected with said electrophotographic photosensitive drum, electrically connectable with said main assembly grounding contact when said process cartridge is mounted to said main assembly of said apparatus, wherein said cartridge grounding contact is surrounded by said three portions as seen in a direction of a rotational axis of said electrophotographic photosensitive drum so as to be electrically connectable with said main assembly grounding contact,
wherein said projection has a diameter of its circumscribing circle which is larger than a diameter of an inscribing circle of said hole and which is smaller than a diameter of a circumscribing circle of said hole such that said projection can take a first relative rotational position with respect to said hole in which relative rotational movement between said projection and said hole is permitted, and a second relative rotational position with respect to said hole in which said relative rotational movement is prevented in one direction while the rotation axis of said driving rotatable member and the rotation axis of said electrophotographic photosensitive drum are substantially aligned with each other.

* * * * *